(12) United States Patent
Kiriha et al.

(10) Patent No.: US 6,490,255 B1
(45) Date of Patent: Dec. 3, 2002

(54) NETWORK MANAGEMENT SYSTEM

(75) Inventors: Yoshiaki Kiriha, Tokyo (JP); Motohiro Suzuki, Tokyo (JP); Shoichiro Nakai, Tokyo (JP); Fusanori Kumagai, Tokyo (JP); Nobuhisa Shiraisi, Tokyo (JP); Kouji Yata, Tokyo (JP); Ikuo Yoda, Tokyo (JP); Tetsuaki Goto, Tokyo (JP); Ayano Yamashita, Tokyo (JP); Hiroyuki Maeomichi, Tokyo (JP); Taichi Kawabata, Tokyo (JP)

(73) Assignees: NEC Corporation, Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/260,548

(22) Filed: Mar. 2, 1999

(30) Foreign Application Priority Data

Mar. 4, 1998 (JP) .......................... 10-052265

(51) Int. Cl.⁷ .............................................. H04L 12/28
(52) U.S. Cl. ...................................... 370/254; 709/220
(58) Field of Search .................. 370/252, 374, 370/368, 363, 254; 709/224, 220, 226, 229, 100

(56) References Cited

FOREIGN PATENT DOCUMENTS

EP          0 786 882          7/1997
WO          WO 95/23469        8/1995

OTHER PUBLICATIONS

B. Moore et al., "CMIP/SNMP Integration Prototype", *Institute of Electrical and Electronic Engineers*, vol. 1, Symp. 4, Feb. 14, 1994, pp. 257–267.
Patent Abstracts of Japan, vol. 067, No. 003, Mar. 31, 1997.
R. Hunt, "SNMP, SNMPv2 and CMIP—the technologies for multivendor network management", *Computer Communications*, vol. 20, No. 2, Mar. 1, 1997, pp. 73–88.
Bernhard Newumair et a., "Managementarchitekuren als Lösungsansätze für ein Netz und Systemmanagement in heterogener Umgebung", *it_ti Informationstechnik und Technische Informatik*, vol. 38, No. 6, Dec. 1, 1996, pp. 7–16.

*Primary Examiner*—Wellington Chin
*Assistant Examiner*—Brenda Pham
(74) *Attorney, Agent, or Firm*—Sughrue Mion, PLLC

(57) ABSTRACT

In order to make an extension/deletion of management function possible without interruption of a system operation and make a conversion between a plurality of management protocols possible in a network communication system for use and maintenance of a communication network, a managed object obtained by abstracting a physical subject such as a communication device or a communication service to be managed transfers from a management manager or an object server storing a plurality of managed objects on the basis of an instruction from the management manager performing a management operation and the transferred managed object is executed.

16 Claims, 44 Drawing Sheets

Management System with Object Definitton Change Function

| behavior program name | version number | update system | instance number | reference number |
|---|---|---|---|---|
| vpTTPBidirectional | 971205 | synchronous | 5 | 10 |
| vpCTPBidirectional | 961112 | asynchronous | 7 | 20 |
| vcCTPBidirectional | 970524 | user definition | 7 | 15 |
| ⋮ | ⋮ | ⋮ | ⋮ | ⋮ |

FIG.14

| behavior program name | version number | date | non-stoage period |
|---|---|---|---|
| vpTTPBidirectional | 971205 | 97/12/05 | 0 |
| vpCTPBidirectional | 961112 | 96/11/12 | 1 |
| vcCTPBidirectional | 970524 | 97/05/24 | 3 |
| ⋮ | ⋮ | ⋮ | ⋮ |

FIG.15

| Start ID | Object Name | Attribute Name | Kind | |
|---|---|---|---|---|
| 1 | MO1 | A1 | Read | — 3706 |
| 1 | MO1 | A2 | Write | — 3707 |
| 1 | MO2 | A1 | Read | — 3708 |
| 2 | MO3 | A1 | Write | — 3709 |
| ... | ... | ... | ... | |
| | | | | |

FIG.44

| Sychronous type | Operation Object #1 | Result List | Operation Object #2 | Result List | ... |
|---|---|---|---|---|---|

FIG.45

NETWORK MANAGEMENT SYSTEM

CROSS REFERENCE TO RELATED APPLICATIONS

The present invention claims priority from Japanese Patent Application No. 10 052265 filed Mar. 4, 1998, the contents of which are incorporated herein by reference.

BACKGROUND OF THE INVENTION

1. Field of the Invention

The present invention relates to a network management system for operating physical managed objects such as communication equipments and communication services on the basis of an instruction from a management manager and, particularly, to a network management system capable of extending or deleting management functions without interruption of a system operation and capable of performing a conversion between a plurality of management protocols.

2. Description of Related Art

In order to operate physical objects to be managed, such as communication equipments and communication services within a communication network, a network management system has been known in which physical objects to be managed are abstracted as managed objects and a lower layer is operated correspondingly to an instruction which is one of the managed objects from a management manager which is an upper layer.

FIG. 47 shows an example of a management protocol conversion in a conventional network management system. This conventional example is disclosed in Japanese Patent Application Laid-open No. Hei 7-321885 and is constructed with a managed object 4001 which is an upper layer managed object capable of being operated by a management manager according to a protocol "1", a managed object 4002 which is a lower managed object a management agent of which can be operated by a protocol "2", a managed object 4003 which is a lower layer managed object a management agent of which can be operated by a protocol "3" and a managed object 4004 which is a lower layer managed object a management agent of which can be operated by a protocol "4".

When the managed object 4001 which is the upper layer managed object is accessed from the management manager by using the protocol "1", the network management system disclosed in Japanese Patent Application Laid-open No. Hei 7-321885 identifies a management operation for the lower layer managed objects 4002, 4003 and 4004 by referring to an information describing a relation between an upper layer managed object name and a lower layer managed object name, which is held by the system. Further, the network management system has an information related to the kind of protocol for operating the lower layer managed object name and issues an operation request to the management agents by using the protocol "2" for the managed object 4002, the protocol "3" for the managed object 4003 and the protocol "4" for the managed object 4004, as shown in FIG. 47. The protocol conversion is realized by converting the name of the managed object which is the upper layer managed object and has the protocol kind into names of one or more managed objects which are the lower layer managed objects, in this manner.

FIG. 48 shows an example of a conventional management function extension/deletion of a network management system. This example is disclosed in Japanese Patent Application Laid-open No. Hei 8-314836 and is constructed with an operator and management application 4101, a management service object 4102 and managed objects 4103, 4104 and 4105.

The management service object 4102 is conducted to define only actions between the managed objects 4103, 4104 and 4105 and the management application 4101 and is described as a sequence for referring to a table containing parameters necessary for operations for the respective managed objects. In the example shown in FIG. 48, a sequence of a name of table storing an information for performing an operation to the managed object 4103, a name of table storing an information for performing an operation to the managed object 4104 and a name of table storing an information for performing an operation to the managed object 4105 is stored in the table as an action of the management service object 4102.

In the network management system disclosed in Japanese Patent Application Laid-open No. Hei 8-314836, when the management application 4101 requests an action operation of the management service object 4102, the table registered as the action of the management service object 4102 is referred to and the management operations are executed in the assigned sequence while referring to the tables storing the operation parameters. Further, this network management system provides a function of dynamically rewriting updates of the registered tables.

However, the above mentioned prior art has some problems.

A first problem of them is that a change of a managed object definition (program abstractedly indicative of a management subject) is impossible in extension/deletion of the management function. The reason for this is that, in the technique disclosed in Japanese Patent Application Laid-open No. Hei 8-314836, subjects are objects (only action operation is executable) of the kind different from the managed objects and the managed object definition is unchangeable.

The second problem is that only operation in managed object unit is permitted for both function extension and protocol conversion. The reason for this is that, in the technique disclosed in Japanese Patent Application Laid-open No. Hei 8-314836, the descriptive capability is limited to a command sequence stored in a table for the purpose of easiness of program development and only correspondence table for each managed object is defined.

The third problem is that it is impossible to guarantee a consistency for one operation from a management manager. The reason for this is that the standardized existing management protocol does no define semantics of a transaction processing.

The fourth problem is that a memory amount required for conversion between a plurality of management protocols is large. The reason for this is that, in the technique disclosed in Japanese Patent Application Laid-open No. Hei 7-321885, a correspondence table of operations converted is produced every managed object instance.

The fifth problem is that the manager can not assign a timing of update of table storing the operation parameters every management service object. The reason for this is that, in the technique disclosed in Japanese Patent Application Laid-open No. Hei 7-321885, the update timing of the table storing the operation parameters is only when the action operation of the management service object is requested.

The sixth problem is that a start time of the action operation of the management service object is long. The reason for this is that, in the technique disclosed in Japanese Patent Application Laid-open No. Hei 7-321885, the table storing the operation parameters is newly generated every time the action operation of the management service object is requested.

SUMMARY OF THE INVENTION

An object of the present invention is to provide a network management system in which, when looking from a management manager, the managed object definition can be changed without interruption of a system operation.

Another object of the present invention is to provide a network management system capable of defining a managed object operation having high function for both function extension and protocol conversion.

A further object of the present invention is to provide a network management system which can always guarantee a consistency of management operations for one operation from a management manager.

Another object of the present invention is to provide a network management system in which a required memory amount is saved to make a protocol conversion possible.

Another object of the present invention is to provide a network management system in which the update timing of managed object can be freely assigned according to each managed object.

Another object of the present invention is to provide a network managed object in which operations of managed objects can be executed at high speed.

A network management system according to the present invention, which, in order to perform a use and maintenance of a communication network, executes managed objects obtained by abstracting physical subjects to be managed, on the basis of an instruction from a management manager which manages management operations, is featured by comprising means for receiving the managed objects instructed by the management manager from the management manager or an object server which is provided separately from the management manager and stores a group of managed objects and for executing them. That is, by executing the managed objects transferred from the management manager or the object server, which is provided externally of the communication system, it is possible to perform an addition and/or change of the managed object definition.

The managed object preferably includes managed objects obtained by abstracting the group of managed objects as subjects to be managed with respect to a management agent fixedly storing one or more managed objects and the network management system preferably comprises means for requesting a corresponding management agent to perform an operation requested from a management manager by executing a managed object transferred according to an instruction from the management manager and interpreting/editing a notice from the management agent and notifying it to the management manager. That is, even when the system is constructed to interface between the management manager and the management agent, it is possible to perform an addition/change of the managed object definition by transferring the managed object having the group of managed objects held by the management agent as the subjects to be managed externally and executing it.

The network management system according to the present invention can be constructed with a machine dependent portion which is dependent upon the kind of a communication device or a computer by which the managed object is executed and a machine independent portion which is independent from the kind of device. Thus, the network management system is operable in a communication device or a work station, whose machine independent portion has various softwares.

In such case, the machine independent portion may include a function execution portion for performing a managed object transfer/execution processing and an interface processing between the management manager and the management agent and a plurality of protocol processing portions for processing an exchange of request message and response message according to a plurality of respective communication procedures determined for the management manager and the manager agent. By performing mutual operations with respect to the plurality of protocol processing portions by the function execution portion, it is possible to uniformly handle the plurality of management protocols.

The function execution portion may include an extended function execution portion for adding/updating a managed object transferred from the management manager or the object server and controlling an execution of the transferred managed object and a managed object control portion for receiving a request message of a management operation, judging whether a behavior program is performed every managed object unit operation by dividing the management operation to operations in managed object unit or an operation request is performed to the management agent by using the protocol processing portion, and, when the operation request is to be performed to the management agent, for performing the execution control of the management operation by selecting one of the protocol processing portions. In this case, the network management system operates such that the addition/change of the managed object definition becomes possible and the management operation is realized at high speed, by assembling the definition information of the managed object and the behavior program with an interpreter language by holding and updating them by the extended function execution portion and assembling the operation of the extended function execution portion with a compiler language by controlling it by the managed object control portion.

The extended function execution portion may include a behavior execution portion which stores a behavior program describing one or more operations to one managed object or a group of a plurality of managed objects held in a management agent or the network management system, performs an addition/update of the behavior program and executes the added/updated behavior program according to a request from the managed object control portion, and provides a response of a result of the execution and a definition information management portion which holds a definition information of managed objects, refers/updates the definition information according to a reference/update request of the definition information and, in a case of update, notifies a result of update to the managed object control portion.

The definition information management portion may include a definition information storing portion for storing a definition information related to attribute/notice/kind of action of managed object and data structure thereof, a reference portion for receiving a reference request to the definition information, accessing the requested definition information from the definition information storing portion on the basis of the reference request and transmitting the requested definition information as a response, an update portion for receiving an update request to the definition information, executing an update of the requested definition information with respect to the definition information storing portion on the basis of the update request and transmitting a result of the execution as a response and a notice portion for notifying an information of the definition information update by the update portion to the managed object control portion.

The behavior execution portion may include a behavior program storage portion which stores a behavior program which describes one or more operations for one managed object or a group of managed objects which is managed by a management agent or the network management system correspondingly to the attribute/notice/action of the managed object and is capable of being updated/added/deleted, a behavior program execution portion for providing an environment in which the behavior program operates, monitoring whether or not all of the operations described in the behavior program and performing a confirmation processing when all operations are successful and, otherwise, a cancellation processing, a definition change receiving portion for receiving an information related to a definition change from the definition information management portion, an object access portion for receiving a behavior program execution request from the managed object control portion and an activation control portion for performing an update of the behavior program corresponding to a behavior program update request from the definition change receiving portion, an activation of the behavior program according to the behavior program activation request from the object access portion and a transmission of a result of the operation of the behavior program to the object access portion.

The activation control portion may include behavior program temporary storage means for storing the behavior program and a behavior program state information, behavior program update management means for receiving the behavior program updated by the management manager from the definition change receiving portion and storing it in the behavior program storing portion, performing an addition and a deletion of the behavior program stored in the behavior program temporary storage means, updating the behavior program state information and holding and updating a behavior program update information which is an information related to the behavior program stored in the behavior program storage portion, and behavior program execution control means for activating the behavior program stored in the behavior program temporary storage means, requesting an execution of the activated behavior program to the behavior program execution portion, transmitting an update request of the behavior program to the behavior program update management means after an operation of the activated behavior program and when the behavior program execution portion erases the behavior program, referring and updating the behavior program state information which is an information related to the behavior program stored in the behavior program temporary storage means and receiving the behavior program start request from the object access portion and transmitting a result of operation of the behavior program to the object access portion.

It is preferable to update the behavior program by forming individual name spaces, newly forming a class loader having a function of storing a behavior program in a memory from a disk and newly storing the start requested behavior program in a memory from a disk by the class loader, every time when the behavior program execution control means receives the behavior program start request.

In this case, it is preferable that the behavior program execution control means selects a class loader adapted to store the start requested behavior program from the group of the class loaders in operation in a list containing names of other behavior programs to which the behavior program refers and the behavior program is updated by newly storing the start requested behavior program in the selected class loader.

The managed object control portion may include an active object execution portion for requesting the behavior execution portion to access the managed object having the behavior execution portion storing the behavior program, a remote object execution portion for accessing a management agent storing a managed object in order to execute a management operation, a definition change receiving portion for receiving a notice related to a content of a change of definition information from the definition information management portion, a managed object access portion for receiving an operation request with respect to one managed object, an agent access portion for receiving an operation request for one or a plurality of managed objects and a management operation execution control portion for, when a request is received from the definition change receiving portion, performing a change of data defining a managed object, for, when a request is received from the managed object access portion or the agent access portion, selecting one or more managed objects which are subjects to be operated on the basis of the request and determining whether a processing is requested to the behavior execution portion with respect to the respective managed objects or an operation request is made to the management agent by using the protocol processing portion and for, when an operation request is to be made to the management agent, determining one processing portion of the plurality of the protocol processing portions which is to be utilized, requesting a preparation of execution to the active object execution portion or the remote object execution portion and requesting an execution definition or an execution cancellation to the active object execution portion or the remote object execution portion on the basis of a synchronous or optimal mode assigned as an operation parameter.

The management operation execution control portion may include a definition table management portion for holding an information related to attribute/notice/action defined in the managed object and performing a reference/update processing, a managed object relation management portion for holding an information indicative of a relation between a plurality of managed objects which are subjects to be operated and performing a reference processing, an operation division portion for accessing the managed object relation management portion from the parameter assigned by the management operation and determining a plurality of managed objects which become subjects to be operated, an exclusive control management portion for holding an information indicative of that the managed object to be operated is already being operated in executing the management operation, newly adding a managed object when an operation request is to the managed object which is not being operated and providing a response indicative of that a managed object is being operated to an operation request when the operation request is to a managed object which is being operated, an operation execution portion for executing a plurality of managed objects which are determined by utilizing the operation division portion and the exclusive control management portion as operable subjects to be operated while temporarily holding results of operations and an operation control portion for, in order to execute operations received by the managed object access portion or the agent access portion, newly producing the operation execution portion and requesting an execution, holding a dependency of management operations recursively generated from one management operation and requesting an instruction of a reference to an intermediate result and a deletion request to the operation execution portion.

In the construction mentioned above, a managed object is preferably constructed with a behavior program describing a behavior of the managed object with a language executable by an interpreter and an active object which is a compiled program and holds a definition table which is data describing a correspondence between the behavior program and attribute/notice/action defined by the managed object, an information related to a name of the managed object, an information indicative of a relation to other managed objects and an information related to a pointer to the definition table indicative of definition items of the managed object.

In this case, the active object operates such that the attribute/notice/action defined is identified by referring to the definition table, an identifier (referred to as "Id", hereinafter) of the behavior program described with an interpreter language is acquired, a processing such as a value acquisition related to an attribute/notice/action whose operation is requested next is performed and a response is provided to the management operation by executing the behavior program. Further, since the definition table is data referred to from the active object, it is re writable according to a definition change and, since the behavior program is described with the interpreter language and re-writable, the definition and the behavior of the managed object can be changed without interruption of the system operation.

In a case where a relation data of the managed object held in the managed object relation management portion handles an inclusion relation between two managed objects, it is preferable to construct the relation data such that it has a tree data composed of a route indicative of a top of the tree, a node representing an active object and a node of a virtual object representing a remote object which is necessary to construct a name of the active object and whose subject exists in the management agent.

In this construction, when a definition change of managed object and/or an addition of managed object is performed, a memory is saved without holding information corresponding to all remote objects having subjects existing in the management agent by adding a node corresponding to the active object to the relation data and adding virtual objects which includes the added active object and whose subjects exists in the management agent to the relation data as nodes.

The operation division portion receives the parameter of the management operation and can change the received management operation by listing managed objects to be operated on the basis of the relation data held in the managed object relation management portion, listing active objects when all of the listed managed objects are the active objects, outputting the received operation as it is when all of the listed managed objects are the remote objects and listing the active objects and outputting a new operation obtained by adding a filter condition for preventing an access to the remote objects corresponding to the active objects to the received management operation when the active objects and the remote objects coexist in the listed managed objects. Thus, it is possible to reduce the number of operation request transmissions to the management agent to thereby perform the protocol conversion processing efficiently.

The CORBA (Common Object Request Broker Architecture) can be used as a common object computing platform for communication between the protocol processing portion, the definition information management portion, the behavior execution portion and the managed object control portion. With the CORBA, it is possible to distribute and operate the respective function modules with high mutual connection.

By describing the behavior program with the script language such as Java or Tcl whose grammar is simple and which is de facto standard, it is possible to execute the behavior program on various hardware/OS platforms.

BRIEF DESCRIPTION OF THE DRAWINGS

The above mentioned and other objects, features and advantages of the present invention will become more apparent by reference to the following description of the invention taken in conjunction with the accompanying drawings, in which:

FIG. 14 shows an example of a behavior program state information stored in a behavior program temporary storing portion;

FIG. 15 shows an example of a behavior program update information held in and updated by the behavior program update management means;

FIG. 44 shows a construction of a lock table in an exclusive control management portion;

FIG. 45 shows a construction of a working data in an operation execution portion;

DETAILED DESCRIPTION OF THE PREFERRED EMBODIMENTS

Now, an embodiment of the present invention will be described in detail with reference to the drawings.

Figure 1:
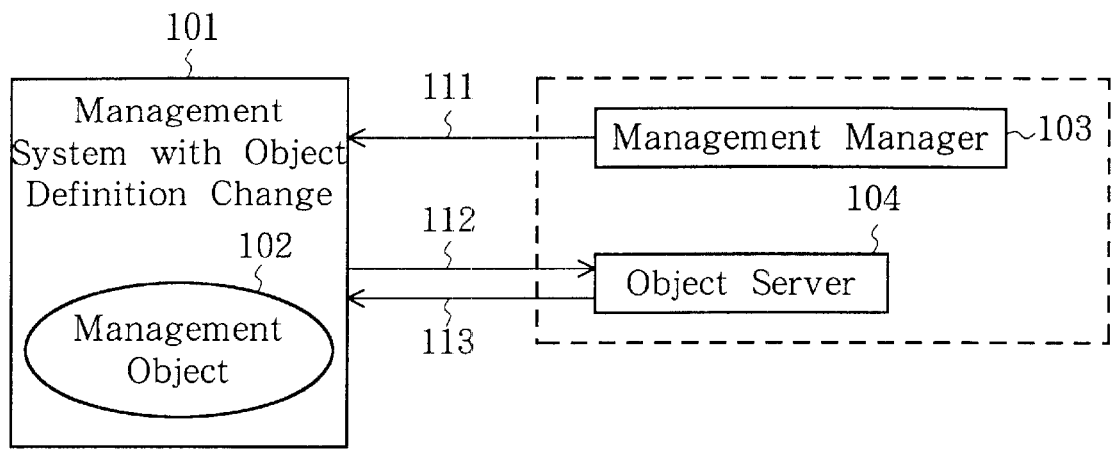
FIG. 1 is a block diagram showing a construction of a first embodiment of the network management system according to the present invention.

FIG. 1 is a block diagram showing a construction of a first embodiment of the present invention. The first embodiment shown in FIG. 1 is constructed with a management system 101 with object definition change function (referred to as merely "management system 101") as a network management system embodying the present invention and, as a system related to the management system 101, a management manager 103 for instructing a management operation to the management system 101 and an object server 104 for holding a managed object 102. The management system 101 is constructed such that it executes the managed object 102 obtained by abstracting physical subjects such as communication devices and communication services, etc., which are subjects to be managed.

A general operation of this embodiment will be described in detail with reference to message flows between the respective modules shown in FIG. 1. First, the management manager 103 instructs the management system 101 to acquire the managed object 102 from an external system (step 111). Then, the management system 101 requests the managed object server 104 storing the instructed managed object 102 to transfer the managed object 102 (step 112). Further, the object server 104 transfers the requested managed object 102 to the management system 101 and the management system 101 starts an execution of the transferred managed object 102 (step 113). Although, in the steps 112 and 113, the object server 104 is described as holding the managed object 102, the system operates similarly in a case where the management manager 103 holds the managed object 102.

By transferring the managed object 102 from the object server 104 or the management manager 103, the management system 101 can perform an addition/deletion of a managed object definition without interruption of the system operation.

Figure 2:
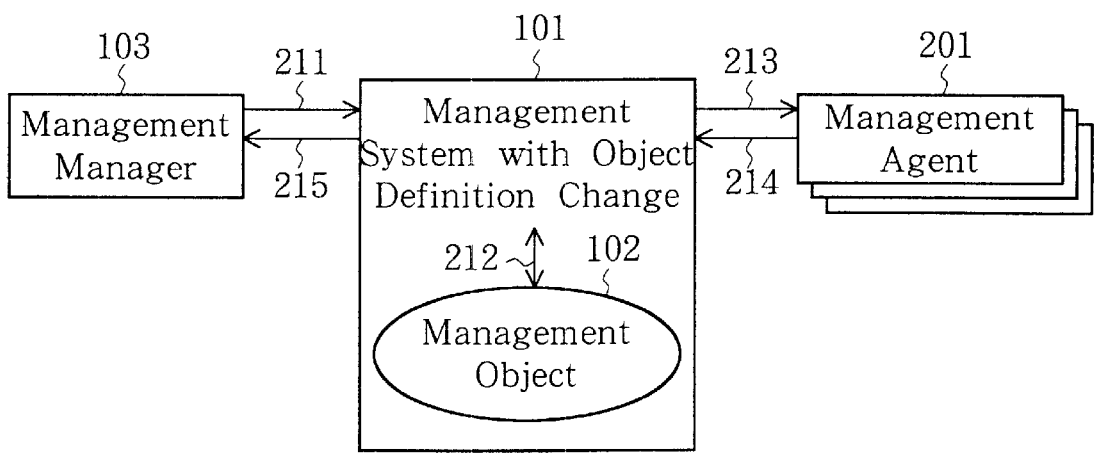
FIG. 2 is a block diagram showing a construction of a second embodiment of the network management system according to the present invention.

FIG. 2 is a block diagram of a second embodiment of the present invention. The second embodiment is constructed with a management system 101 with object definition change function (referred to as merely "management system 101") as a network management system embodying the present invention and, as a system related thereto, a management manager 103 and a management agent 201. The management system 101 abstracts a managed object or a management group fixedly held by the management agent 201 as a subject to be managed and the management system 101 receives the abstracted managed object or managed object group as the managed object 102 from the management manager 103 and executes it.

A general operation of this embodiment will be described in detail with reference to message flows between the respective modules shown in FIG. 2. First, the managed object 102 is transferred from the management manager 103 and the management manager 103 requests the management system 101 to perform an operation to the managed object 102 (step 211). On the basis of the operation request from the management manager 103, the management system 101 performs a processing of the managed object 102 (step 212). Further, an operation request to the managed object held by the management agent 201 defined in the managed object 102 is performed with respect to the management agent 201 (step 213). The management agent 201 performs an operation with respect to the managed object held therein and returns a result of the processing of the managed object to the management system 101 (step 214). Upon the response from the management agent 201, the management system 101 interprets/edits the managed object 102 on the basis of a specification thereof and sends a result of the processing of the managed object 102 to the management manager 103 (step 215).

The management system 101 interfaces between the management manager 103 and the management agent 201 in this manner and transfers/executes the new managed object 102 whose subject to be managed is the managed object fixedly held in the management agent 201. Thus, it is possible to perform an addition/change of the managed object definition without change of the existing management manager 103 and the management agent 201.

Figure 3:
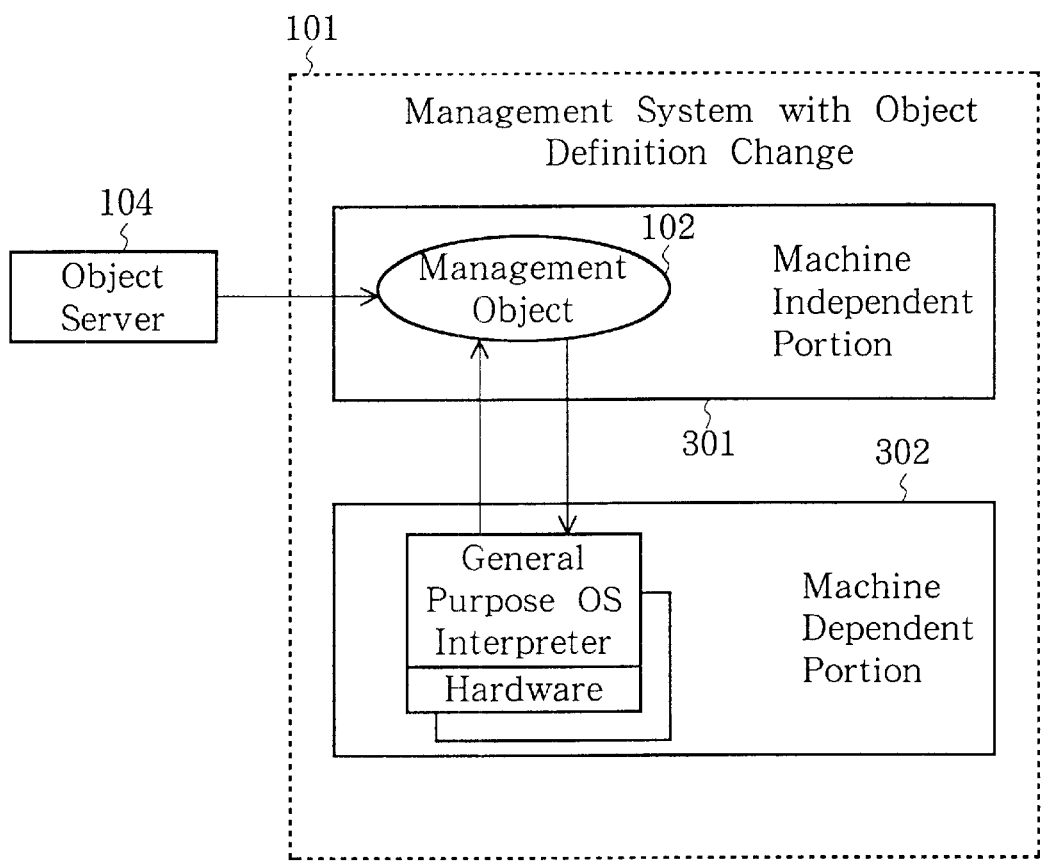
FIG. 3 is a block diagram showing a construction of a management system with object definition change function.

FIG. 3 shows an example of construction of the management system 101 with object definition change function. The management system 101 is constructed with a machine independent portion 301 and a machine dependent portion 302. The machine independent portion 301 operates independently from the kinds of communication devices and computers which execute the managed object. The machine dependent portion 302 is realized by a general purpose OS or an interpreter which conceals a hardware of communication device and a specification thereof and provides a common program interface.

In this constructive example, by realizing the machine independent portion 301 with utilizing the common program interface which conceals the difference in kind between the communication devices or computers which are provided by the machine dependent portion 302, the managed object 102 contained in the machine independent portion 301 can operates independently from the communication device or computers by which it is executed.

Figure 4:
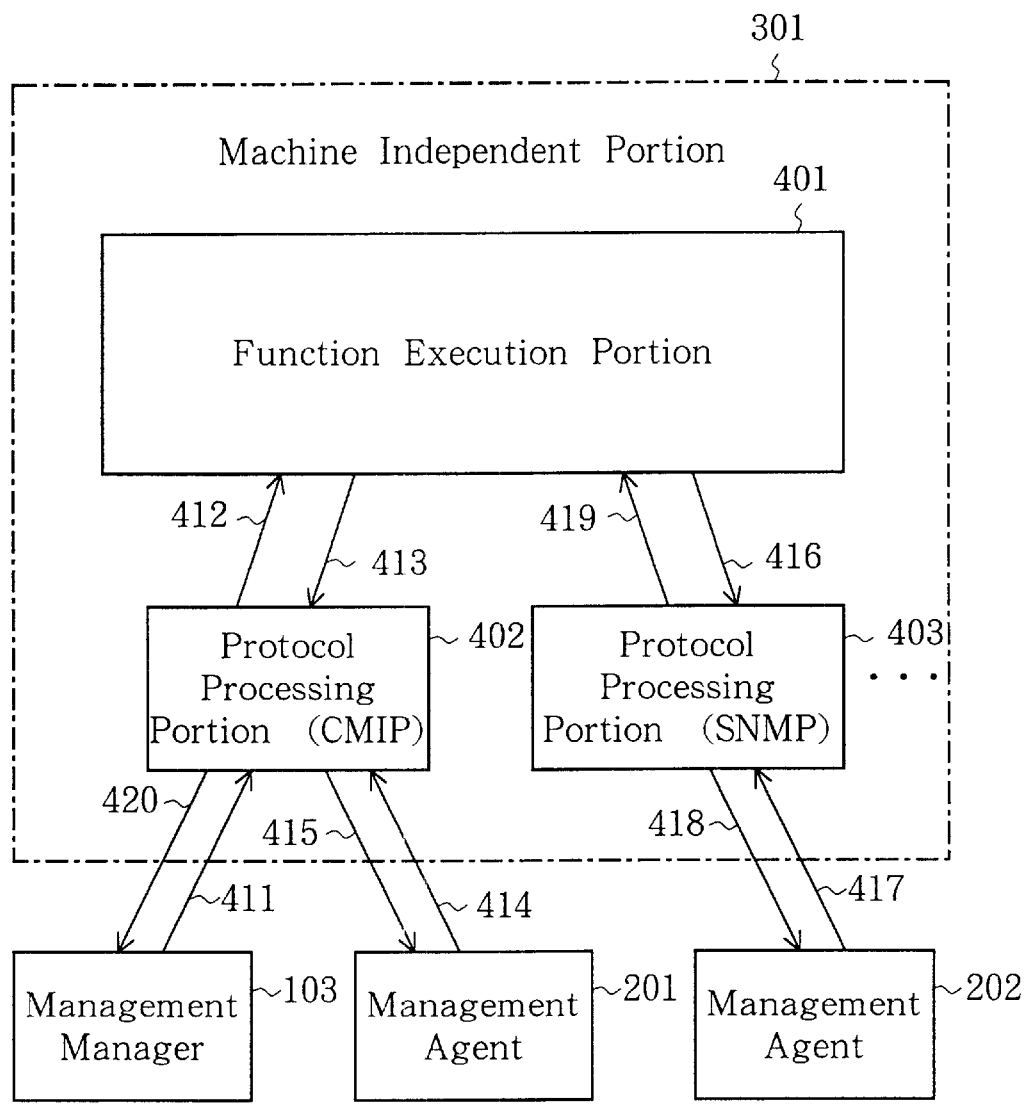
FIG. 4 is a block diagram showing an example of construction of a machine independent portion with a management manger and a management system.

FIG. 4 is a block diagram showing an example of construction of the machine independent portion 301, together with the management manager 103 and the management agent 201. The machine independent portion 301 is constructed with a function execution portion 401 and protocol processing portions 402 and 403. The function execution portion 401 performs a transfer/execution processing of the managed object 102 and interfaces between the management manager 103 and the management agent 201. The protocol processing portions 402 and 403 exchange request messages and response messages according to communication procedures standardized for management.

An operation of the machine independent portion 301 will be described with reference to message flows between the respective modules shown in FIG. 4. The management manager 103 performs an operation request for the managed object 102 held in and executed by the function execution portion 401 by using the CMIP (Common Management Information Protocol) (step 411). In response to the operation request from the management manager 103, the protocol processing portion 402 interprets the received message and notifies the operation request to the function execution portion 401 (step 412). In the function execution portion 401, the operation request is analyzed to identify a managed object to be a subject. When the managed object has to operate the management agent 201 which utilizes the CMIP, the operation is requested to the protocol processing portion 402 for the CMIP (step 413) and, when the managed object 102 has to operate the management agent 202 which utilizes the SNMP (Simple Network Management Protocol), the operation is requested to the protocol processing portion 403 for the SNMP (step 416). In response to the request from the function execution portion 401, the protocol processing portion 402 requests the management agent 202 to perform the requested operation by utilizing the CMIP (steps 414, 415) and returns a result of the processing to the function execution portion 401 (step 412). The protocol processing portion 403 responds to the request from the function execution portion 401 to request the management agent 202 to perform the requested operation by utilizing the SNMP (steps 417, 418) and a result of the processing is returned to the function execution portion 401 (step 419). When the function execution portion 401 receives the response from the protocol processing portions 402 and 403, the function execution portion 401 interprets/edits the thus obtained information and sends the result of processing of the managed object 102 which is held therein to the management manager 103 through the protocol processing portion 402 (steps 413, 420).

In this embodiment, there are provided a plurality of the protocol processing portions 402 or 403 and, by controlling the utilization of then by the function execution portion 401, a plurality of management protocols can be processed consistently.

Figure 5:
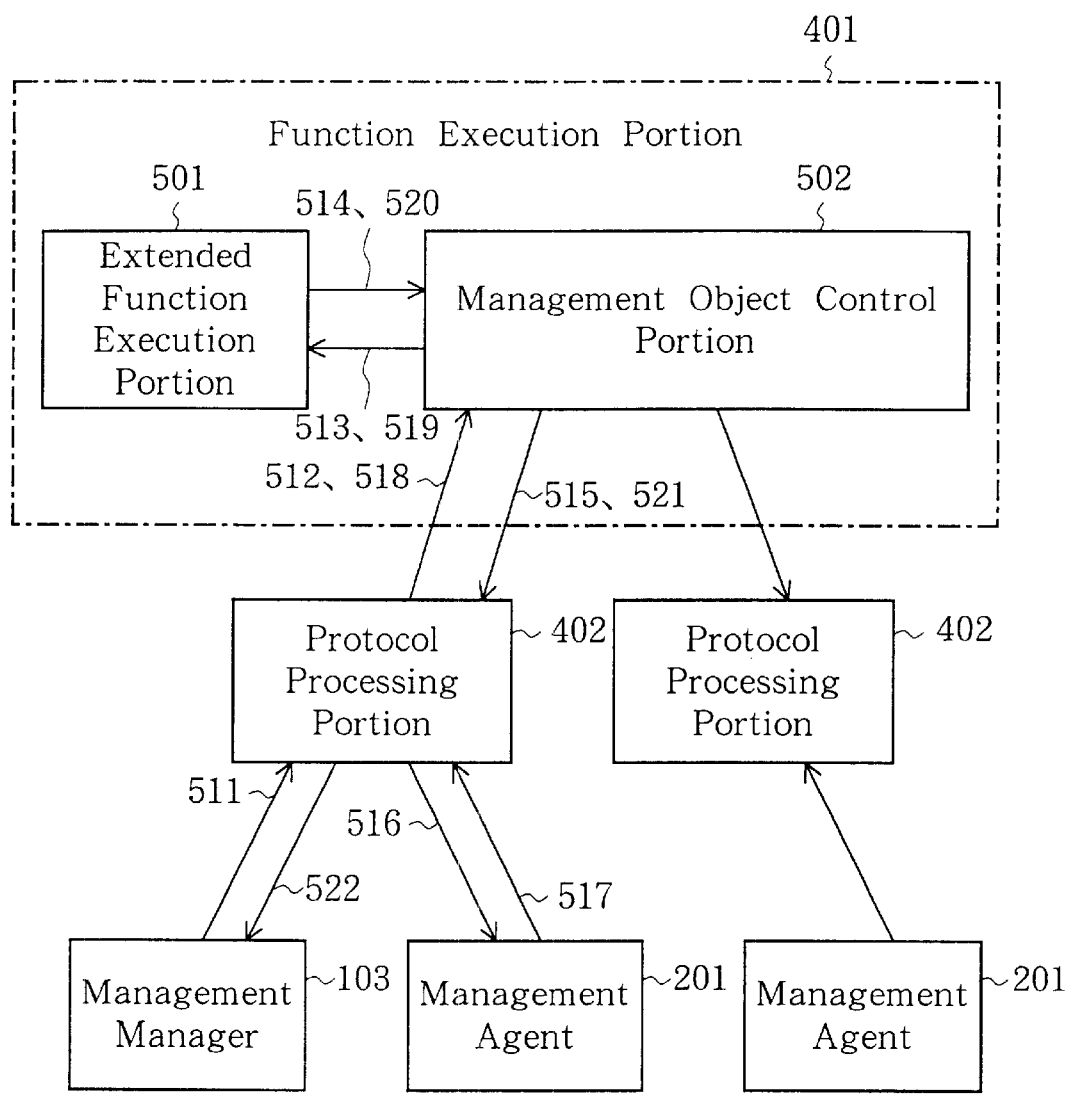
FIG. 5 is a block diagram showing an example of construction of a function execution portion with a protocol processing portion, the management manager and a management agent.

FIG. 5 is a block diagram showing an example of construction of the function execution portion 401, together with the protocol processing portion 402, the management manager 103 and the management agent 201. The function execution portion 401 is constructed with an extended function execution portion 501 and a managed object control portion 502. The extended function execution portion 501 performs an addition/update processing of a managed object 102 transferred from the management manager 103 or the object server 104 and controls an execution of the transferred managed object 102. The managed object control portion 502 receives a management operation request message, divides the message to operations in managed object unit, determines whether a behavior program is to be executed every operation in managed object unit or an operation is requested to the management agent 201 by utilizing the protocol processing portion 402, one of a plurality of protocol processing portions 402 which is to be used to execute is selected in a case where an operation request is to be performed with respect to the management agent 201 and an execution is requested to the extended function execution portion 501 in a case where the behavior program is to be executed.

An operation of the function execution portion 401 will be described with reference to message flows between the respective modules shown in FIG. 5. When the managed object control portion 502 receives the operation request from the management manager 103 through the protocol processing portion 402 (steps 511, 512), it interprets the operation request and requests the extended function execution portion 501 to execute a behavior program of the managed object 102 which becomes a subject to be operated (step 513). The extended function execution portion 501 executes the requested behavior program and requests the managed object control portion 502 to send an operation request to the management agent 201 on the basis of a content of the behavior program (step 514). The managed object control portion 502 executes the requested operation to the management agent 201 through the protocol processing portion 402 (steps 515, 516) and obtains a response (steps 517, 518). The managed object control portion 502 reflects a result of the processing of the management agent 201 to the behavior program of the extended function execution portion 501 (step 519) and the behavior program edits the processing result on the basis of the content of the behavior program and notifies a final processing result to the managed object control portion 502 (step 520). The managed object control portion 502 sends the processing result of the behavior program executed by the extended function execution portion 501 to the management manager 103 from which the management operation is requested, through the protocol processing portion 402 (steps 521, 522).

As described, by controlling the extended function execution portion 501 which is mounted with the interpreter language and performs the holding and the addition/update of the definition information of the managed object and the behavior program by the managed object control portion 502 mounted with the compiler language, the addition/update of the managed object becomes possible and it is possible to increase the processing speed of the managed object control portion 502.

Figure 6:
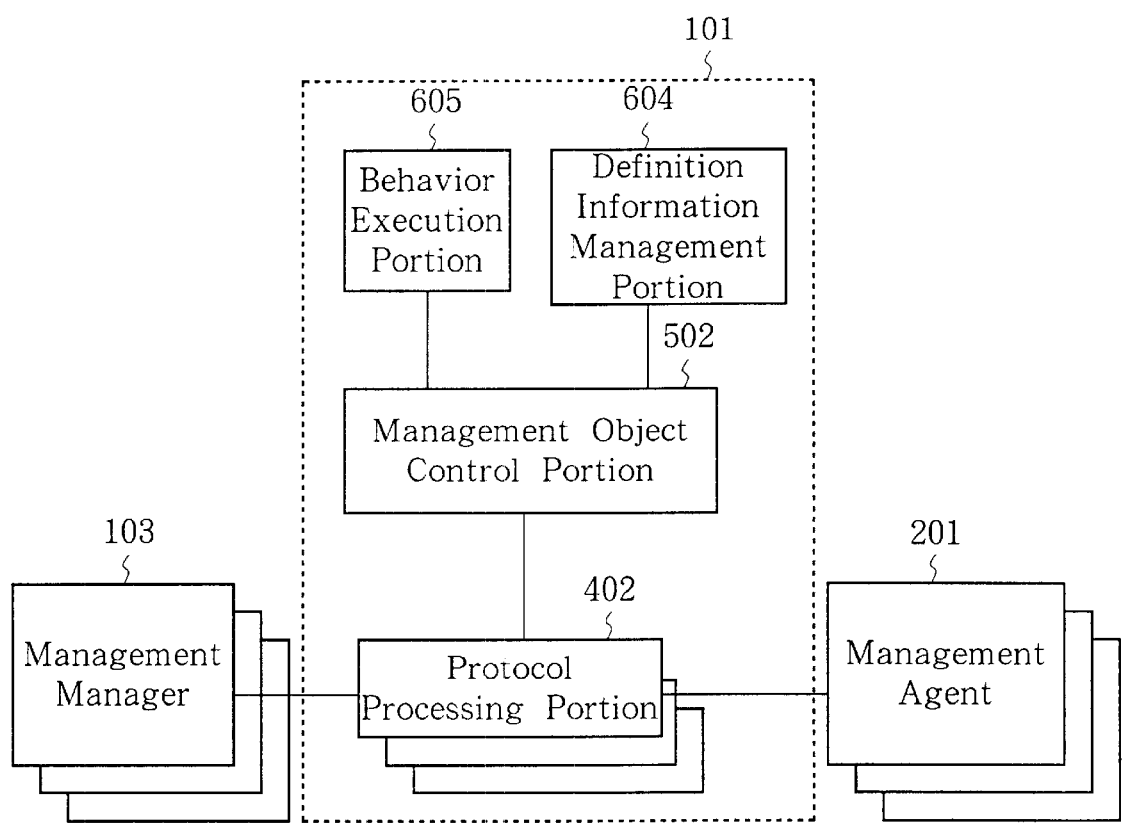
FIG. 6 is a block diagram showing another example of construction of the management system with object definition change function, together with the management manager and the management agent.

FIG. 6 is a block diagram showing another example of construction of the management system 101 with object definition change function, together with the management manager 103 and the management agent 201. The management system 101 is constructed with a definition information management portion 604, a behavior execution portion 605, a managed object control portion 502 and a protocol processing portion 402.

The definition information management portion 604 holds a definition information of a managed object obtained by logically abstracting a practical subject to be managed, such as a transmission device, references/updates the definition information in response to a reference/update request of definition information and, in the case of the update, notifies a result of update to the related managed object control portion 502.

The behavior execution portion 605 stores a behavior program, activates/executes the behavior program according to a request from the managed object control portion 502 and sends a result of the processing to the managed object control portion 502. The behavior program is a program which describes one or more operation with respect to one or more managed objects managed by the management agent or the management system correspondingly to the attribute, notice and action of the managed object so that an update, addition and/or deletion is possible without interruption of the system operation.

The managed object control portion 502 receives a request message of management operation, divides it to operations in managed object unit, determines whether an operation request is to be made to the behavior execution portion 605 every managed object unit operation or an operation request is to be made to the management agent 201 by utilizing the protocol processing portion 402, and, when the operation request is to be made to the management agent 201, determines a processing portion of a plurality of protocol processing portions 402 which is to be utilized and controls such that all processing are executed on the basis of the two phase commitment control.

The protocol processing portion 402 performs an exchange of a request message and a response message according to a communication procedure (protocol) determined with respect to the management manager and the management agent.

Figure 7:
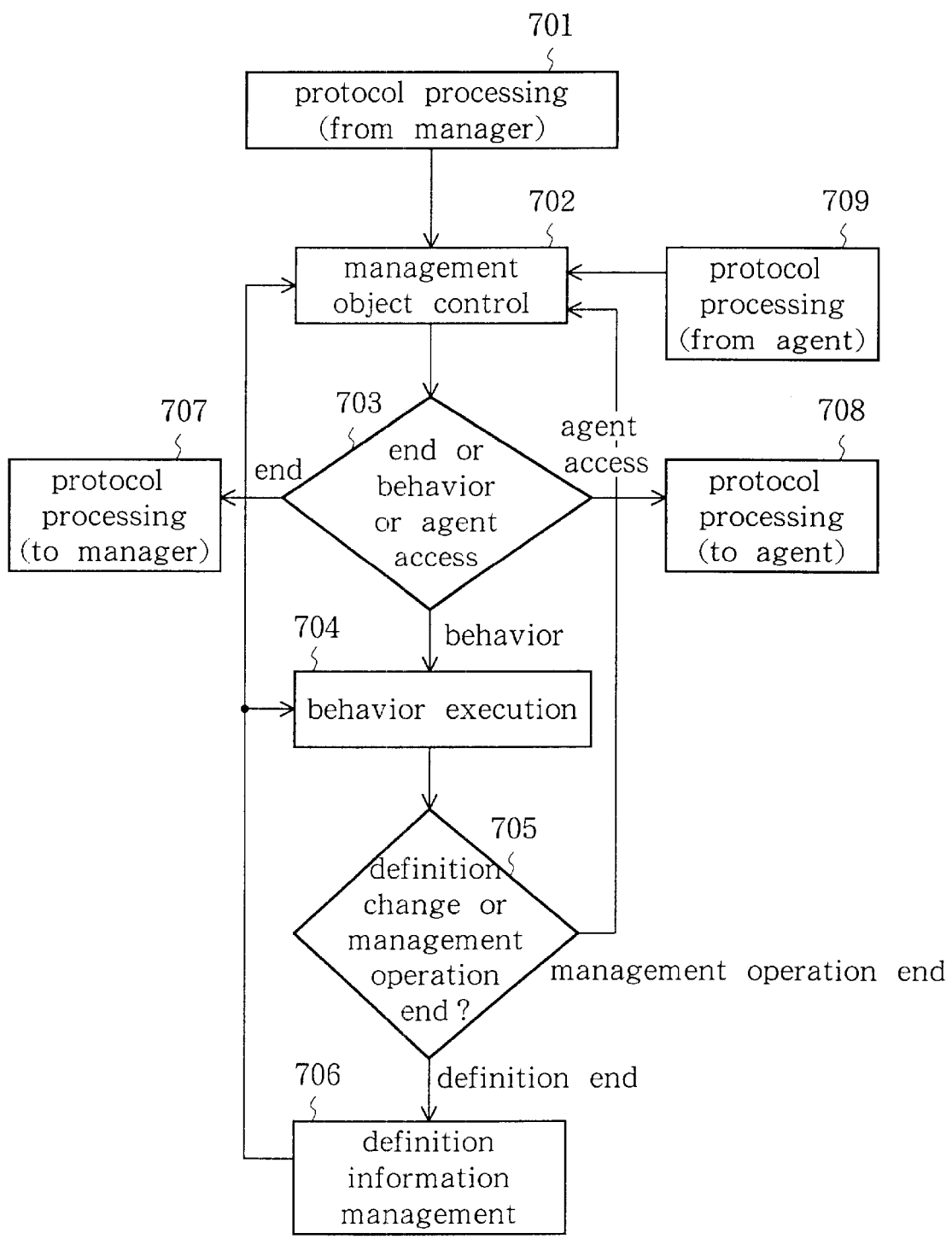
FIG. 7 is a flowchart showing a processing of the management system with object definition change function.

FIG. 7 shows a process flow of the management system 101 with object definition change function. In response to a management operation request from the management manager 103, the protocol processing portion 402 analyses it (step 701). Then, an execution of the received management operation request is started by the managed object control portion 502 (step 702). Further, it is determined whether the instructed operation request is an end, a start of the behavior program or an access to the management agent, and the operation is jumped to a step 707 when it is the end, to a step 704 when it is the start of the behavior program and to a step 708 when it is the access to the management agent (step 703). Further, in order to start the behavior program, the managed object control portion 502 calls the behavior execution portion 605 and the behavior execution portion 605 starts the execution (step 704). Further, when the definition change operation of the managed object is described in the behavior program, the operation is shifted to a step 706 and, when an operation to other managed objects or all operations are ended, the operation is shifted to the step 702 (step 705). The definition information management portion 604 updates the definition information and notifies the changed information to the managed object control portion 502 (step 706). When a managed object which is a subject to be managed is stored in the management agent 201, the managed object control portion 502 selects an appropriate protocol processing portion 402 and an operation request is sent thereto (step 708). The management agent 201 sends a response to the operation request in the step 708 to the selected protocol processing portion (step 709). Finally, the protocol processing portion 402 transmits a result of the processing to the management manager 103 (step 707).

As described, since, in the construction shown in FIG. 6, the definition information management portion 604 receives the definition update/addition processing and notifies the definition data and the behavior program to the managed object control portion 502 storing the managed objects, it is possible to perform the addition/update of the definition of the managed object and the behavior without interruption of the system operation. Further, since it has a function of analyzing the management operation received by the managed object control portion 502 and a plurality of managed objects which are subjects to be managed are identified, it is possible to execute, as the behavior program, both the management operation in managed object unit and the lump management operation of a plurality of managed objects. Further, since the managed object control portion 502 is constructed such that it has the execution management function based on the two phase commitment control, the consistent management operation can be executed. Furthermore, since the behavior execution portion 605 activates the behavior program in response to a request only when it is necessary, the management operation can be executed with minimum memory capacity.

A concrete embodiment of the present invention will be described.

Figure 8:
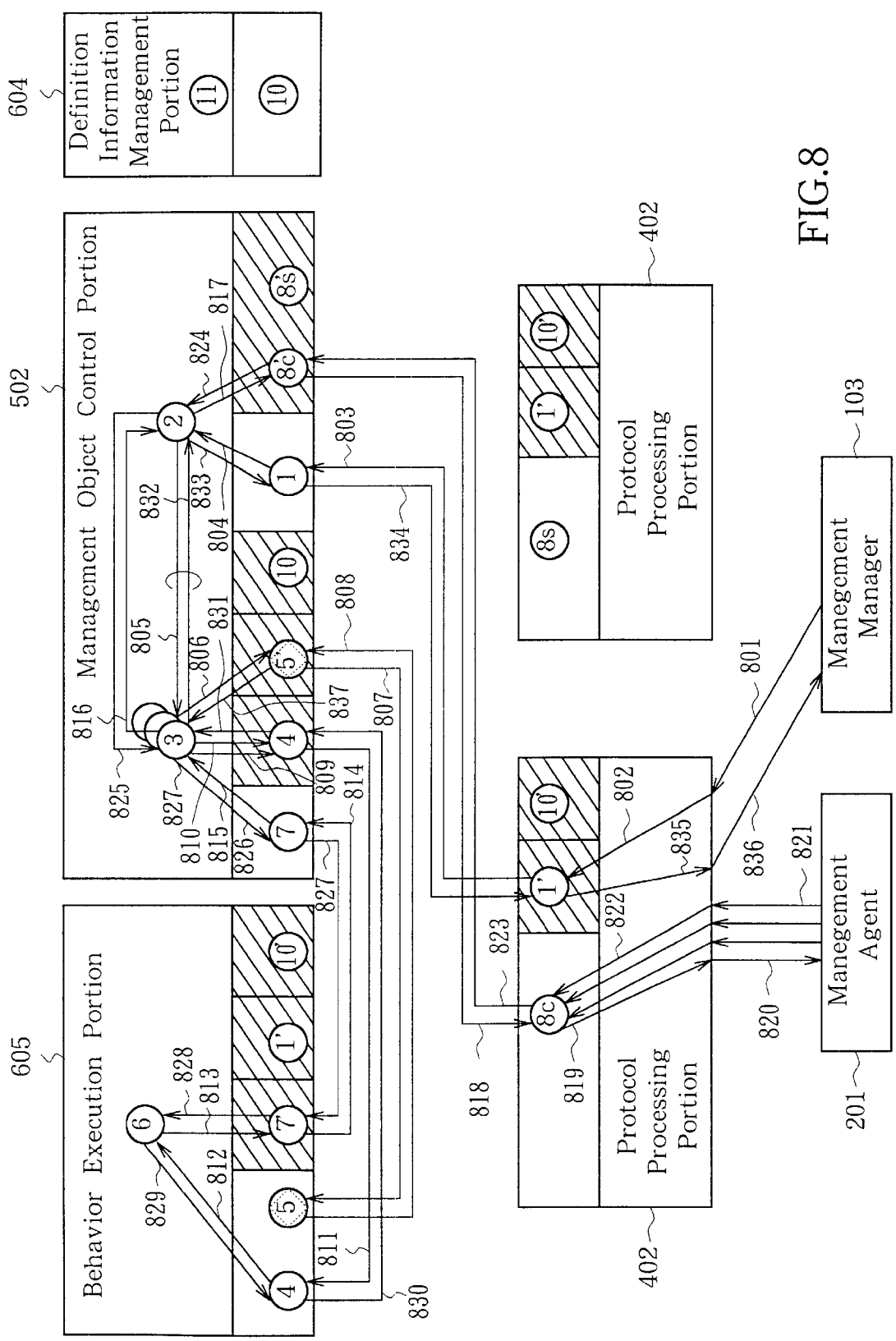
FIG. 8 is a detailed block diagram showing the construction shown in FIG. 6.

FIG. 8 shows the construction shown in FIG. 6 in more detail. In this embodiment, the management system 101 with object definition change function is constructed with the behavior execution portion 605, the managed object control portion 502, the definition information management portion 604 and the protocol processing portion 402. In FIG. 8, the CORBA object which is the interface for the mutual operations between the respective modules is represented by a circle. Although, as the protocol processing portion shown in FIG. 4, the management protocol SNMP which is used widely in the management system of the Internet is shown together with the management protocol CMIP, only the case where the CMIP which is widely used in the management system of the basic network is utilized in the protocol processing portion will be described in FIG. 8.

First, a case where there is a request from the management manager 103 to acquire the management information will be described.

The protocol processing portion 402 receives the management information acquisition request from the management manager 103 (step 801). The protocol processing portion 402 notifies the management information acquisition request to the interface object 1 of the managed object control portion 502 (steps 802, 803).

The managed object control portion 502 activates an operation 2 on the basis of the management information acquisition request (step 804). The operation object 2 identifies a managed object 3 which is a subject to be operated and is instructed in the management information acquisition request and starts to execute it (step 805). In order to identify a behavior program 6 which is necessary to acquire the management information, the managed object 3 performs an identification request to an interface object 5' (step 806). The interface object 5' performs a reference acquisition request of the behavior program 6 to be activated to the interface object S mounted on the behavior execution portion 605 (step 807). The interface object 5 sends a reference of the interface object 4 corresponding to the behavior program 6 assigned by a name or an identifier to the managed object 3 (steps 808, 837). The managed object 3 generates an interface object 4' for communication with the interface object 4, on the basis of the reference of the interface object 4 (step 809). The managed object 3 accesses the behavior program 6 existing in the behavior execution portion 605 by utilizing the interface objects 4' and 4 (steps 810, 811 and 812). In a case where operations to other managed objects 3 are necessary, the behavior program 6 performs an operation request by utilizing an interface object 7' of the behavior execution portion 605 and an interface object 7 of the managed object control portion 502 (steps 813, 814 and 815).

When a plurality of other managed objects are assigned, the managed object control portion 502 executes operations simultaneously by activating a thread a plurality of times. When other managed objects 3 are held in the management agent 201, a new operation object 2 is activated in order to process the received operation request (step 816).

The new operation object 2 performs an operation request to the management agent 201 by utilizing an interface object 8c' of the managed object control portion 502 and an interface object 8c of the protocol processing portion 402 (steps 817, 818, 819 and 820).

The management agent 201 which receives the operation request performs a requested processing and sends a result thereof to the protocol processing portion 402 as a response. When there are a plurality of responses, the protocol processing portion 402 gathers all of the response data together (step 821).

The response from the management agent 201 is transmitted to the operation object 2 by utilizing the interface object 8c of the protocol processing portion 402 and the interface object 8c' of the managed object control portion 502 (steps 822, 823 and 824). The operation object 2 notifies to the managed object 3 from which the request is sent of the received response data (step 825). In order to return the notified response data to the behavior program 6, the managed object 3 notifies the interface object 7 of the data (step 826). In a case where the thread is operated at a plurality of times in the steps 813, 814 and 815, the interface object 7 waits for a completion of all thread operation and returns a result of all processing to the behavior program 6 from which the request was sent (steps 827 and 828).

When the behavior program 6 completes all processing, it notifies the managed object 3 by which the activation was performed of the result of execution by utilizing the interface object 4 of the behavior execution portion 605 and the interface object 4' of the managed object control portion 502 (steps 829, 830 and 831). The execution result of a plurality of managed objects 3 is returned to the operation object 2 by which the activation was performed (step 832). The operation object 2 transmits the received result of processing to the management manager 103 as a response to the management information acquisition request by utilizing the interface object 1 of the managed object control portion 502 and the interface object 1' of the protocol processing portion 402 (steps 833, 834, 835 and 836).

A case where there is a request of management information update from the management manager 103 will be described next. When the protocol processing portion 402 receives the management information update request from the management manager 103 (step 801), the protocol processing portion 402 notifies the interface object 1 of the managed object control portion 502 of the management information change request (steps 802 and 803).

The managed object control portion 502 activates the operation object 2 on the basis of the management information change request (step 804) and performs an operation similar to the case of the management information acquisition request (steps 804 and 831). Since, in this case, the processing is not defined, it is necessary to prepare a backup in order that the state of the managed object before this operation can be recovered (recovery processing). When it is confirmed that a result of execution of all of a plurality of managed objects 3 is successive, the confirmation processing of the operation is performed in a similar sequence to the steps 804 to 831 (step 832). In a case where the management information update request includes an assignment of a synchronous processing and there is any unsuccessful result of execution results of a plurality of managed objects 3, the recovery processing for all operations is performed in a similar sequence to that of the steps 804 to 831. When the management information update request includes an assignment of the optimal processing and there is any unsuccessful result of execution results of a plurality of managed objects 3, the confirmation processing is performed for the successful operations and the recovery processing is performed for the unsuccessful operation in a similar sequence to the steps 804 to 831. The operation object 2 transmits the received processing result to the management manager 103 as a response to the management information update request, by utilizing the interface object 1 of the managed object control portion 502 and the interface object 1' of the protocol processing portion 402 (steps 833, 834, 835, 836).

An operation of the system when a notice from the management agent 201 is received will be described.

The management agent 201 notifies the protocol processing portion 402 of a change of state of a subject to be managed and/or a generation of fault by utilizing the management protocol CMIP (steps 821 and 822). The protocol processing portion 402 notifies the managed object control portion 502 of the received notice information by utilizing an ORB (Object Request Broker) (step 823).

In the managed object control portion 502, the interface object 8c' receives the notice from the protocol processing portion 402 and activates the operation object 2 (step 824). The operation object 2 identifies the managed object 3 related to the notice information and activates it, and, if an activation of the behavior program is necessary, the operation object 2 generates the interface object 7 (steps 805, 826). The managed object 3 requests an execution of the behavior program 6 held in the behavior execution portion 605 by utilizing the interface object 7 (steps 827, 828). When it is judged by the execution of the behavior program 6 that a notice to the management manager 103 is necessary, the notice is sent through the managed object 502 and the protocol processing portion 402 (steps 829, 830, 831, 832, 833, 834, 835 and 836). When a massage for the notice is a confirmation type, the management manger 103 performs a confirmation of notice with respect to the protocol processing portion 402 (step 801).

Figure 9:
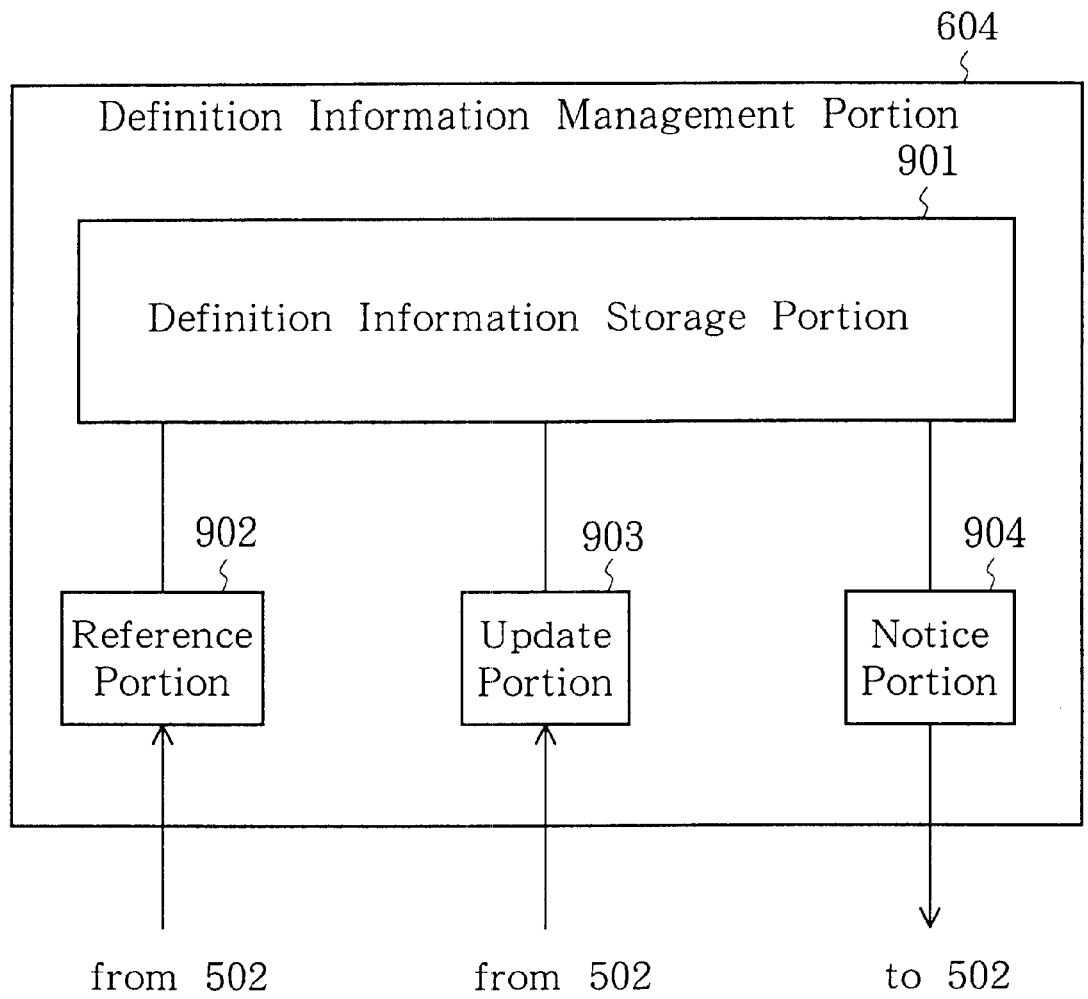
FIG. 9 is a block diagram showing an example of construction of the definition information management portion.

FIG. 9 is a block diagram showing an example of construction of the definition information management portion 604. The definition information management portion 604 is constructed with a definition information storage portion 901, a reference portion 902, an update portion 903 and a notice portion 904. The definition information storage portion 901 stores attributes, notices and kind of actions of managed objects and a definition information related to data structure. The reference portion 902 accesses a definition information requested from the definition information storing portion 901 on the basis of a reference request to the definition information and transmits it as a response. The update portion 903 receives an update request to the definition information, executes an update of the requested definition information with respect to the definition information storing portion 901 on the basis of the update request and transmits a result of execution as a response. The notice portion 904 sends the information of the definition information update by the update portion 903 to the managed object control portion 502.

Figure 10:
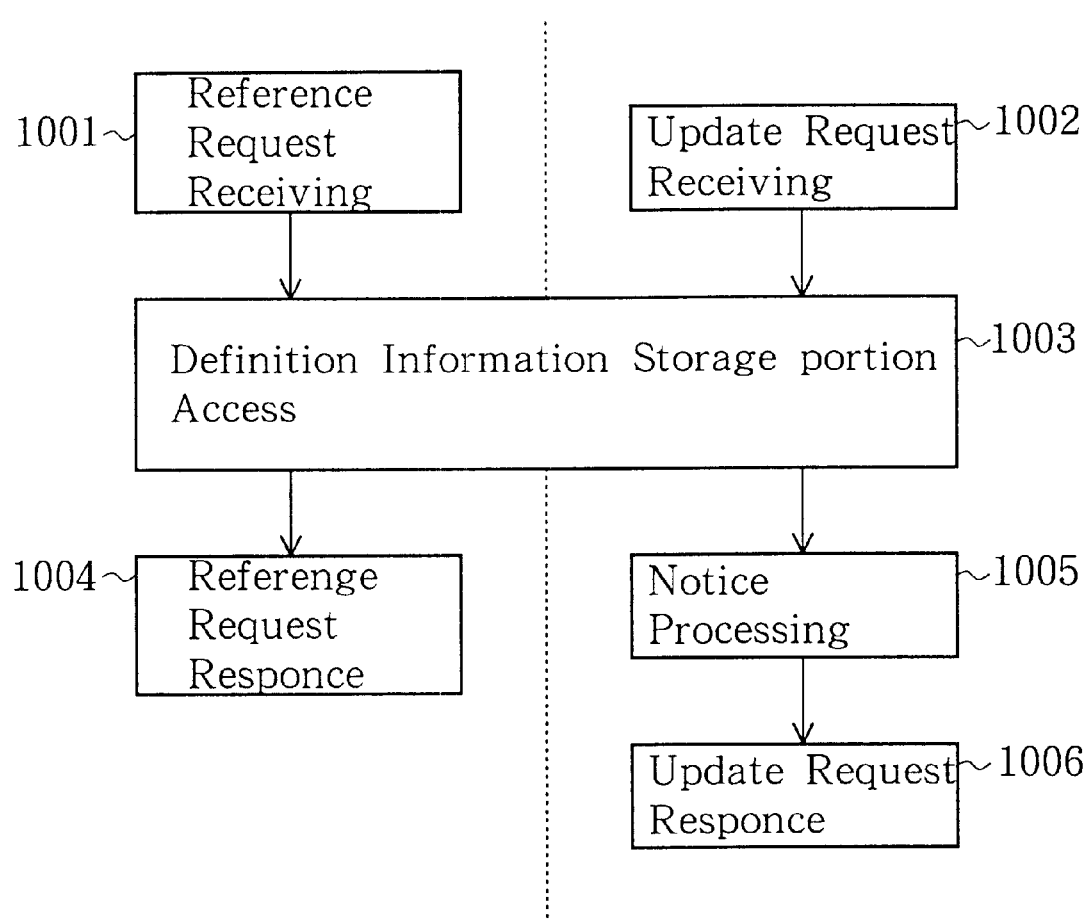
FIG. 10 is a flowchart showing an operation of the definition information management portion.

FIG. 10 is a flowchart showing an operation of this definition information management portion 604. In this flowchart, the reference portion 902 receives the reference request of the definition information of managed objects (step 1001). Then, the update portion 903 receives the definition change/addition request of managed objects (step 1002). Further, the reference portion 902 or the update portion 903 accesses the definition information storage portion 901 (step 1003). Further, the reference portion 902 sends a result of reference to the originator of the request (step 1004). Further, the notice portion 904 is activated by the update processing of the management information definition and notifies the managed object control portion 502 of the definition change information and the behavior program (step 1005). Finally, the update portion 903 sends a result of processing of the notice portion 904 to the originator of the request (step 1006).

In this manner, since the update portion 903 updates the definition information of managed objects held in the definition information storage portion 901 and the notice portion 904 notifies the managed object control portion 502 which stores the managed objects of the updated definition information, it is possible to change the definition of the managed objects and behaviors without interrupting the system operation.

Figure 11:
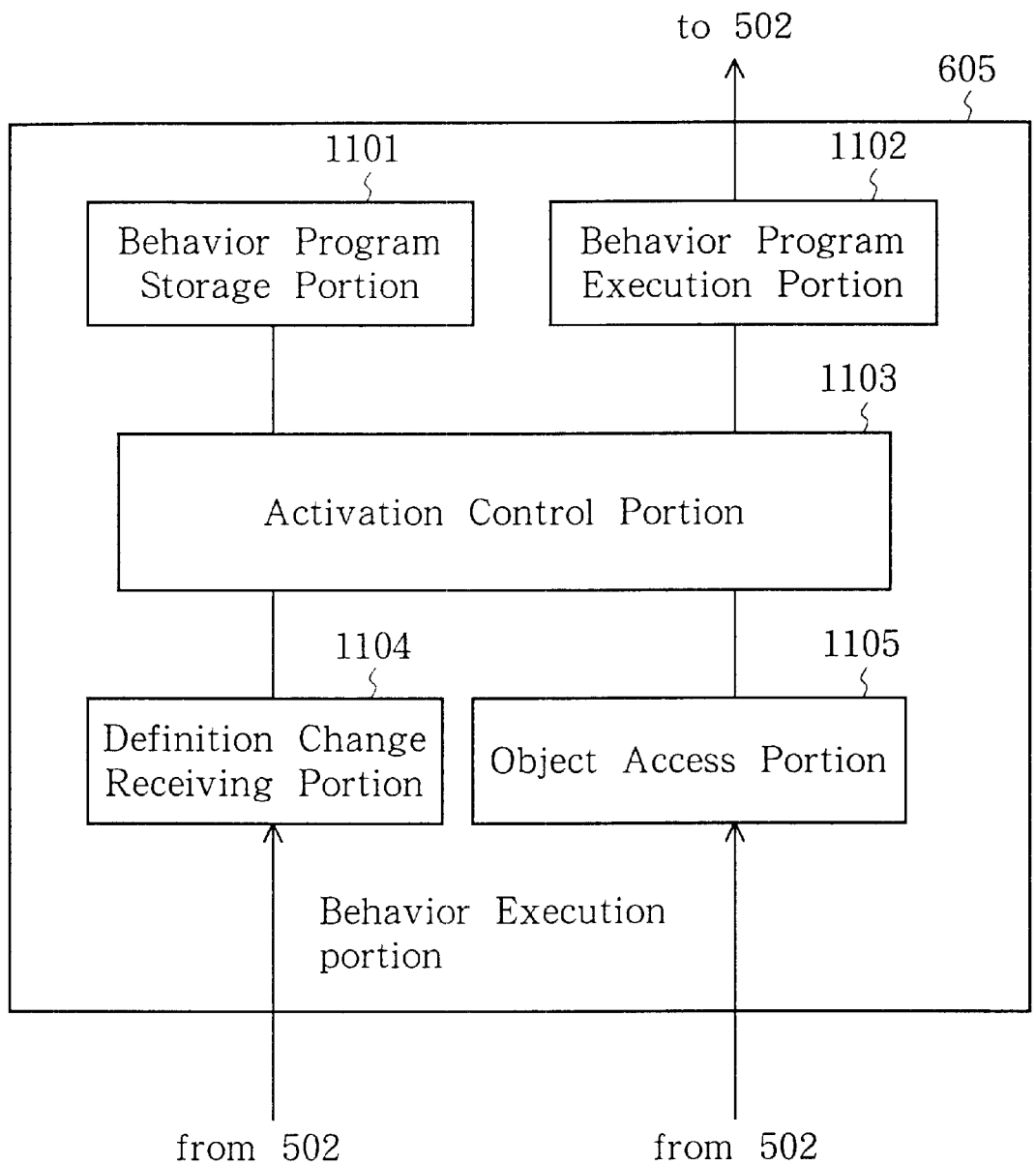
FIG. 11 is a block diagram showing an example of construction of a behavior execution portion.

FIG. 11 is a block diagram showing an example of the behavior execution portion 605. The behavior execution portion 605 is constructed with a behavior program storage portion 1101, a behavior program execution portion 1102, an activation control portion 1103, a definition change receiving portion 1104 and an object access portion 1105.

The behavior program storage portion 1101 describes one or more operations to one managed object or a group of a plurality of managed objects managed by the management agent or the system itself correspondingly to the attribute/notice/action of managed object and stores the behavior program whose update/addition/deletion can be performed without interrupting the system operation.

The behavior program execution portion 1102 is loaded with one or more behavior programs from the behavior program storage portion 1101 and executes it, performs a request of management operation execution to the managed object control portion 502 according to the description of the behavior program, monitors whether or not all operations are successful and performs a confirmation processing in a case of all successful or, otherwise, performs a cancellation processing.

The activation control portion 1103 monitors the activated behavior program, rewrites the behavior program after an end of the behavior program assigned with respect to a request from the definition change receiving portion 1104, requests, with respect to a request from the object access portion 1105, the behavior program execution portion 1102 of an abnormal end when the assigned behavior program is already activated or an execution of the assigned behavior program when it is not activated and sends a result of execution thereof.

The definition change receiving portion 1104 receives an information related to a definition change from the managed object control portion 502.

The object access portion 1105 receives a behavior program execution request from the managed object control portion 502.

Figure 12:
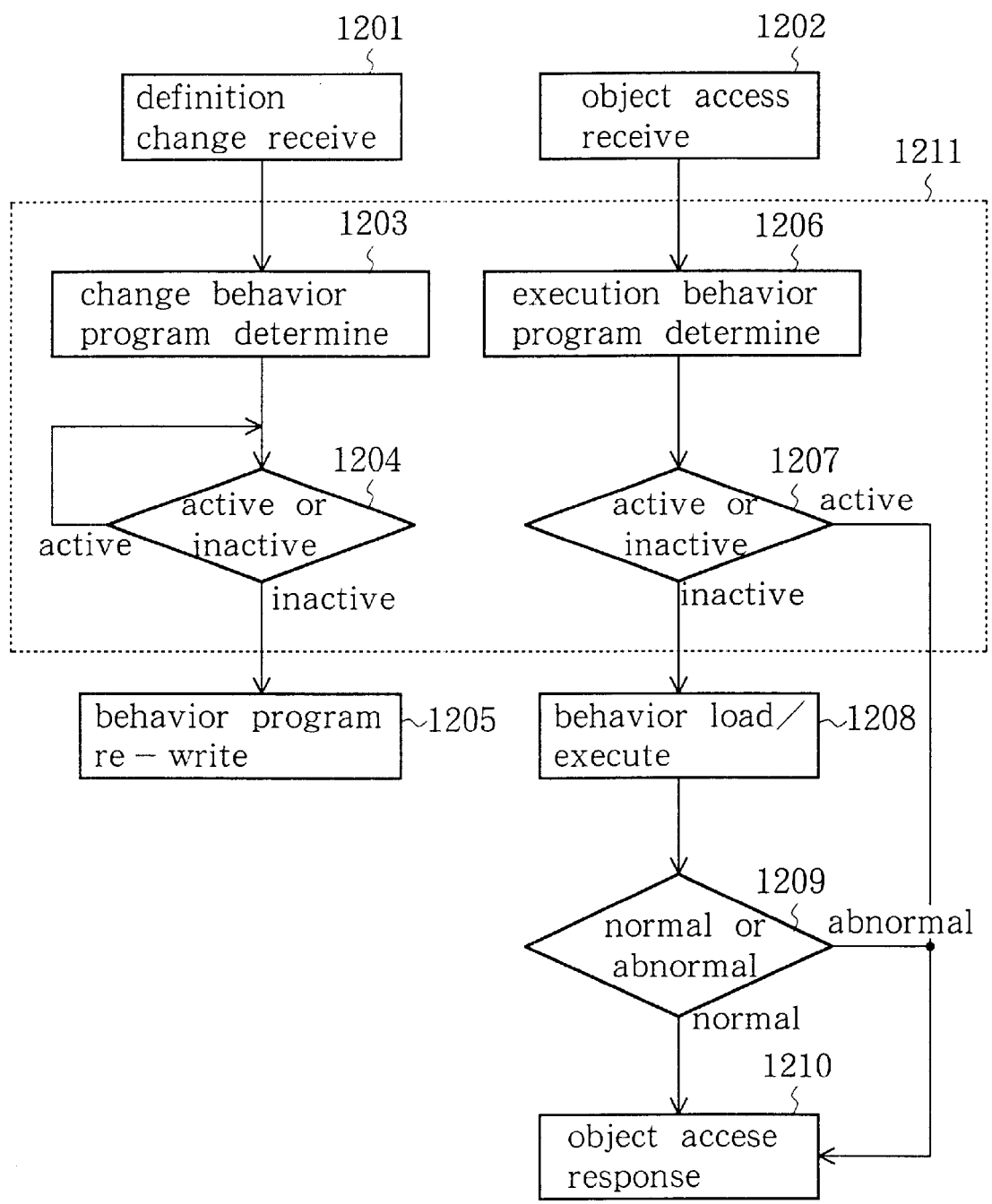
FIG. 12 is a flowchart showing an operation of the behavior execution portion.

FIG. 12 is a flowchart showing an operation of the behavior execution portion 605. First, the definition change receiving portion 1104 receives a definition change request from the managed object control portion 502 (step 1201). Then, the object access portion 1105 receives the behavior program execution request from the managed object control portion 502 (step 1202). Further, the activation control portion 1103 determines whether or not the behavior program which is a subject of the definition change is active (in operation) (step 1203). Further, in a case where the behavior program is already activated, the operation is held in a waiting state until the behavior program ends and is shifted to step 1205 only when it is inactive state (step 1204). Further, the activation control portion 1103 rewrites the behavior program of the behavior program storage portion 1101 (step 1205). Further, in response to the behavior program execution request, the activation control portion 1103 determines whether or not the requested behavior program is active (step 1206). Further, when the requested behavior program is in an active state, the processing is abnormally ended and shifted to step 1210. When it is in an inactive state, the processing is shifted to step 1208 (step 1207). Further, the activation control portion 1103 requests the behavior program execution portion 1102 of an execution of the behavior program and the behavior program execution portion 1102 loads the behavior program from the behavior program storing portion 1101 and executes it (step 1208). Further, it is confirmed whether or not the execution of the behavior program is successive and the processing is shifted to step 1210 (step 1209). Finally, the object access portion 1105 sends a result of execution of the behavior program to the originator of the request (step 1210).

Since the activation control portion activates a behavior program every time it receives the execution request and makes the behavior program inactive after the processing is ended in this manner, it is possible to execute the behavior program with minimum memory capacity. Further, since the activation control portion monitors an end of the behavior program under execution and the behavior program is updated after its execution is ended, it is possible to update the behavior program of the managed object.

Figure 13:
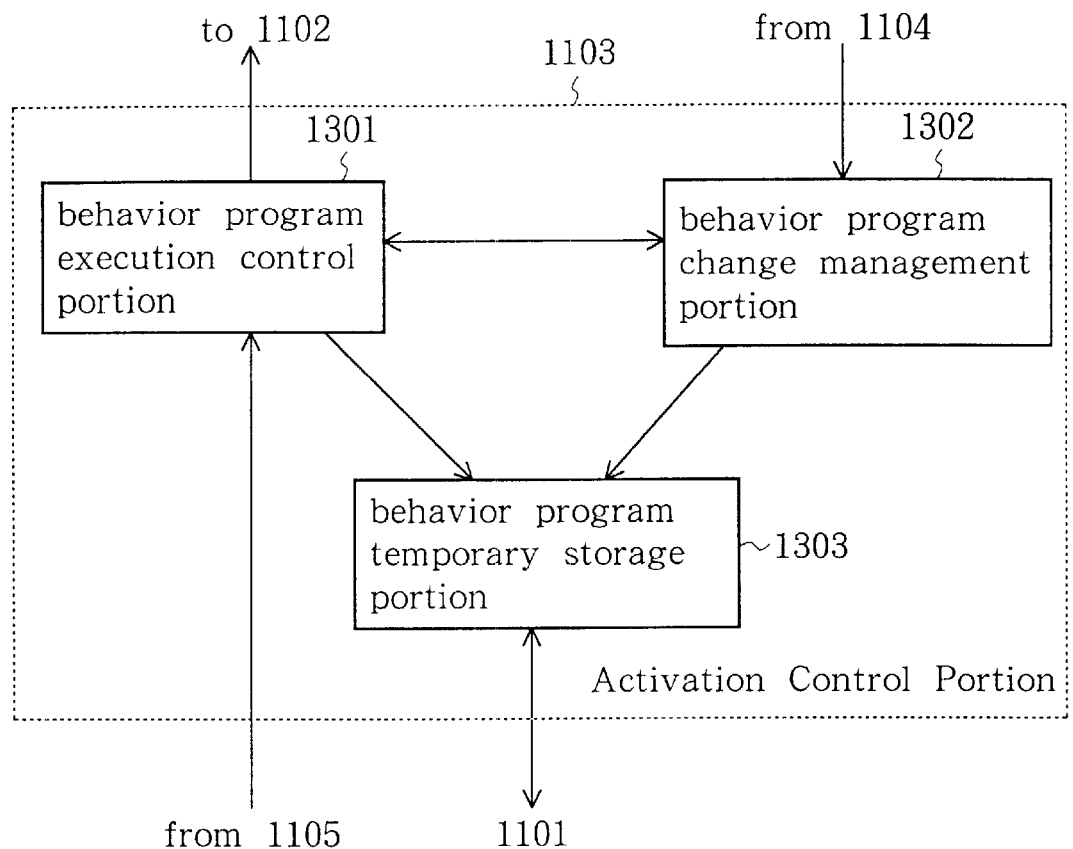
FIG. 13 is a block diagram showing an example of construction of an activation control portion.

FIG. 13 is a block diagram showing an example of the activation control portion 1103. The activation control portion 1103 comprises a behavior program temporary storage portion 1303 having a function of storing a behavior program and a behavior program state information, a behavior program execution portion 1301 having a function of activating the behavior program stored in the behavior program temporary storage portion 1303 and requesting the behavior program execution portion 1102 to execute the activated behavior program, a function of transmitting an update request of the behavior program to a behavior program change management portion 1302 (to be described later) when the behavior program execution portion 1102 erases a behavior program instance after an operation of the behavior program instance is ended, a function of performing a reference and update of a behavior program state information which is an information related to the behavior program stored in the behavior program temporary storage portion 1303 and a function of receiving a behavior program start request from the object access portion 1105 and transmitting a result of operation of the behavior program to the object access portion 1105, and a behavior program change management portion 1302 having a function of receiving the behavior program updated by the management manager from the definition change receiving portion 1104 and storing it in the behavior program storage portion, a function of adding and deleting the behavior program stored in the behavior program temporary storage portion 1303, a function of updating the behavior program state information and a function of holding and updating the behavior program update information which is an information related to the behavior program stored in the behavior program storage portion 1101.

FIG. 14 shows an example of the behavior program state information stored in the behavior program temporary storage portion 1303. The behavior program state information 1401 is constructed with behavior program names 1402 of all behavior programs currently stored in the behavior program temporary storage 1303, version numbers 1403 and update systems 1404 defined in the behavior programs as variables featuring the behavior programs, the number of instances 1405 indicative of the number of behavior program instances activated from their behavior programs and the number of references 1406 representing the number of references to the behavior programs. The update system represents a policy in a case where the behavior program is updated and there are three kinds of update system, a user definition system in which a management manager describing the behavior program defines the update processing of behavior program in the behavior program, a synchronous system in which the activation control portion 1103 replaces the behavior program by the latest behavior program after an end of all behavior program instances activated from the behavior program which is a subject for the update and an asynchronous system in which the latest version of the behavior program is activated every time the start of behavior program is requested.

Further, in order to exclusively control accesses to the respective policies from the behavior program execution control portion 1301 and the behavior program change management portion 1302, the behavior program state information 1401 is locked at a time of the respective accesses. There are three kinds of lock, a read-lock for inhibiting a read-out and allowing a write-in, a write-lock for inhibiting a write-in and allowing a read-out and an access-lock for inhibiting both a read-in and a write in.

FIG. 15 shows an example of a behavior program update information which is held and updated by the behavior program change management portion 1302. The behavior program update information 1501 is constructed with behavior program names 1502 of all behavior programs currently stored in the behavior program temporary storage portion 1101, version numbers 1503 defined in the behavior programs, date 1504 on which the behavior programs are stored in the behavior program storage portion 1101 and non-storage time period 1505 representing time periods in which the behavior programs are never stored in the behavior program temporary storage portion 1303 after updates. Since only the latest behavior program is stored in the behavior program storage portion 1101, the version number 1503 is always the latest version number. The non storage time period 1505 is a positive integer including 0 and indicates the number of periods in which behavior program is not stored in the behavior program temporary storage portion 1303 since the behavior program is updated. Incidentally, one period corresponds to an update interval for updating a behavior program stored in the behavior program temporary storage portion 1303 and the behavior program state information 1401.

A start and update of the behavior program and an update of the behavior program temporary storage portion 1303 will be described in more detail.

First, the start of the behavior program will be described with reference to FIGS. 16 to 26.

Figure 16:
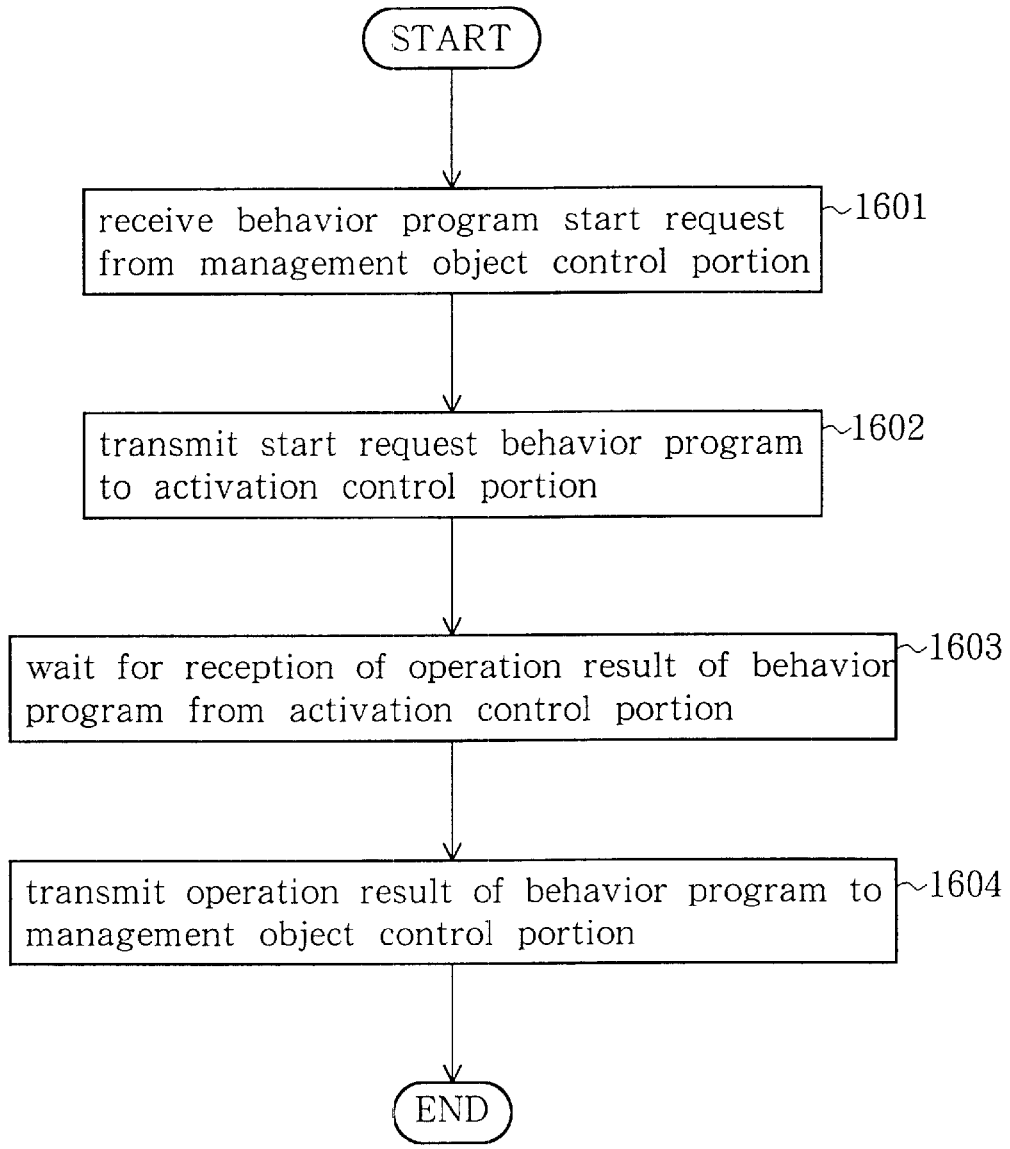
FIG. 16 is a flowchart of an operation of the object access portion at an activation of the behavior program.

FIG. 16 is an operation flow of the object access portion 1101 at a time of start of the behavior program. It is assumed that, as a result of the step 703 shown in FIG. 7, the object access portion 1101 receives a behavior program start request from the managed object control portion 502 (step 1601). At this time, the name of the behavior program to be started and parameters necessary for operating the behavior program are sent from the managed object control portion 502. Then, the behavior program start request is transmitted to the activation control portion 1103 (step 1602) and the processing enters into a waiting state for receiving a result of operation of the behavior program from the activation control portion 1103 (step 1603). Thereafter, the result of operation of the behavior program is transmitted to the managed object control portion 502 (step 1604).

Figure 17:
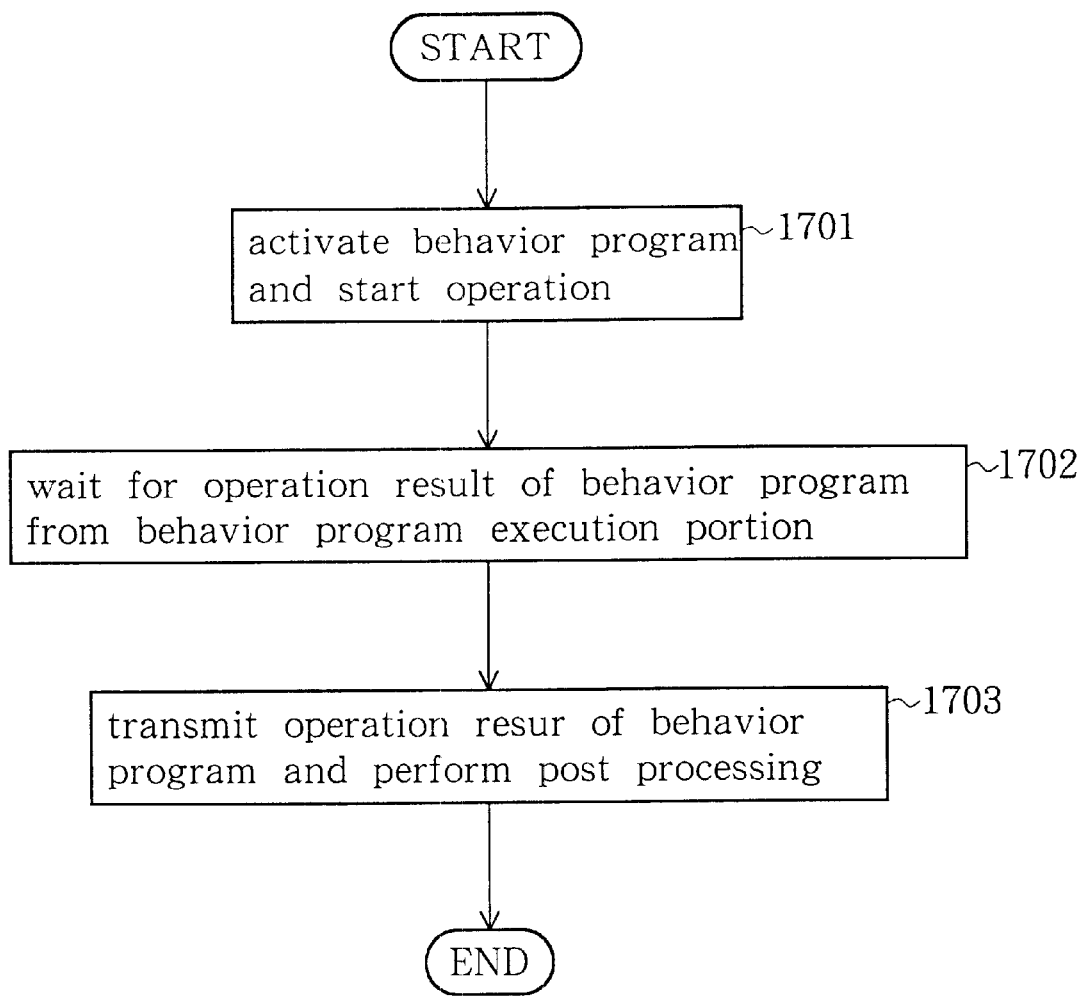
FIG. 17 is a flowchart of an operation of the object access portion at the activation of the behavior program.

FIG. 17 shows the operation flow of the activation control portion 1103 subsequent to the step 1602 shown in FIG. 16. The activation control portion 1103 activates and starts to operate the behavior program whose start is requested (step 1701).

Figure 18:
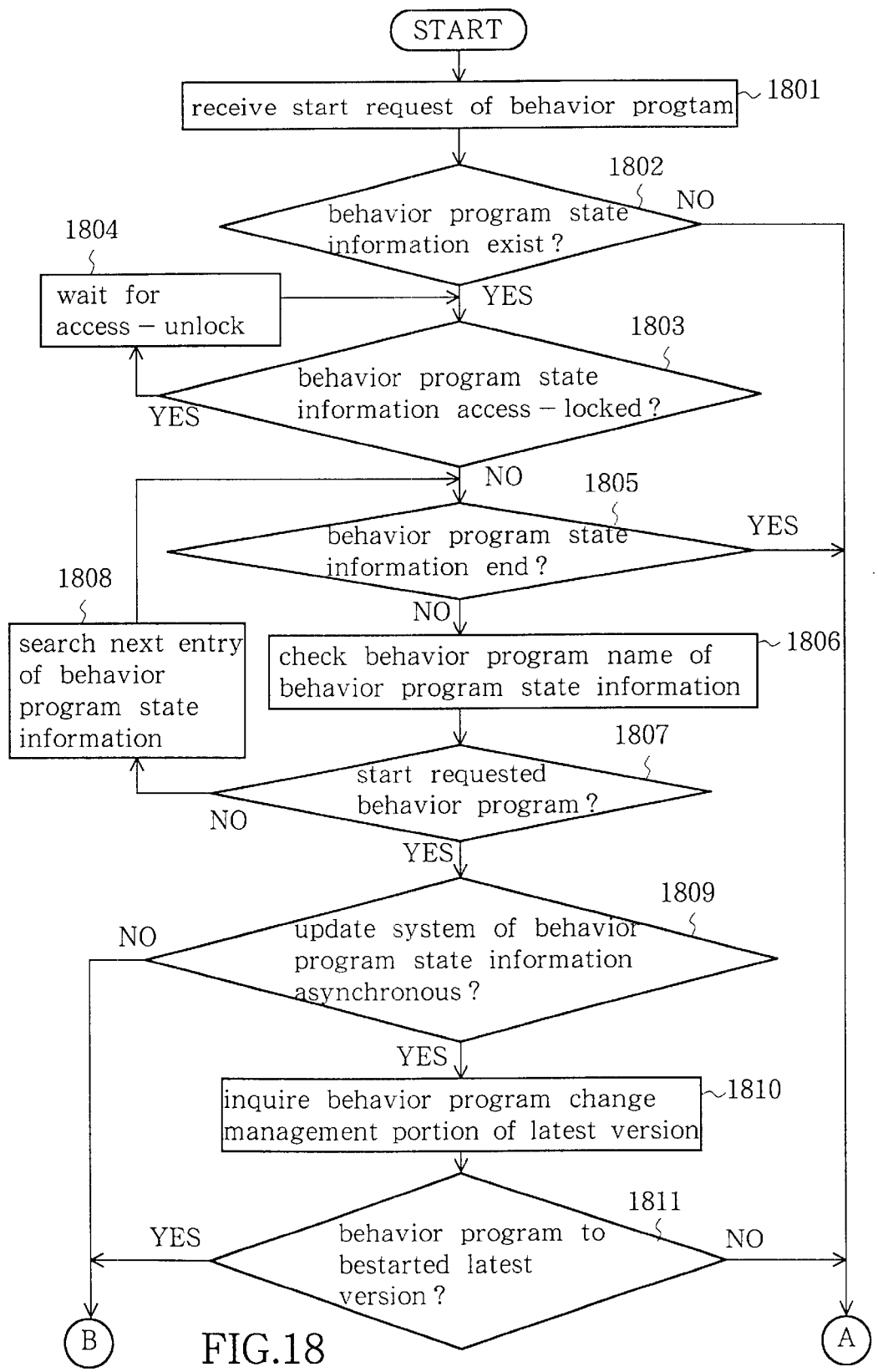
FIG. 18 is a flowchart showing a portion of an operation for starting a behavior program whose activation is requested and starting its operation, in detail.
Figure 19:
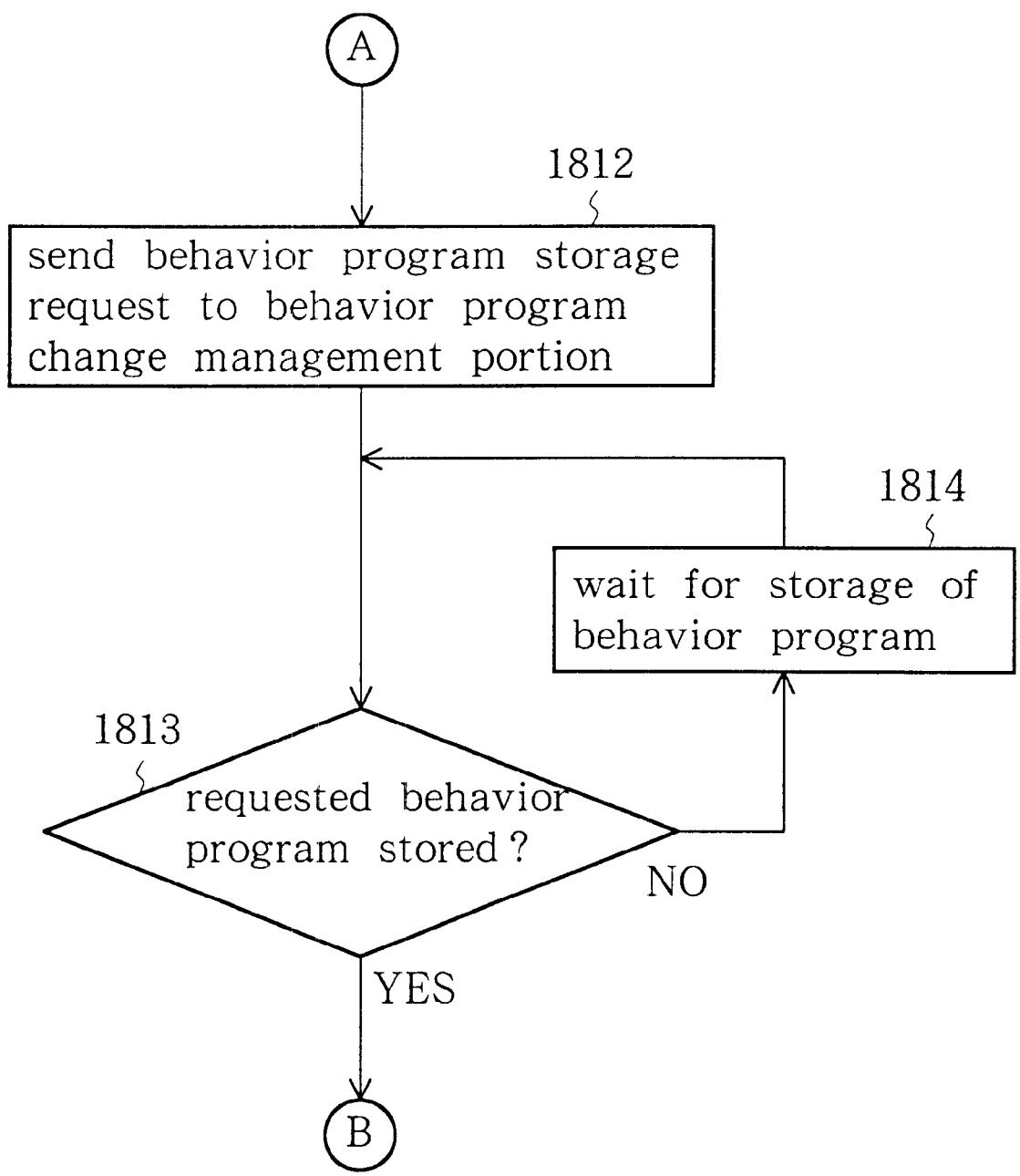
FIG. 19 is a flowchart showing a portion of an operation for starting a behavior program whose activation is requested and starting its operation, in detail.
Figure 20:
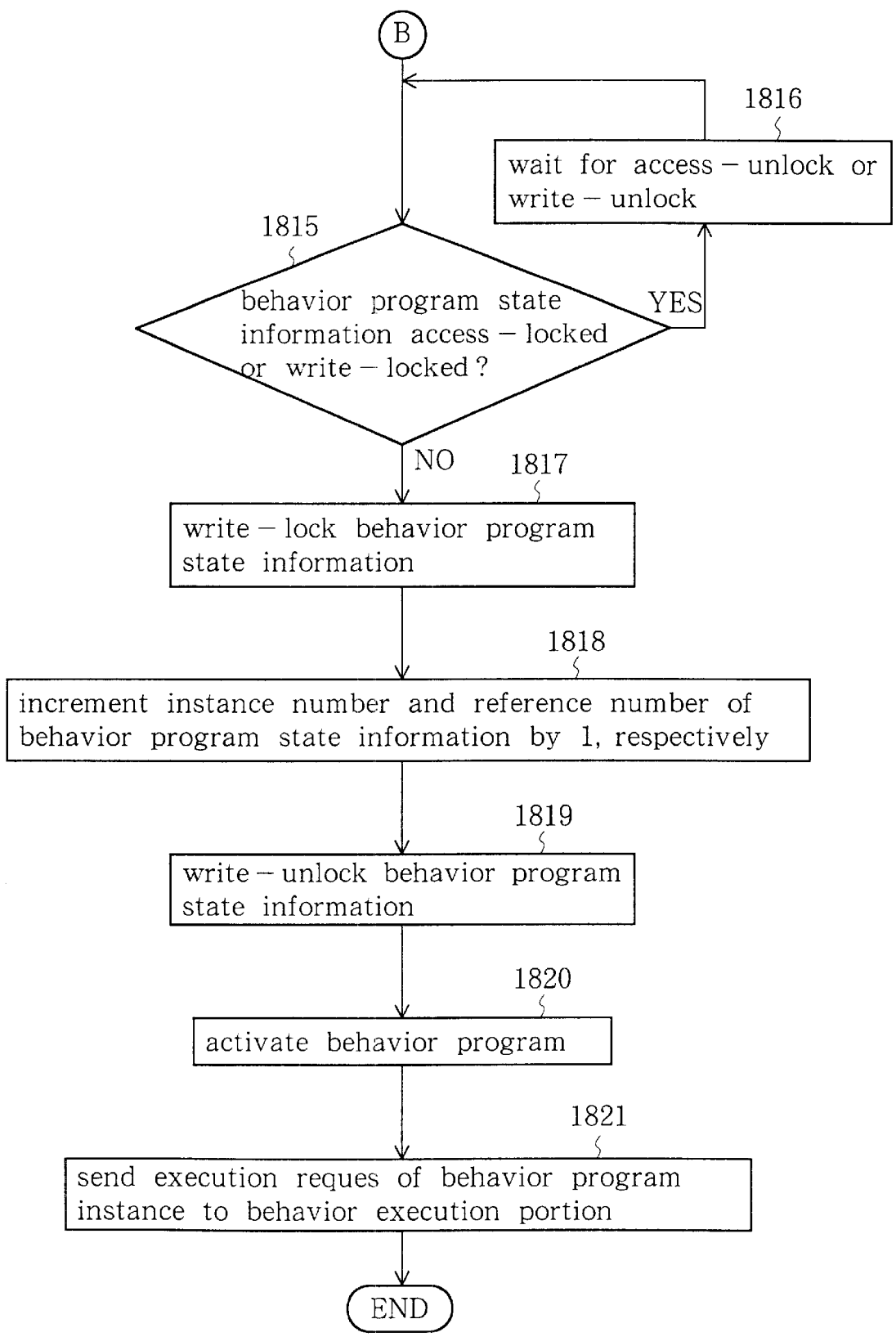
FIG. 20 is a flowchart showing a portion of the operation for starting the behavior program whose activation is requested and starting its operation, in detail.

FIGS. 18 to 20 show the operation flow in the step 1701 shown in FIG. 17, in which the operation to be executed by the behavior program execution control portion 1301 in the activation control portion 1103 is shown. The behavior program execution control portion 1301 receives the behavior program start request from the object access portion 1105 (step 1801). In this case, the behavior program start request from the object access portion 1105 includes the name of the behavior program to be started and parameters necessary to operate the behavior program. Then, it is checked whether or not the behavior program state information 1401 exists in the behavior program temporary storage portion 1303 (step 1802). When the behavior program state information 1401 exists in the behavior program temporary storage portion 1303, it is checked whether or not the behavior program state information 1401 is access-locked (step 1803). When the behavior program state information is access locked, the operation waits until the access-lock is released (step 1804). Thereafter, the operation is repeated from the step 1803. When the behavior program state information is access-unlocked, it is checked whether or not the portion accessed is an end of the behavior program state information 1401 (step 1805). When it is not the end of the behavior program state information 1401, the behavior program name received in the step 1801 is compared with the behavior program name 1402 of the entry of the behavior program state information 1401 (step 1806). On the basis of the step 1806, it is checked whether or not the behavior program of the entry compared in the step 1806 is the behavior program whose start is requested (step 1807). When the behavior program name of the entry compared in step 1806 is not the name of the behavior program whose start is requested, a next entry of the behavior program state information 1401 is searched (step 1808). Thereafter, the operation is repeated from the step 1805. When the behavior program name 1402 of the compared entry is the name of the behavior program whose start is requested, it is checked whether or not the update system 1404 of that entry is asynchronous (step 1809). When the update system 1404 of that entry is asynchronous, the latest version number of the corresponding behavior program is referred to the behavior program change management portion 1302 (step 1810).

Figure 21:
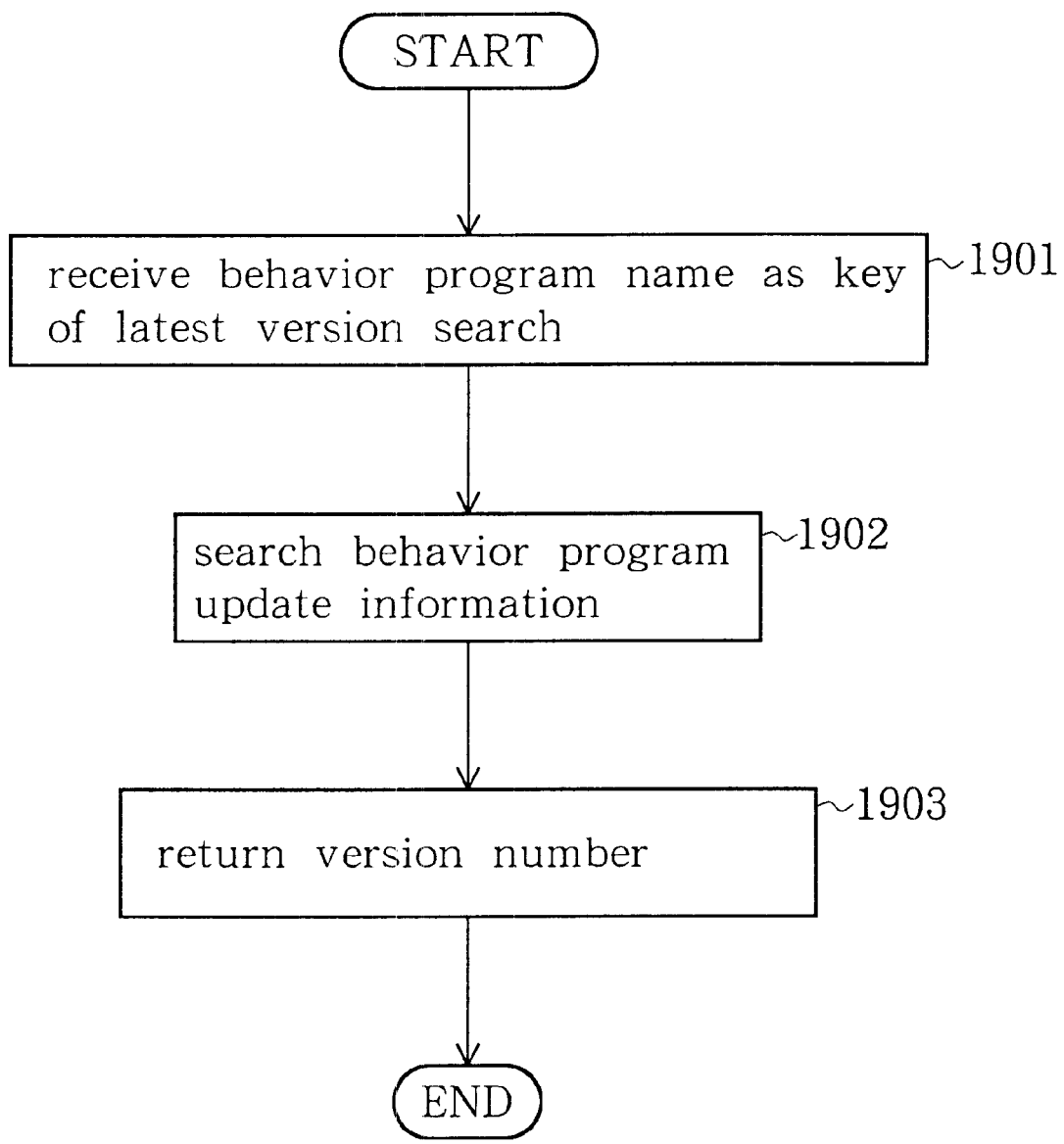
FIG. 21 is a flowchart showing an operation of the behavior program change management portion with respect to an inquiry of the newest version number of behavior program.

The operation flow of the behavior program change management portion 1302 with respect to this inquiry is shown in FIG. 21. When the behavior program change management portion 1302 receives, from the behavior program execution control portion 1301, the name of the behavior program whose latest version is searched (step 1901), the behavior program name 1502 of the behavior program update information 1501 and the entry of the requested behavior program is searched (step 1902). Then, the version number 1503 in the entry related to the search requested behavior program is returned to the behavior program execution control portion 1301 (step 1903).

The operation of the behavior program execution control portion 1301 will be described with reference to FIGS. 18 to 20 again. Subsequent to the step 1810, the latest version of the behavior program from the behavior program change management portion 1302 is compared with the version number 1403 of the corresponding entry of the behavior program state information 1401 to check whether or not the behavior program stored in the behavior program temporary storage portion 1303 is the latest version (step 1811).

When, as a result of the step 1802, the behavior program state information 1401 does not exist in the behavior program temporary storage portion 1303 or when, as a result of the step 1805, the portion accessed is the end of the behavior program state information 1401 or when, as a result of the step 1811, the behavior program stored in the behavior program temporary storage portion 1303 is not the latest version, a storage request of the behavior program whose start is requested in the behavior program temporary storage portion 1303 is sent to the behavior program change management portion 1302 (step 1812). In this case, the name of the behavior program to be stored in the behavior program temporary storage portion 1303 to the behavior program change management portion 1302.

The operation flow of the behavior program change management portion 1302 in this case will be described with reference to FIGS. 22 and 23. First, the behavior program change management portion 1302 receives the behavior program storage request from the behavior program execution control portion 1301 (step 2001). In this case, the name of the behavior program to be stored in the behavior program temporary storage portion 1303 is handed. Thereafter, it is checked whether or not the behavior program state information 1401 exists in the behavior program temporary storage portion 1303 (step 2002).

When there is no behavior program state information 1401 in the behavior program temporary storage portion 1303, a frame of the behavior program state information 1401 is newly produced (step 2003). Thereafter, the frame of the behavior program state information 1401 produced in the step 2003 is access-locked (step 2004).

When it is decided in the step 2002 that there is the behavior program state information 1401 in the behavior program temporary storage portion 1303, it is checked whether or not the behavior program state information 1401 is access-locked or write-locked (step 2005). When the behavior program state information 1401 is access-locked or write locked, the operation enters into a waiting state until the access-lock or the write-lock is released (step 2006). Thereafter, the operation is repeated from the step 2005. When it is decided in the step 2005 that the behavior program state information 1401 is not access-locked or write-locked, the behavior program state information 1401 is access locked (step 2007).

Then, it is checked whether or not there is an old version of the behavior program whose storage is requested in the behavior program temporary storage portion 1303 (step 2008). This processing is executed by comparing the name of the behavior program stored in the behavior program temporary storage portion 1303 with the name 1402 of the behavior program of the behavior program state information 1401. When it is decided in the step 2008 that the old version of the behavior program whose storage is requested in the behavior program temporary storage portion 1303, it is checked whether or not the instance number 1405 of that entry of the behavior program state information 1401 is 0 (step 2009). When, in the step 2009, the instance number 1405 of that entry of the behavior program state information 1401 is 0, that entry is deleted from the behavior program state information 1401 and further that behavior program is deleted from the behavior program temporary storage portion 1303 (step 2010). When it is decided in the step 2009 that the old version of the behavior program whose storage is requested exists in the behavior program temporary storage portion 1303, the name of the old version behavior program is changed (step 2011). For example, assuming that the name of the behavior program currently stored in the behavior program temporary storage portion 1303 is vpT-TPBidirectional and the version number 1403 of the behavior program state information is 971205, the name of the behavior program after changed becomes vpTTBidirection-971205. The working performed in the step 2011 is to change the name of the behavior program stored as a file and to change the behavior program name 1402 in that entry of the behavior program state information 1401.

A reference pointer to the behavior program in the behavior program instance produced by activating the old version behavior program is changed such that it points the behavior program whose name is changed as a result of the step 2011 (step 2012).

When the processing in the step 2004 is completed or when it is decided in the step 2008 that there is no old version behavior program in the behavior program temporary storage portion 1303 or when the processing in the step 2010 is completed or when the processing in the step 2012 is completed, the latest version of the behavior program requested in the step 2001 and stored in the behavior program storage portion 1101 is stored in the behavior program temporary storage portion 1303 (step 2013). Thereafter, a new entry is added to the behavior program state information 1401 (step 2014). In this case, the added entry includes the version number 1502 of the behavior program update information 1501 in the version number 1502, the update system defined by the behavior program in the update system 1403 and 0 in both the instance number 1404 and the reference number 1406.

Then, in the step 2004 or 2007, the access-lock of the behavior program state information is released (step 2015). Thereafter, the non storage period 1505 of the entry related to the behavior program stored in the step 2013 is made 0 (step 2016). Thereafter, a result of storage of the behavior program is returned to the behavior program execution control portion 1301 (step 2017).

The behavior program execution control portion 1301 checks whether or not the behavior program whose storage request is sent to the behavior program change management portion 1302 is stored in the behavior program temporary storage portion 1303 (step 1813). When the behavior program is not stored in the behavior program temporary storage portion 1303, the operation waits until the behavior program is stored therein (1814). Thereafter, the operation is repeated from the step 1813. When it is decided in the step 1809 that the update system 1404 of the behavior program state information 1401 related to the behavior program to be started is not the asynchronous or when it is decided in the step 1811 that the behavior program to be started is not the latest version or when it is decided in the step 1813 that the behavior program to be stored is stored in the behavior program temporary storage portion 1303, it is checked whether or not the behavior program sate information 1401 is access-locked or write-locked (step 1815). When it is decided in the step 1815 that the behavior program state information 1401 is access-locked or write-locked, the operation waits until the access-lock or write-lock is released (step 1816). Thereafter, the operation is repeated from the step 1815. When it is decided in the step 1815 that the behavior program state information 1401 is not access-locked or write-locked, the behavior program state information 1401 is write-locked (step 1817). Thereafter, the instance number 1405 and the reference number 1406 of the corresponding entry of the behavior program state information 1401 are increased by one, respectively (step 1818). Then, the write-lock of the behavior program state information 1401 is released (step 1819). Then, the behavior program to which the start request is directed is activated (step 1820). In order to execute the behavior program instance activated in the step 1820, a behavior program instance execution request is sent to the behavior program execution portion 1102 (step 1821).

Thus, the step 1701 in FIG. 17 is completed and the activation control portion 1103 waits a result of execution from the behavior program execution portion 1102 (step 1702).

Figure 24:
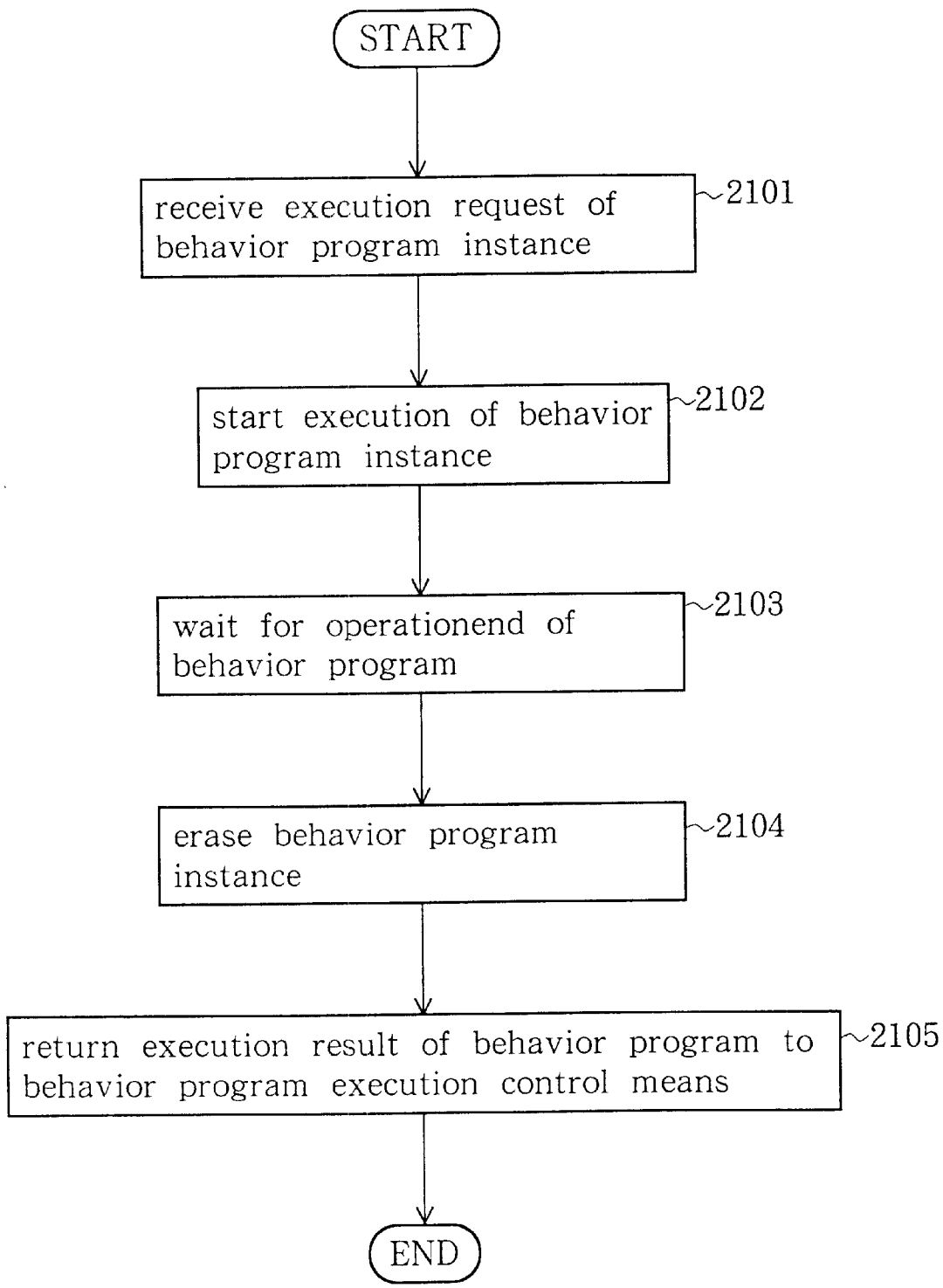
FIG. 24 is a flowchart showing an operation of a behavior program execution portion.

Then, the behavior program execution portion 1102 starts an operation shown in FIG. 24. That is, an execution request of the behavior program instance is received from the behavior program execution control portion 1302 (step 2101). In this case, the behavior program instance and parameters necessary for operation of the behavior program received in the step 1801 of the operation of the behavior program execution control portion 1301 are sent from the behavior program change management portion 1302. Then, an execution of the behavior program instance is started (step 2102). This is performed by, for example, executing a specific method such as run ( ) indicating a shift of control to the behavior program instance by the behavior program execution portion 1102. Thereafter, the operation waits until the operation of the behavior program instance is ended (step 2103). After the operation of the behavior program instance is ended, the behavior program instance is erased (step 2104). Then, a result of execution of the behavior program instance is returned to the behavior program execution control portion 1301 (step 2105).

With this, the behavior program execution control portion 1301 transmits the result of execution of the behavior program instance received in the step 1702 to the object access portion 1105 and starts a post processing (step 1703).

Figure 25:
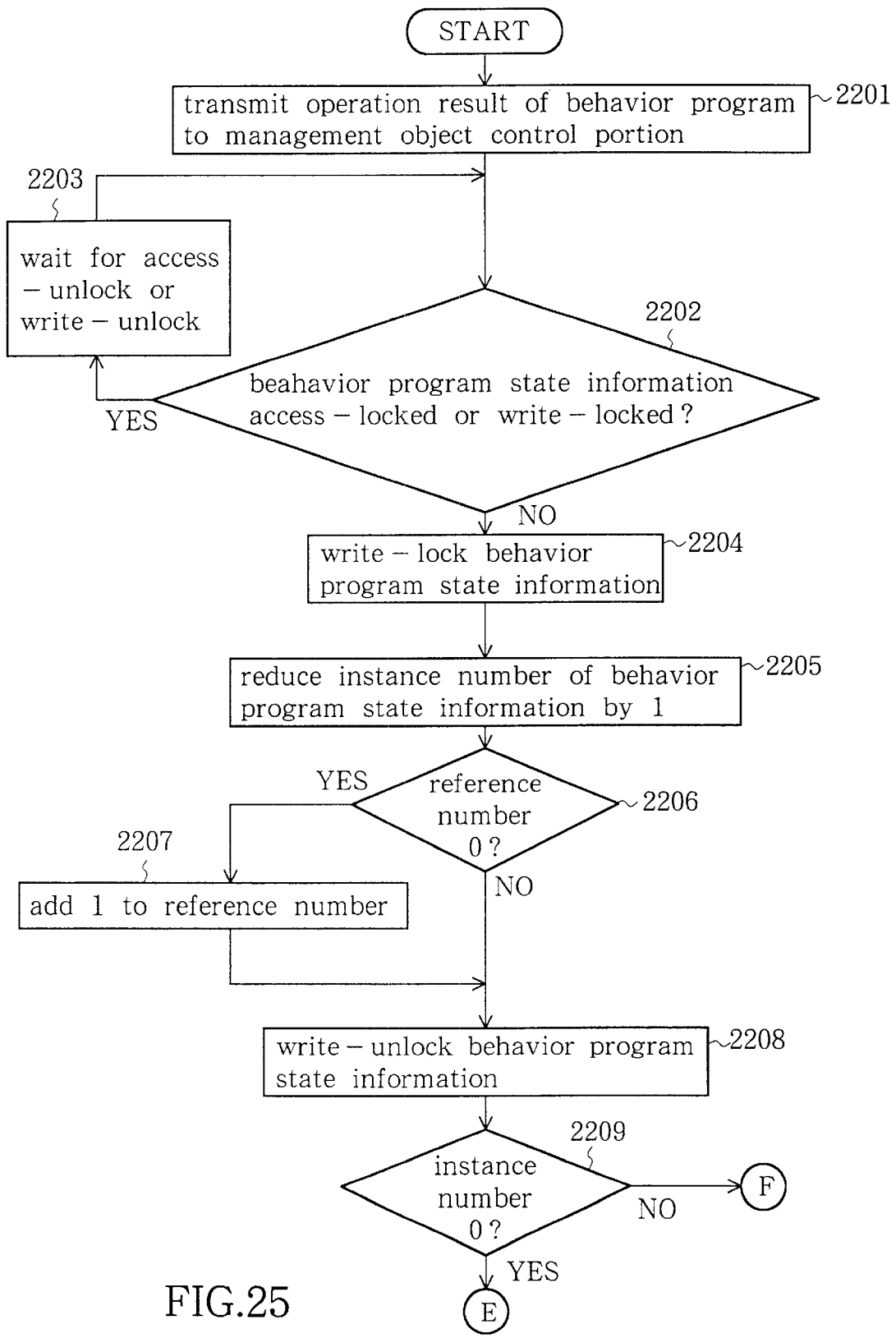
FIG. 25 is a flowchart showing an operation of a behavior program execution control portion.
Figure 26:
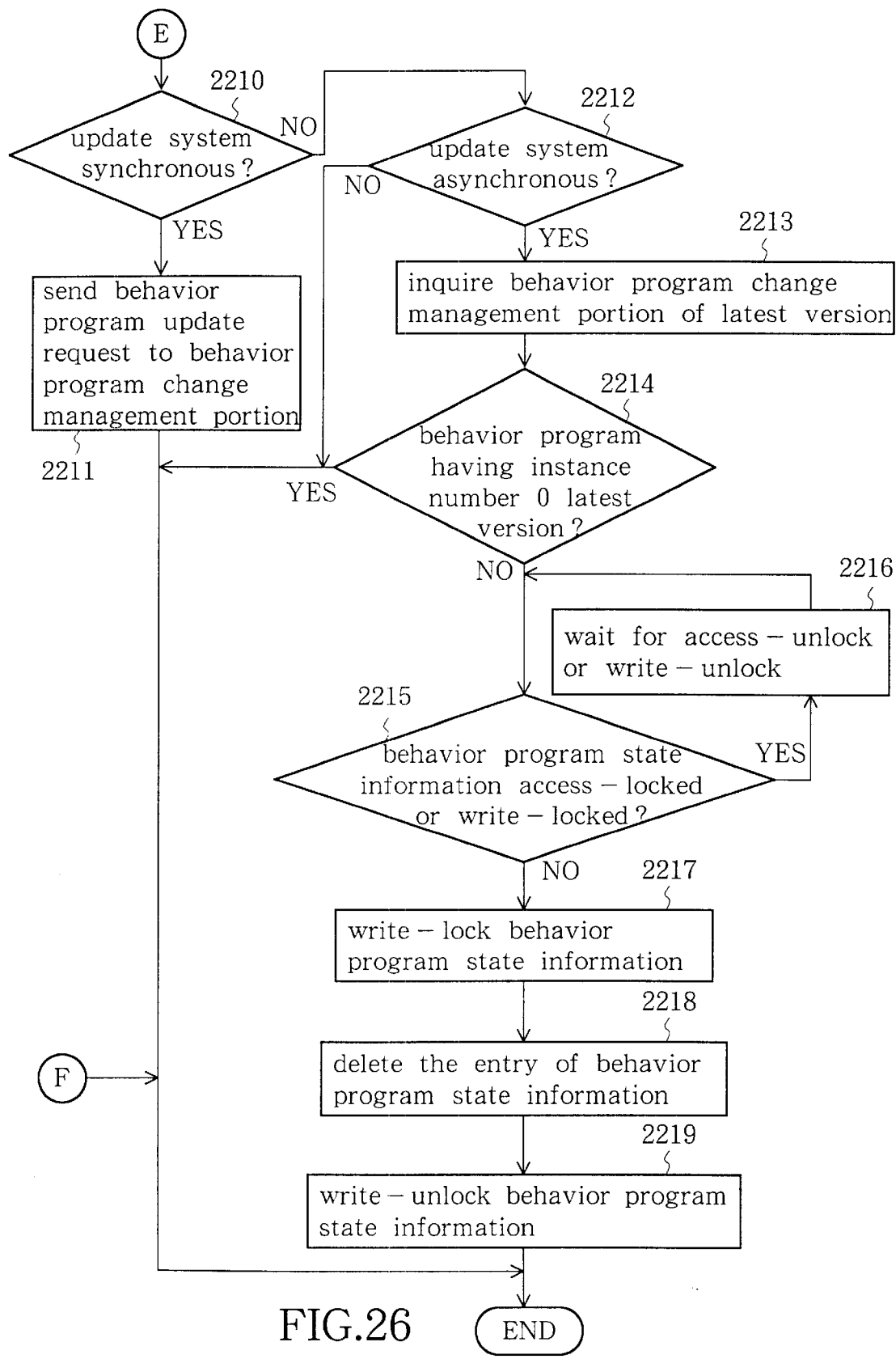
FIG. 26 is a flowchart showing an operation of the behavior program execution control portion.

FIGS. 25 and 26 show a detailed operation flow of the step 1703. First, the result of operation of the behavior program is sent to the object access portion 1105 (step 2201). Thereafter, it is checked whether or not the behavior program state information 1401 is access locked or write-locked (step 2202). When it is decided in the step 2202 that the behavior program state information 1401 is access-locked or write-locked, the operation waits until the access-lock or write-lock is unlocked (step 2203). Thereafter, the operation is repeated from the step 2202. When it is decided in the step 2202 that the behavior program state information is not access-locked or write-locked, the behavior program state information 1401 is write-locked (step 2204). Then, the instance number of the corresponding entry of the behavior program state information 1401 is decreased by one (step 2205). Further, it is checked whether or not the reference number 1406 of that entry of the behavior program state information 1401 is 0 (step 2206). When it is decided in the step 2206 that the reference number 1406 is 0, the reference number 1406 is increased by one (step 2207). When it is decided in the step 2206 that the reference number 1406 is not 0 or when the processing in the step 2207 is completed, the behavior program state information 1401 which is write-locked in the step 2204 is write-unlocked (step 2208). Thereafter, it is checked whether or not the instance number 1405 which was decreased in the step 2205 becomes 0 (step 2209).

When it is decided in the step 2209 that the instance number 1405 which was decreased by one is not 0, the behavior program execution control portion 1301 ends its operation.

When it is decided in the step 2209 that the instance number which was decreased by one becomes 0, it is checked whether or not the update system 1404 of the same entry is synchronous (step 2210). When it is decided in the step 2210 that the update system 1404 is synchronous, a behavior program update request is transmitted to the behavior program change management portion 1302 (step 2211).

Figure 22:
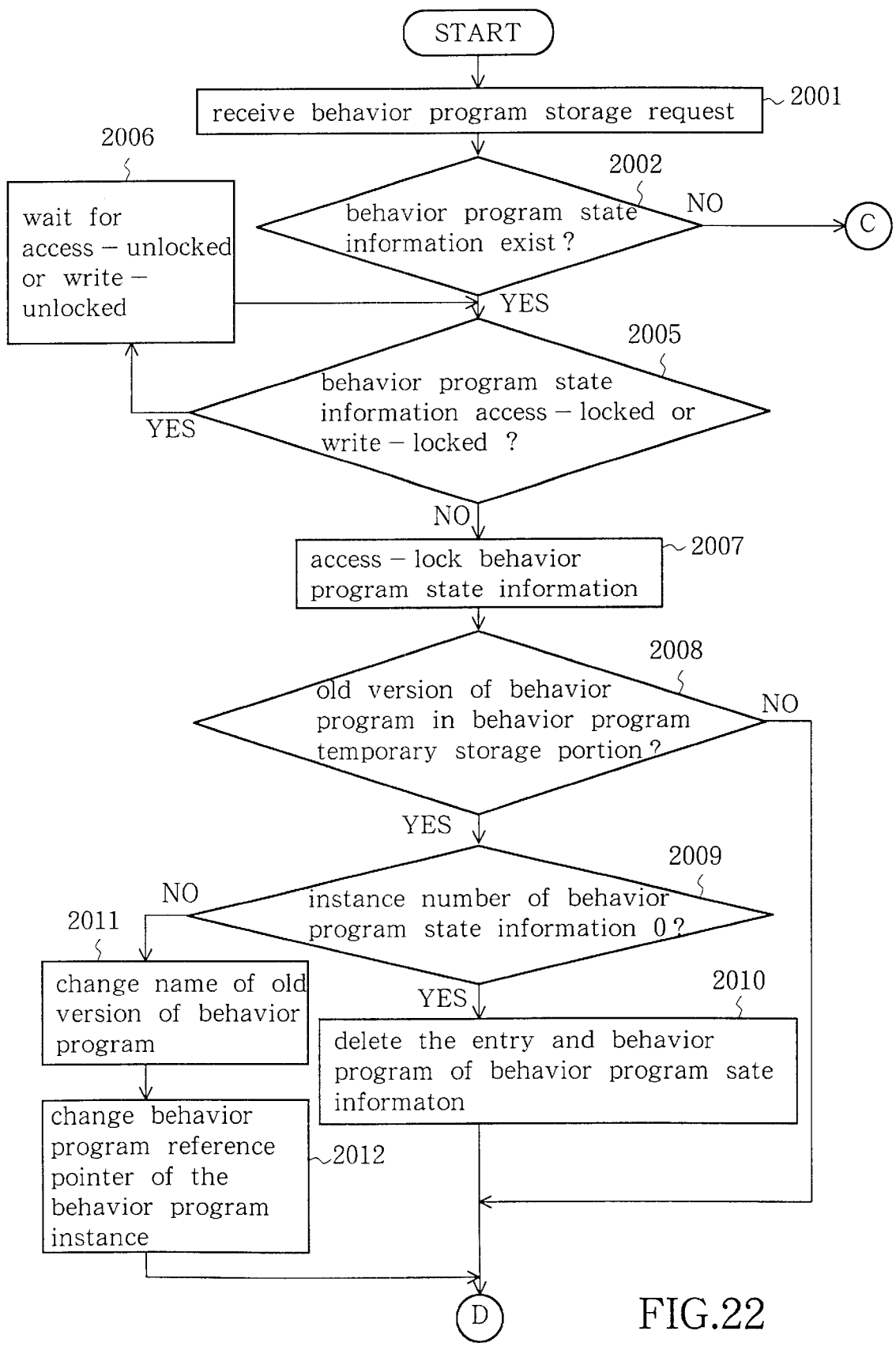
FIG. 22 is a flowchart showing an operation of a behavior program change management portion with respect to a behavior program update request.
Figure 23:
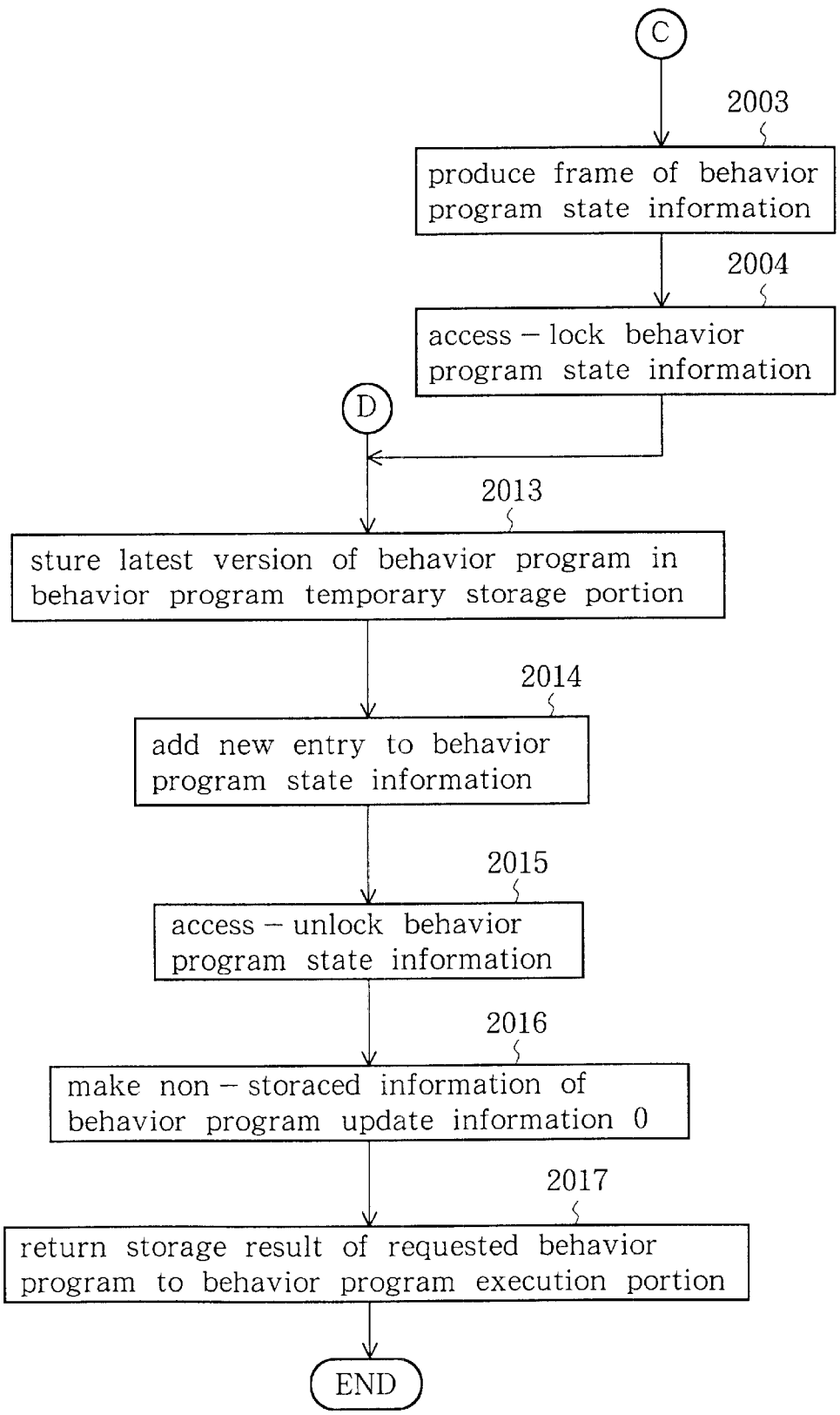
FIG. 23 is a flowchart showing an operation of the behavior program change management portion with respect to a behavior program update request.

Upon this, the behavior program change management portion 1302 starts the operation shown in FIGS. 22 and 23. Since this operation was described previously, the description thereof is omitted. After the behavior program change management portion 1302 completes the operation shown in FIGS. 22 and 23 (step 2211), the behavior program execution control portion 1301 ends its operation.

When it is decided in the step 2210 that the update system 1404 is not synchronous, it is checked whether or not the update system 1404 is asynchronous (step 2212). When it is decided in the step 2212 that the update system 1404 is not asynchronous, the behavior program execution control portion 1301 ends its operation. When it is decided in the step 2212 that the update system 1404 is asynchronous, the latest version of the behavior program whose instance number 1405 became 0 in the step 2205 is inquired to the behavior program change management portion 1302 (step 2213).

Thereafter, the behavior program change management 1302 starts the operation shown in FIG. 21. Since this operation was described previously, it is not described for avoidance of duplication.

Then, the latest version number returned from the behavior program change management portion 1302 in the step 2213 is compared with the version number 1403 of the same entry of the behavior program state information 1401 (step 2214). When it is decided in the step 2214 that the behavior program stored in the behavior program temporary storage portion 1303 is the latest version, the behavior program execution control portion 1301 ends its operation. When it is decided in the step 2214 that the behavior program stored in the behavior program temporary storage portion 1303 is not the latest version, it is checked whether or not the behavior program state information is access-locked or write locked (step 2215). When it is decided in the step 2215 that the behavior program state information 1401 is access-locked or write locked, the operation waits until the behavior program state information is access-unlocked or write-unlocked (step 2216). Thereafter, the operation is repeated from the step 2215. When it is decided in the step 2215 that the behavior program state information 1401 is not access locked or write-locked, the behavior program state information 1401 is write-unlocked (step 2217). Thereafter, the entry whose instance number 1405 becomes 0 in the step 2205 is deleted (step 2218). Thereafter, the behavior program state information 1401 which was write-locked in the step 2217 is write-unlocked (step 2219).

Thereafter, the object access portion 1105 transmits the result of execution of the behavior program received in the step 2203 to the managed object control portion 502 (step 2204).

Next, an operation when the behavior program stored in the behavior program storage portion 1101 is updated will be described with reference to FIGS. 27 and 28.

Figure 27:
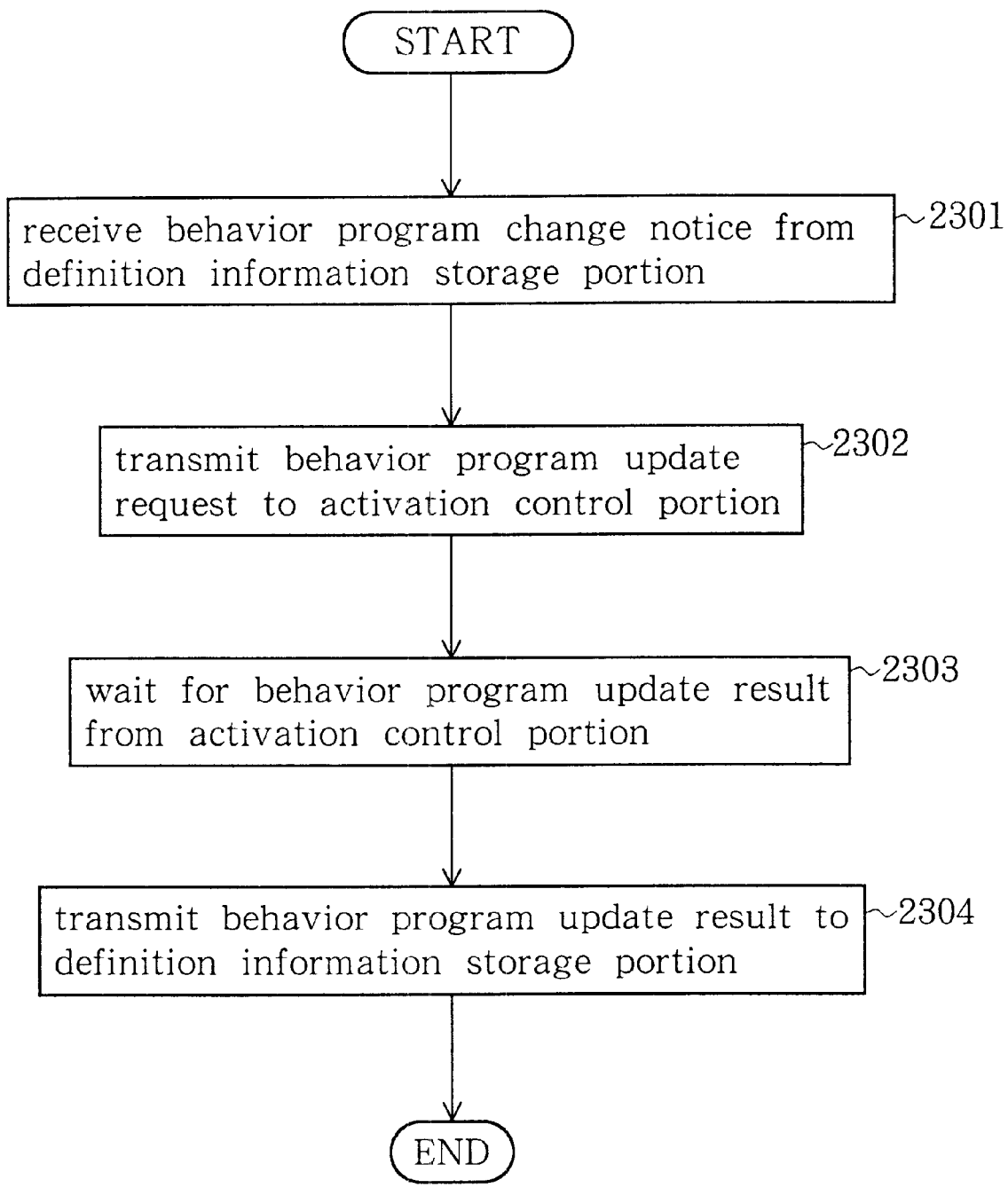
FIG. 27 is a flowchart showing an operation of a definition change receiving portion.
Figure 28:
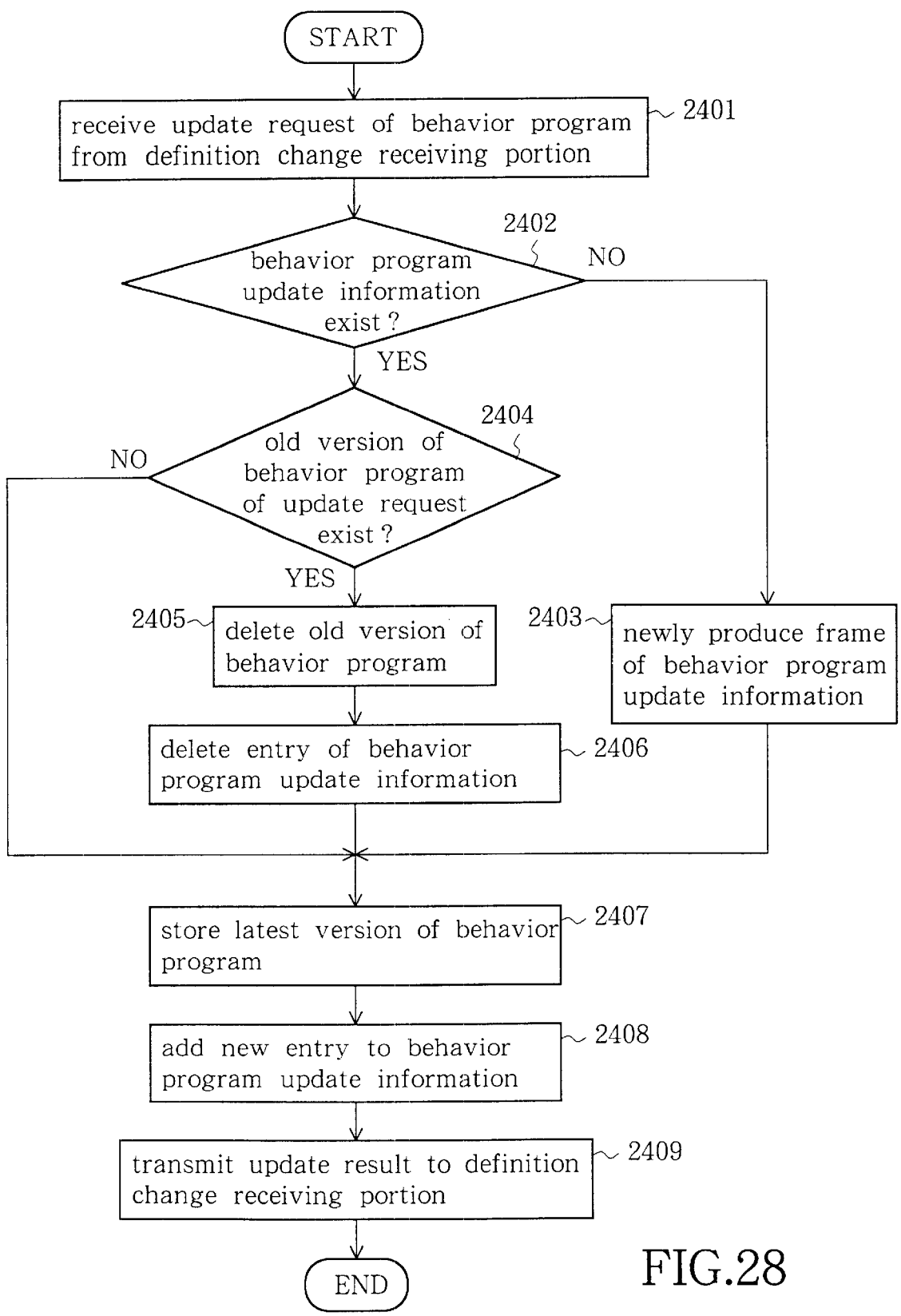
FIG. 28 is a flowchart showing a behavior program update processing by an activation control portion.
Figure 29:
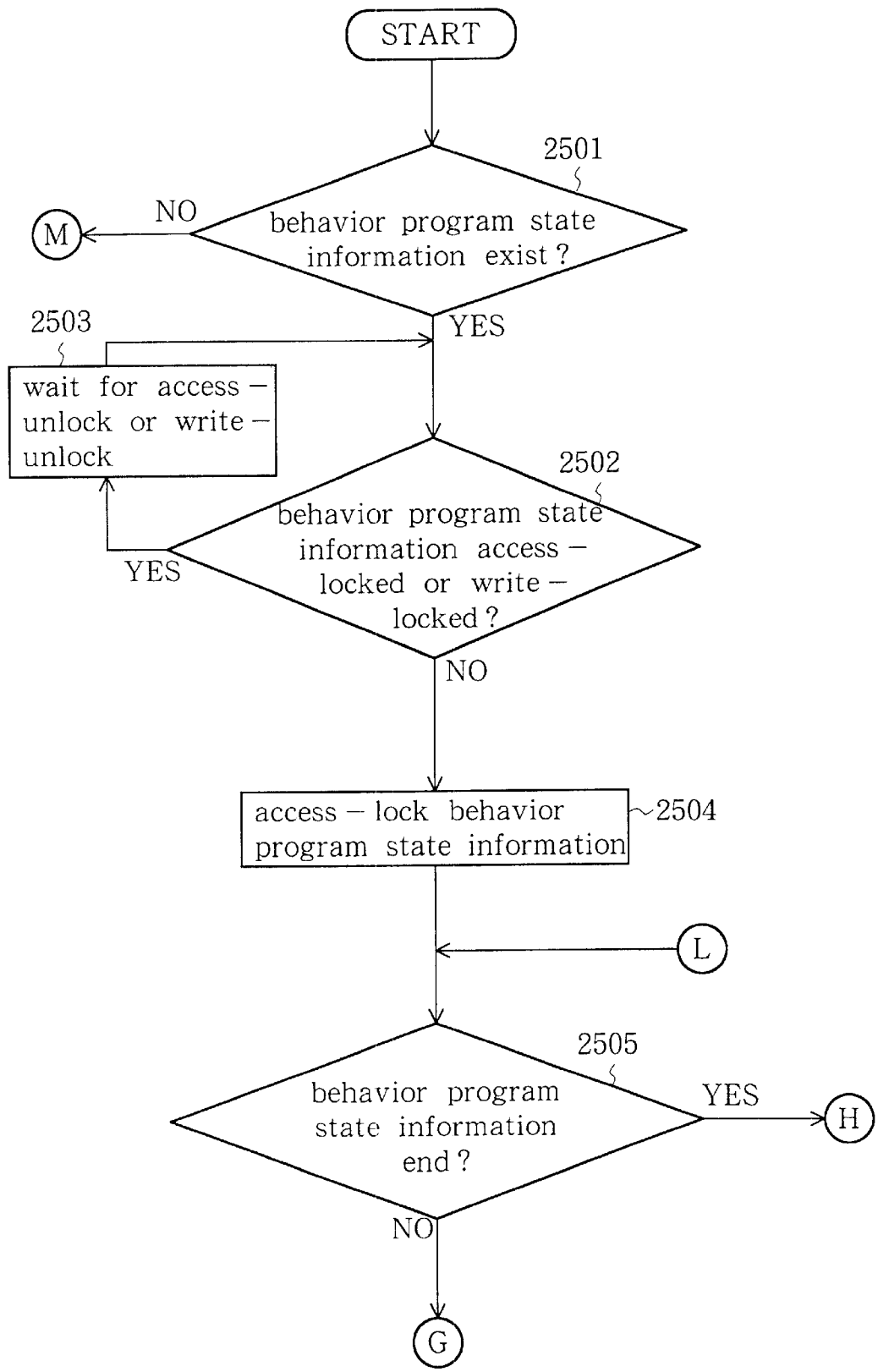
FIG. 29 is a flowchart showing an operation when the behavior program change management portion periodically updates the behavior program temporary storing portion.
Figure 30:
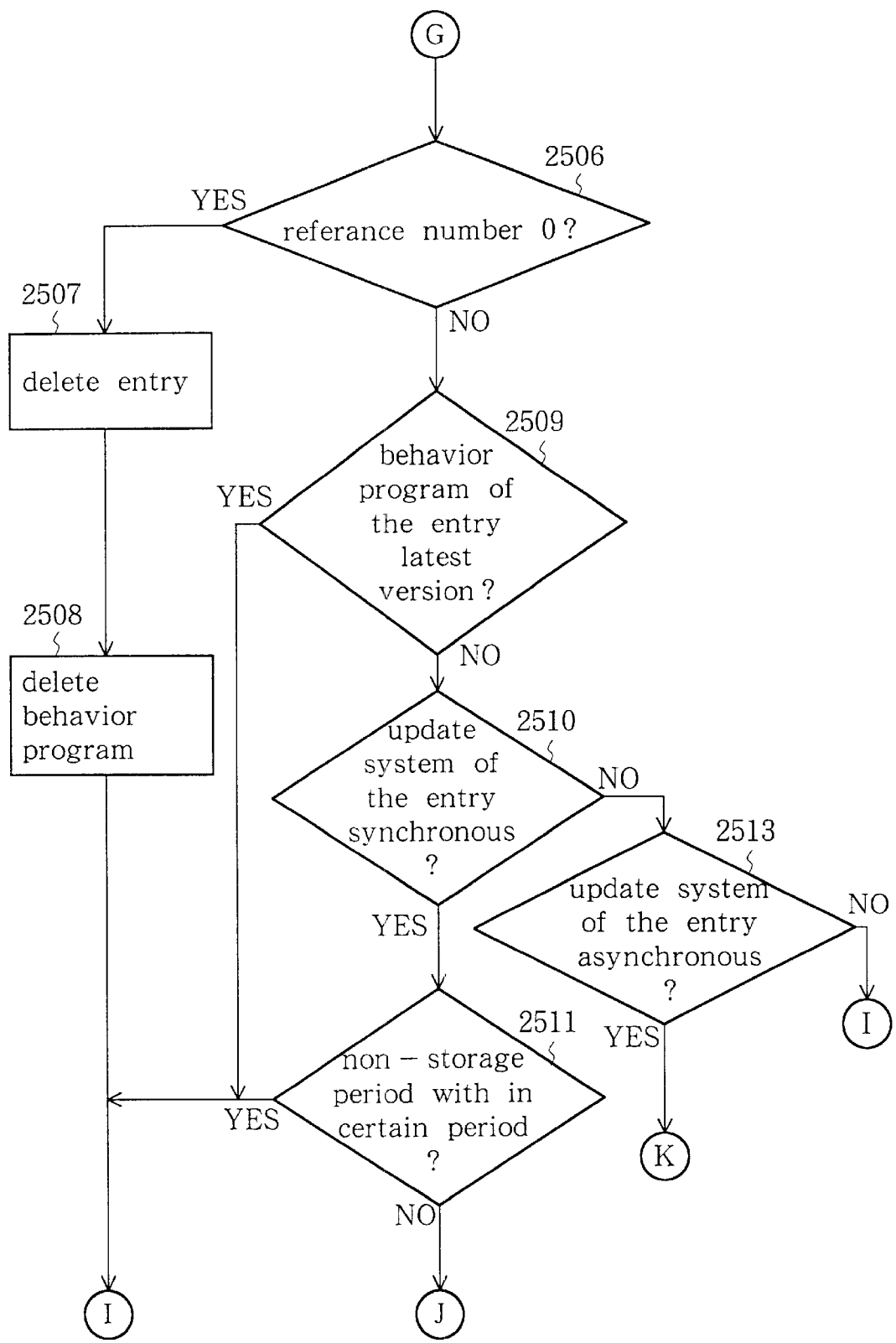
FIG. 30 is a flowchart showing an operation when the behavior program change management portion periodically updates the behavior program temporary storing portion.
Figure 31:
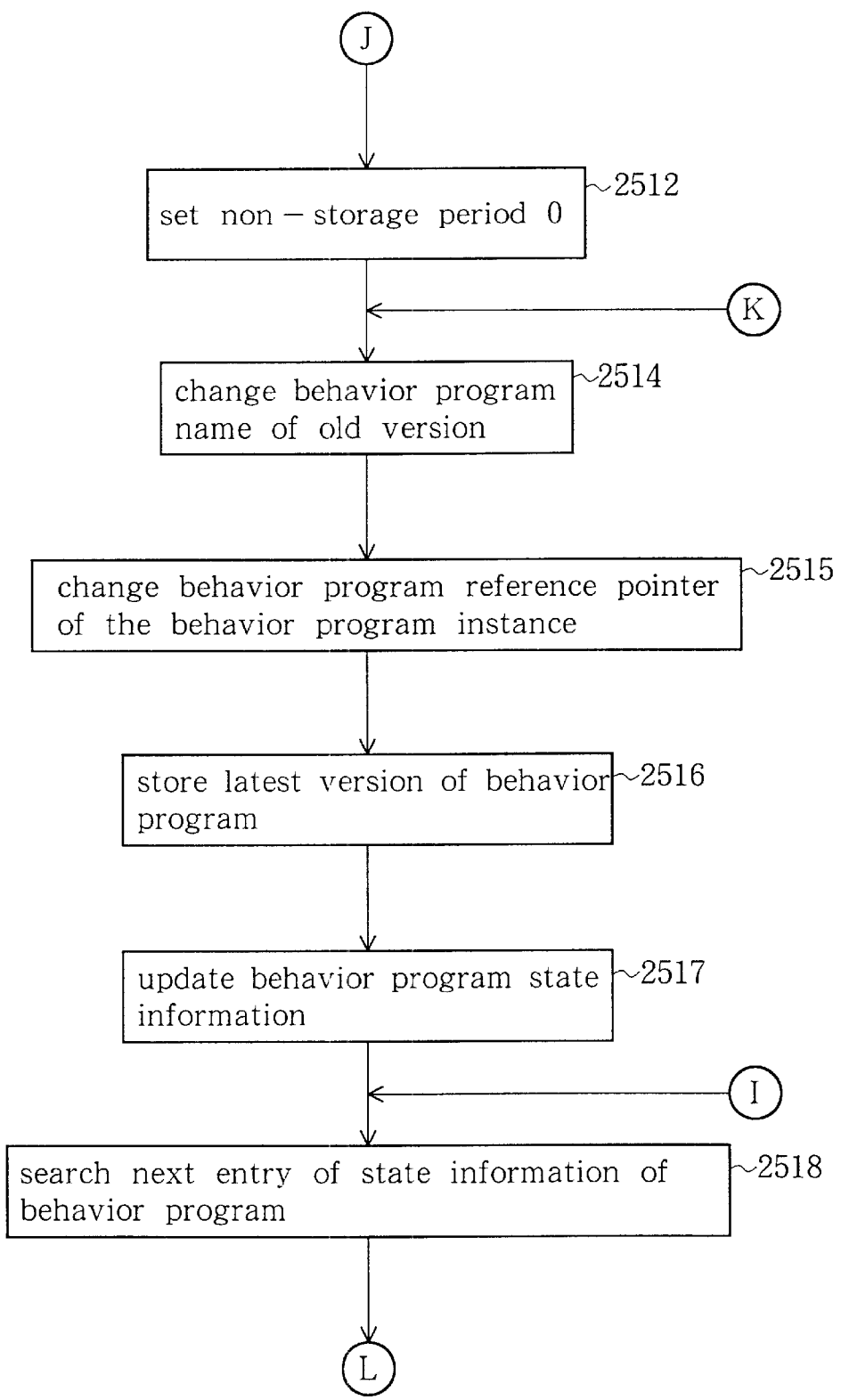
FIG. 31 is a flowchart showing an operation when the behavior program change management portion periodically updates the behavior program temporary storing portion.
Figure 32:
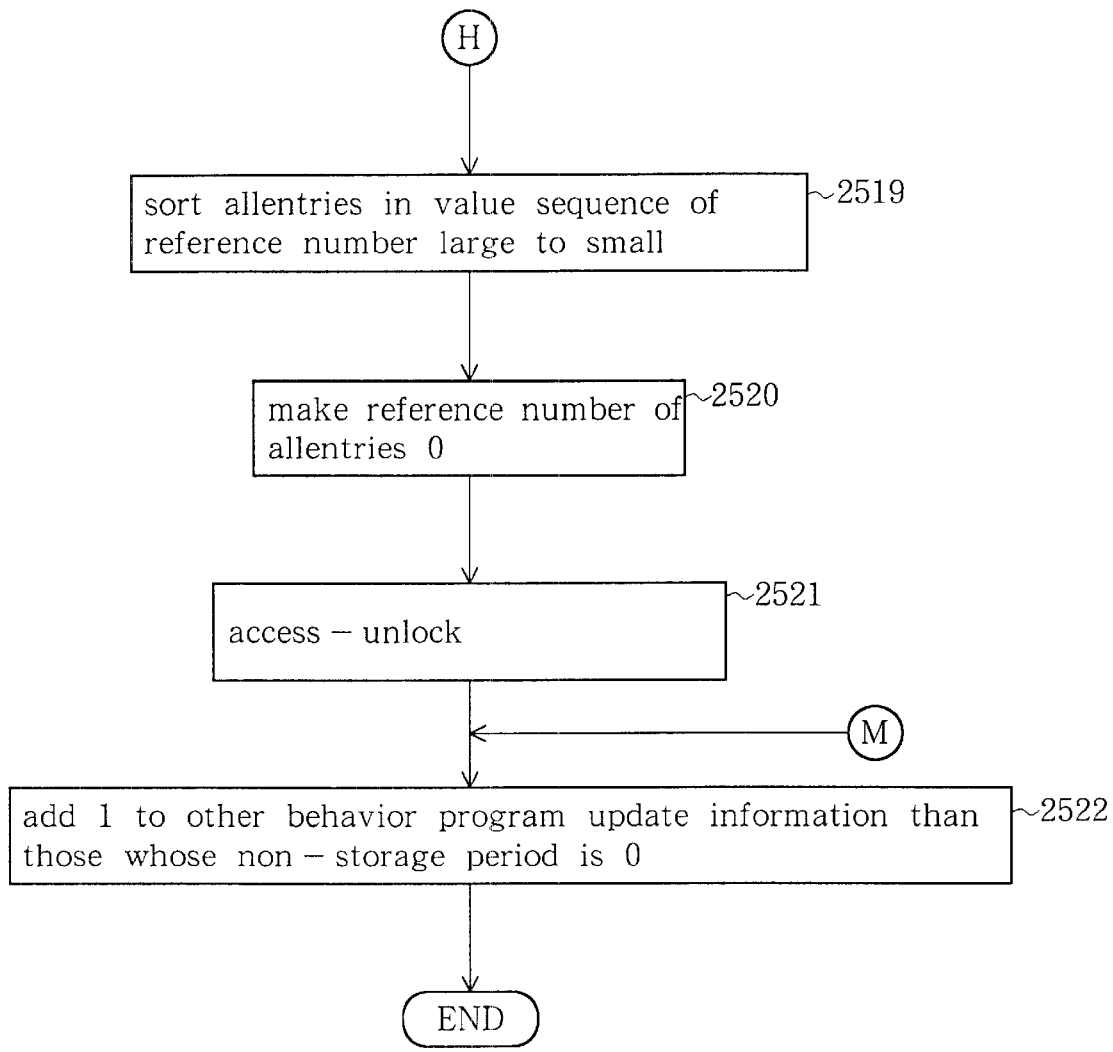
FIG. 32 is a flowchart showing an operation when the behavior program change management portion periodically updates the behavior program temporary storing portion.

FIG. 27 shows an operation flow of the definition change receiving portion when the behavior program stored in the behavior program storage portion 1101 is updated. It is assumed that the definition change receiving portion 1104 receives an update request of the behavior program from the definition information management portion 1304 (step 2301). In this case, a behavior program to be updated and its name are given from the definition information management portion 1304. In response to this, the definition change receiving portion 1104 transmits a behavior program update request to the activation control portion 1103 (step 2302). Thereafter, a result of update from the activation control portion 1103 is waited (step 2303).

In response to the behavior program update request from the definition change receiving portion 1104, the activation control portion 1103 starts the update processing of the behavior program. The update processing is shown in FIG. 28. It is assumed that the behavior program change management portion 1302 receives the update request of the behavior program from the definition change receiving portion 1104 (step 2401). In this case, the behavior program to be updated and the name thereof are given from the definition change receiving portion 1104. It is checked whether or not the behavior program update information 1501 exists in the behavior program change management portion 1302 (step 2402). When it is decided in the step 2402 that the behavior program update information 1501 does not exist in the behavior program change management portion 1302, a frame of the behavior program update information 1501 is newly produced (step 2403). When it is decided in the step 2402 that the behavior program update information 1501 exists in the behavior program change management portion 1302, it is checked whether or not the old version of the behavior program whose update was requested is currently stored in the behavior program storage portion 1101 (step 2404). This processing is executed by searching the behavior program name 1502 of the behavior program update information 1501 held by the behavior program change management portion 1302 with using the behavior program name received in the step 2401 as a key. When it is decided in the step 2404 that the old version of the behavior program to be updated exists, the old version of the behavior program is erased from the behavior program storage portion 1101 (step 2405). Then, the corresponding entry of the behavior program update 1501 is deleted (step 2406). When the processing in the step 2403 is ended or when it is decided in the step 2404 that the old version of the behavior program to be updated does not exist or when the processing in the step 2406 is ended, the latest version of the behavior program received in the step 2401 is stored in the behavior program storage portion 1101 (step 2407). Then, a new entry related to the stored behavior program is added to the behavior program update information 1501 (step 2408). In this case, a version number defined by the behavior program is stored in the version number 1503 of the added entry, a current date in the date 1504 thereof and 1 in the non-storage period thereof. Thereafter, a result of update of the behavior program to be updated is returned to the definition change receiving portion 1104 (step 2409).

With this result of update, the definition change receiving portion 1104 transmits the received result of update of the behavior program to the definition information storage portion 1304 as shown in FIG. 27 (step 2304).

Now, an operation when the behavior program change management portion 1302 periodically updates the behavior program temporary storage portion 1303 will be described with reference to FIGS. 29 to 32.

It is assumed that the behavior program change management 1302 starts to periodically perform a management of the behavior program temporary storage portion 1303. Then, the behavior program change management portion 1302 checks whether or not the behavior program state information 1401 exists in the behavior program temporary storage portion 1303 (step 2501). When it is decided in the step 2501 that the behavior program state information 1401 exists in the behavior program temporary storage portion 1303, it is checked whether or not the behavior program state information 1401 is access-locked or write-locked (step 2502). When it is decided in the step 2502 that the behavior program state information 1401 is access-locked or write-locked, the operation is to wait until the access-lock or write-lock is released (step 2503). Thereafter, the operation is repeated from the step 2502. When it is decided in the step 2502 that the behavior program state information 1401 is not access-locked or write-locked, the behavior program state information 1401 is access-locked (step 2504). Then, the accessed operation checks whether or not it is the end of the behavior program state information (step 2505).

When it is decided in the step 2505 that the accessed portion is not the end of the behavior program state information 1401, it is checked whether or not the reference number 1406 of the entry of the accessed portion is 0 (step 2506).

When it is decided in the step 2506 that the reference number 1406 of the that entry is 0, that entry is deleted from the behavior program state information 1401 (step 2507). Thereafter, the behavior program corresponding to that entry is deleted from the behavior program temporary storage portion 1303 (step 2508).

When it is decided in the step 2506 that the reference number 1406 of the that entry is not 0, it is checked whether or not the version number 1403 of that entry is the latest (step 2509). This processing is executed by comparing the version number 1403 of that entry with the version number 1503 in that entry of the behavior program update information 1501 held by the behavior program change management portion 1302. When it is decided in the step 2509 that the behavior program stored in the behavior program temporary storage portion 1303 is the old version, it is checked whether or not the update system 1404 of that entry in the behavior program state information 1401 is synchronous (step 2510). When it is decided in the step 2510 that the update system 1404 is synchronous, it is checked whether or not the non-storage period of that entry in the behavior program management information 1501 is within a certain time (step 2511). The certain time is a positive integer such as 5 indicating a time in which the behavior program temporary storage portion 1303 is updated 5 times.

When it is decided in the step 2511 that the non-storage period 1505 of the behavior program update information 1501 is out of the certain time, the non-storage period 1505 is set 0 (step 2512).

When it is decided in the step 2510 that the update system 1404 of that entry in the behavior program state information 1401 is not synchronous, it is checked whether or not the update system 1404 of that entry is asynchronous (step 2513).

When the processing of the step 2512 is completed or when it is decided in the step 2513 that the update system 1404 of that entry is asynchronous, the name of the old version behavior program is changed to the behavior program name of that entry existing in the behavior program temporary storage portion 1303 (step 2514). The name conversion system performed in this processing was described with respect to the step 2011 in FIG. 22. Thereafter, the behavior program reference pointer of the behavior program instance activated from the behavior program whose name is changed in the step 2514 (step 2515). Then, the latest version of the behavior program is stored in the behavior program temporary storage portion 1303 (step 2516). Thereafter, an entry related to the latest version of the behavior program stored in the step 2516 is added to the behavior program state information 1401 (step 2517). In the entry added in the step 2517, the version number and the update system which are defined in the behavior program are used in the version number 1403 and the update system 1404, respectively, and the reference number 1405 is set 0 and the reference number 1406 related to the old version behavior program checked in the step 2506 is used as the reference number 1406.

When the processing in the step 2508 is ended or when it is decided in the step 2509 that the behavior program of that entry is the latest version or when it is decided in the step 2511 that the non-storage period 1505 in that entry of the behavior program update information 1501 is within the certain time or when it is decided in the step 2513 that the it is decided in the step 2513 that the update system 1404 of that entry in the behavior program state information 1401 is not asynchronous or when the processing in the step 2517 is ended, a next entry of the behavior program state information 1401 is searched (step 2518). Thereafter, the processing is repeated from the step 2505.

When it is decided in the step 2505 that the portion accessed is the end of the behavior program state information 1401, all entries of the behavior program state information 1401 are sorted from the largest reference number 1406 down to the smallest number in sequence on the basis of the reference numbers 1406 of the respective entries (step 2519). Then, the reference numbers 1406 of all entries of the behavior program state information 1401 are set 0 (step 2520). Thereafter, the behavior program state information access-locked in the step 2504 is unlocked (step 2521). When it is decided in the step 2501 that the behavior program state information 1401 does not exist or when the processing of the step 2521 is ended, the non-storage period 1505 for entries other than the entries whose non-storage period is 0 is increased by one (step 2522).

Now, an embodiment in a case where a construction similar to those shown in FIGS. 11 and 13 is realized by Java language will be described with reference to FIGS. 33 to 36.

Figure 33:
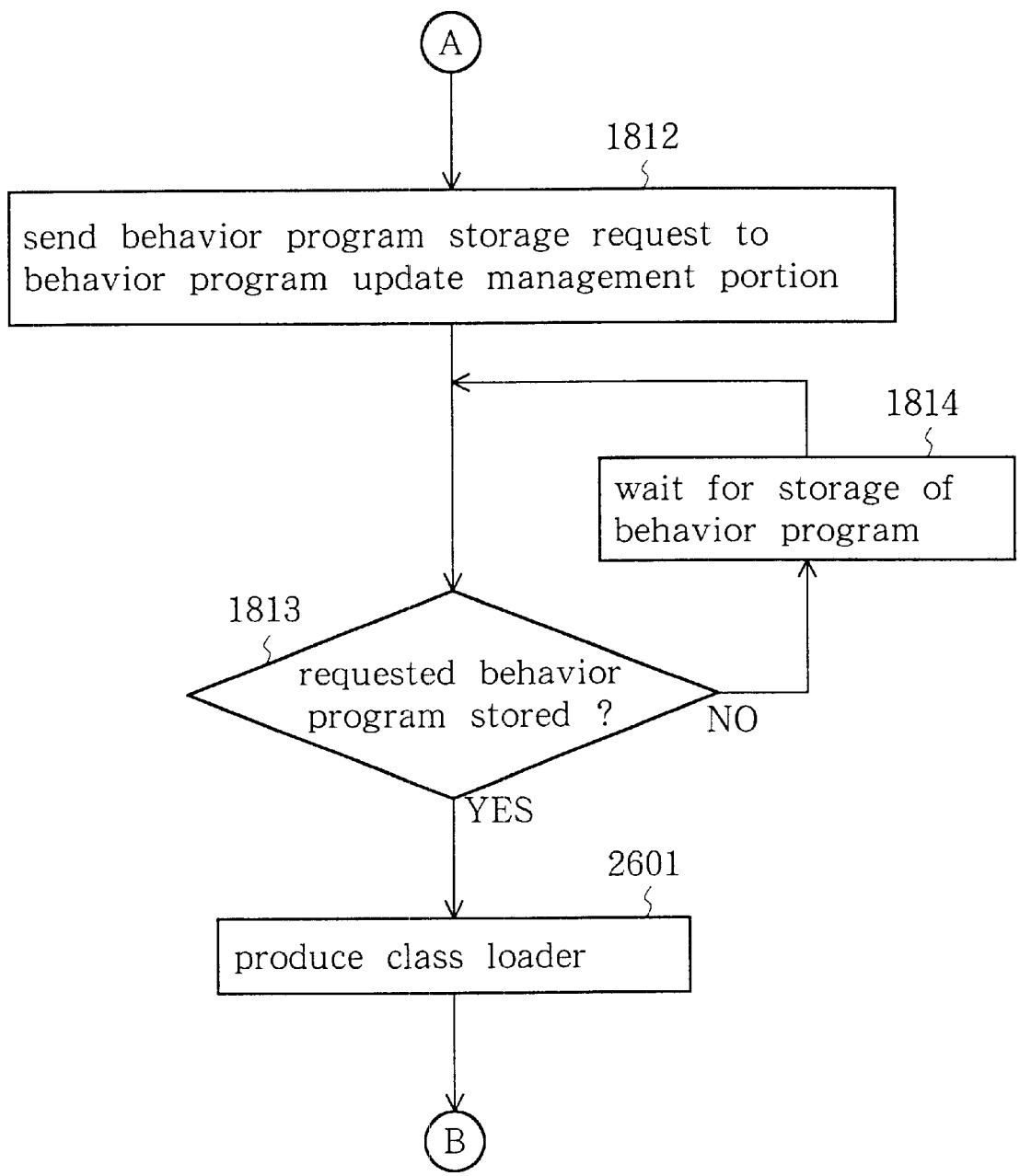
FIG. 33 is a flowchart when the operation shown in FIG. 19 is realized by the Java language.

FIG. 33 shows an operation flow when the operation flow shown in FIG. 19 is realized by Java language. The operation flow shown in FIGS. 18 and 20 is similar to that in a case where it is realized by Java language, except that it newly includes a step 2601 for producing a class loader having a function of forming individual name spaces used by Java language, etc., a function of storing behavior programs from a disk to a memory and a function of holding a name space identification table for holding names of behavior programs stored on the memory by the class loader, pointers indicating actual conditions of the behavior programs and the number of instances produced from the behavior programs and behavior programs stored in the memory.

Figure 34:
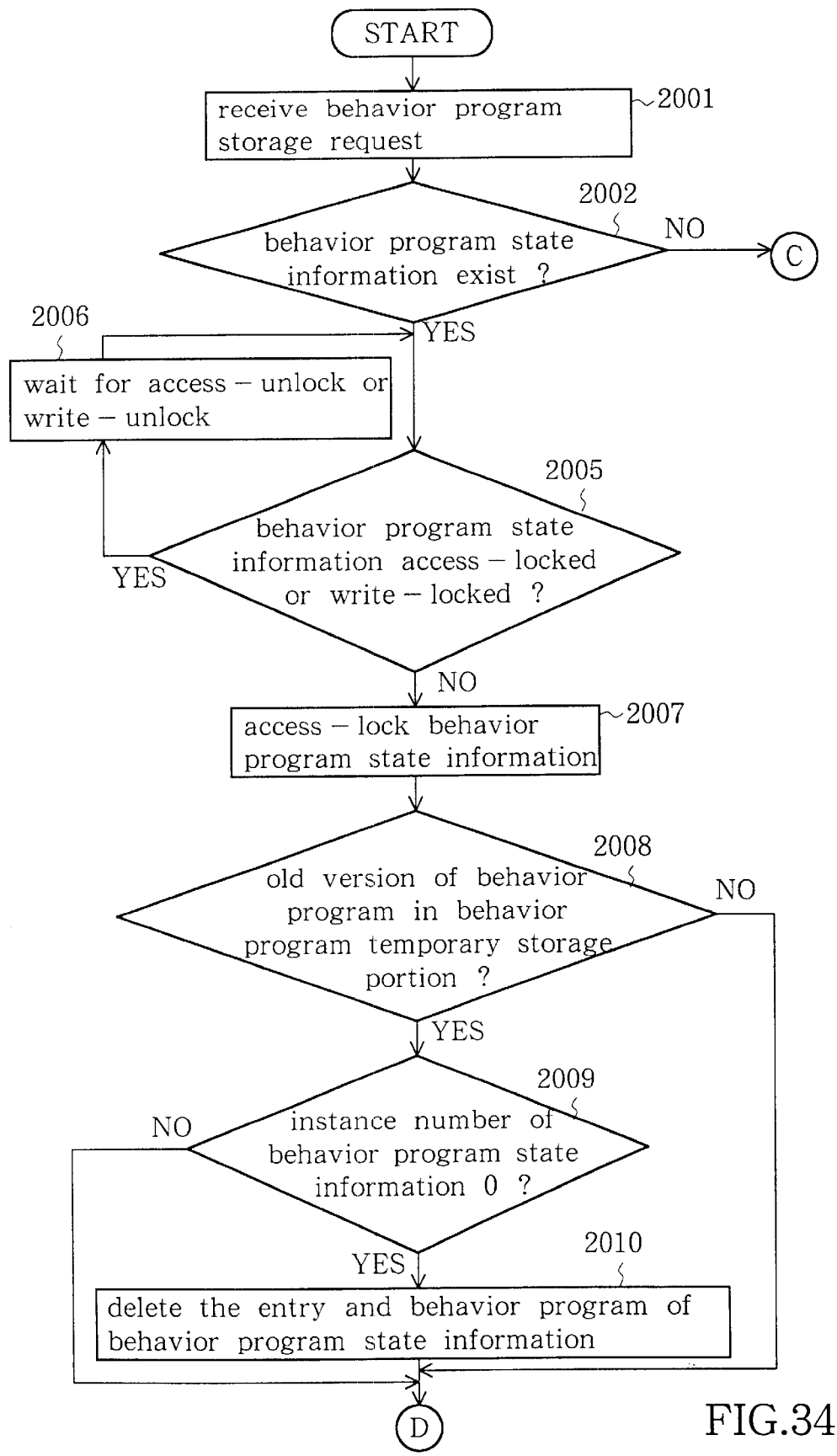
FIG. 34 is a flowchart when the operation shown in FIG. 22 is realized by the Java language.

FIG. 34 shows an operation flow in a case where the operation flow shown in FIG. 22 is realized by Java language. The operation of the behavior program change management portion 1302 started upon the transmission of the behavior program storage request to the behavior program change management portion 1302 in the step 1812 is shown in FIGS. 34 and 23. The flow shown in FIG. 34 differs from the flow shown in FIG. 22 in that the steps 2011 and 2012 which are executed when it is decided in the step 2009 hat the instance number 1406 in the behavior program state information 1401 is 0 are deleted.

Figure 35:
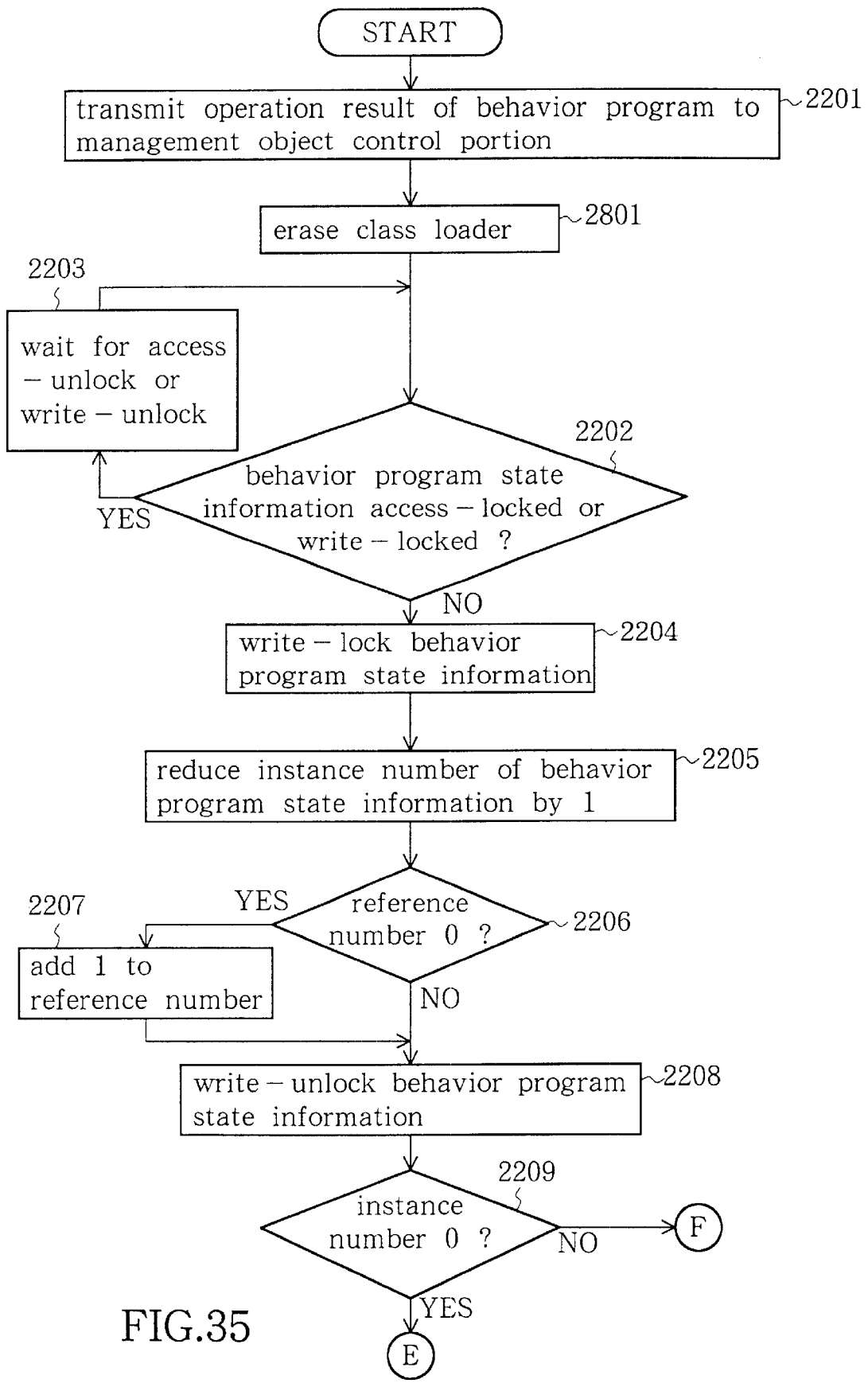
FIG. 35 is a flowchart when the operation shown in FIG. 25 is realized by the Java language.

An operation of the behavior program execution control portion 1301 after the execution of the behavior program whose start is requested will be described. In order to realize this operation by Java language, it is necessary to modify the operation flow shown in FIGS. 25 and 26. In this case, the portion of the operation flow shown in FIG. 25 is modified such as shown in FIG. 35. The difference of the operation flow shown in FIG. 35 from that shown in FIG. 25 is that the step 2801 for deleting unnecessary class loader is inserted next to the step 2201 for transmitting the result of operation of the behavior program to the managed object control portion 502.

Figure 36:
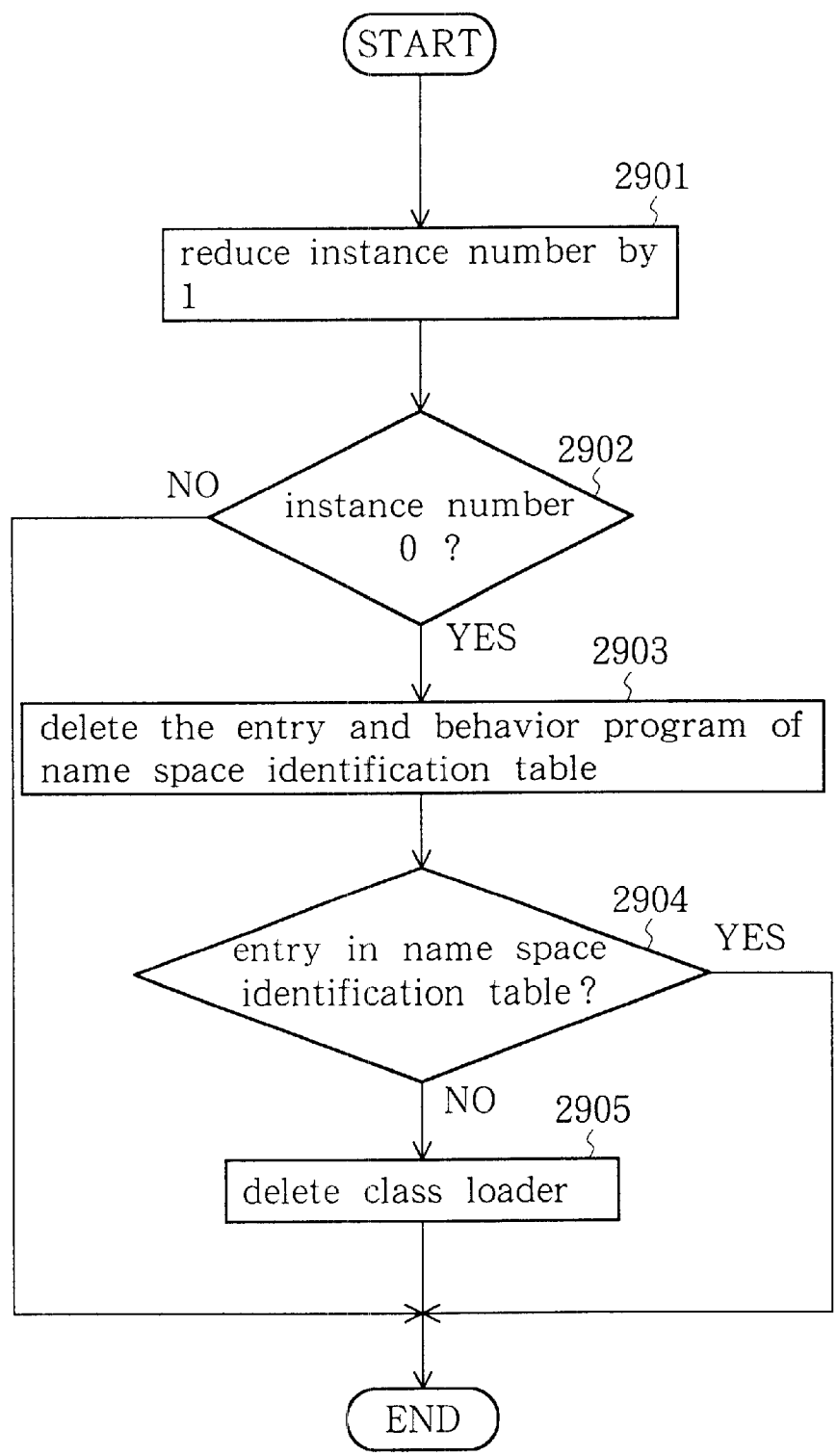
FIG. 36 is a flowchart showing one step of the operation shown in FIG. 35 in detail.

FIG. 36 shows the step 2801 in more detail. In the step 2801, the instance number of the entry in the name space identification table held by the class loader producing the behavior program instance erased in the step 2104 shown in FIG. 21 is decreased by one (step 2901). Then, it is checked whether or not the instance number decreased by one in the step 2901 becomes 0 (step 2902). When it is decided in the step 2902 that the instance number is not 0, the behavior program execution control portion 1301 ends its operation. When it is decided in the step 2902 that the instance number becomes 0, that entry of the name space identification table and the behavior program stored in the memory and indicated by that entry are deleted (step 2903). Then, it is checked whether or not all of the entries of the name space identification table are deleted in the step 2903 (step 2904). When it is decided in the step 2904 that any entry of the name space identification table exists, the behavior program execution control portion 1301 ends its operation. When it is decided in the step 2904 that all entries are deleted, the class loader is erased (step 2905).

When the behavior program calls other behavior programs in the described embodiment, the indirect start for transmitting a start request to the managed object which uses the calling behavior program is used as described with reference to FIG. 8. However, it is possible to shorten the start time by directly starting other behavior programs by the behavior program to thereby make a realization of an efficient behavior program calling possible. In such case, the processing to be performed in the step 2601 shown in FIG. 33 is to compare the list of other behavior program names which is held by the behavior program execution control portion 1301 and to which the starting behavior program refers with the behavior program name of the name space identification table held by the currently started class loader and to additionally store the behavior program whose start is requested in the class loader storing the listed behavior programs.

As mentioned, in this embodiment, the manager describing the behavior program can execute the latest version of behavior program immediately after the update of the behavior program by introducing, in addition to the synchronous behavior program update, the asynchronous update system. Further, it is possible to realize the update flexible correspondingly to respective behavior programs by introducing the three behavior program update systems, the user definition system, the synchronous system and the asynchronous system, and by defining the update systems in the behavior program by the manager describing the behavior programs. Further, since the behavior program is activated every time the behavior program execution control portion 1301 receives the execution request and the activated behavior program instance is erased after the processing is ended, the memory can be saved and the efficient behavior program execution can be realized. Further, it is possible to perform a search of the behavior program at a start time of the behavior program at high speed by sorting the behavior program state information 1401 stored in the behavior program temporary storage portion 1303 in sequence from the largest reference number 1406 of the behavior program down to the smallest reference number 1406 and searching the behavior program state information 1401 in the sequence at a start time of the behavior program, so that the efficient behavior program start can be realized. Further, by using the behavior program update system in which the class loader newly stores a behavior program whose start is requested from the disk into the memory at a start time of the behavior program, an exchange of behavior programs and a start of a behavior program instance can be easily realized without giving any influence to behavior programs operating by other class loaders. Further, since, by selecting a class loader storing a behavior program by the behavior program execution control portion 1301 at a start time of the behavior program and by newly storing a behavior program by the selected class loader, the mutual working between behavior programs within the class loader can be executed, it is possible to directly call a necessary behavior program when one behavior program calls other behavior programs to thereby become one behavior program possible to call other behavior programs at high speed.

Figure 37:
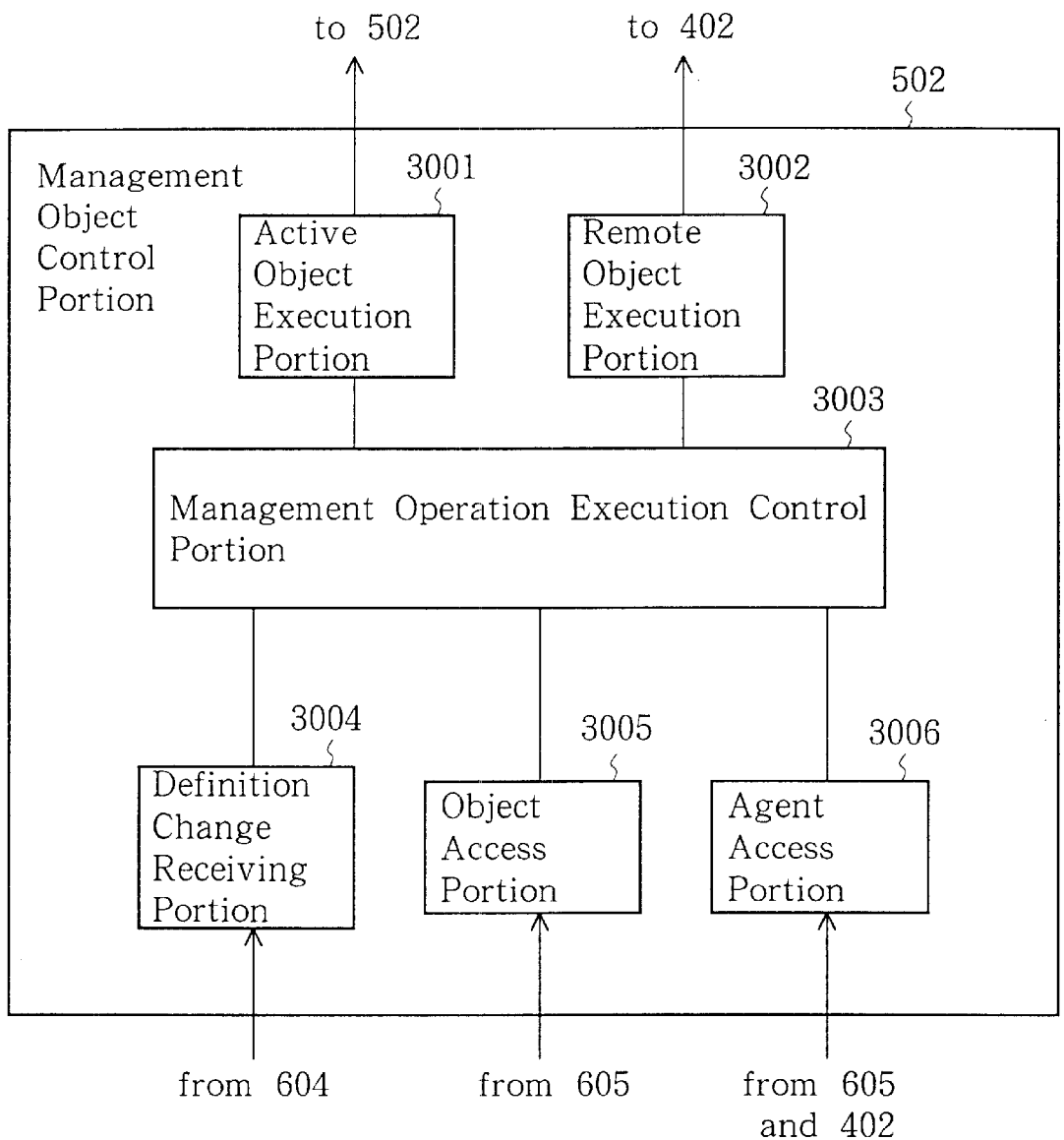
FIG. 37 is a block diagram showing an example of construction of the managed object control portion.

FIG. 37 shows an example of construction of the managed object control portion 502. The managed object control portion 502 is constructed with an active object execution portion 3001, a remote object execution portion 3002, a management operation execution control portion 3003, a definition change receiving portion 3004, a managed object access portion 3005 and an agent access portion 3006.

The active object execution portion 3001 requests the behavior execution portion 605 of an access to the managed object whose behavior program is stored in the behavior execution portion 605. The remote object execution portion 3002 requests the protocol processing portion 402 of an access to the managed object stored in the management agent 201. The management operation execution control portion 3003 performs a change of data defining the managed object when the request from the definition change receiving portion 3004, selects one or more managed objects to be operated on a basis of a request when the request is received from the managed object access portion 3005 or the agent access portion 3006, decides whether a processing for performing the operation request to the behavior execution portion 605 for the respective managed objects or a processing for performing the operation request to the management agent 201 by using the protocol processing portion 402, decides one of a plurality of the protocol processing portions 402 which is to be utilized when an operation request is performed to the management agent, performs an execution preparation request to the active object execution portion 3001 or the remote object execution portion 3002 and performs a request of execution definition or execution cancellation to the active object execution portion 3001 or the remote object execution portion 3002 on the basis of the synchronous system assigned as the operation parameter or the optimal assignment. The definition change receiving portion 3004 receives a notice related to a content of the change of definition information from the definition information management portion 604. The managed object access portion 3005 receives an operation request for one managed object. The agent access portion 3006 receives an operation request for a plurality of managed objects.

Figure 38:
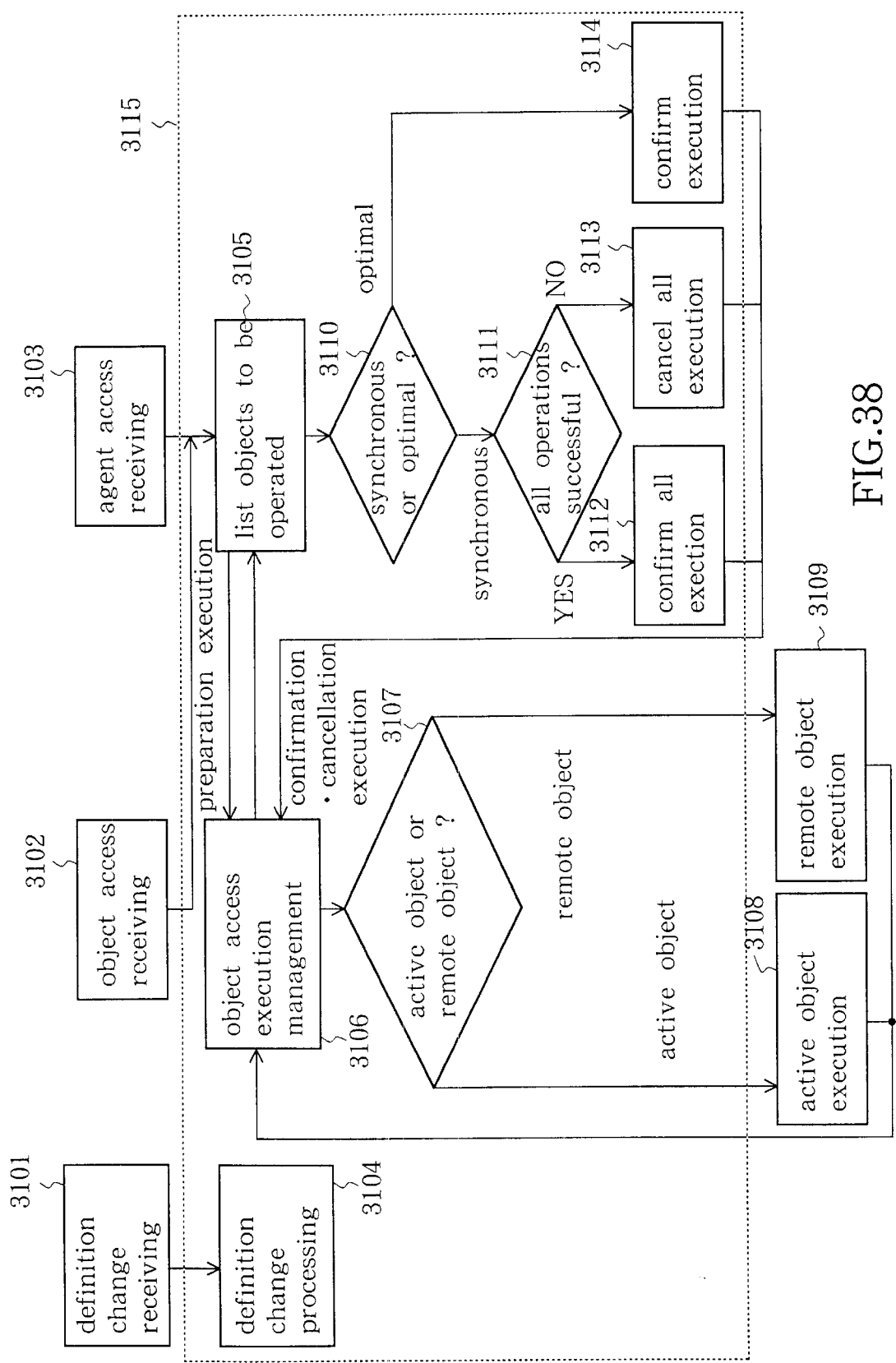
FIG. 38 is a flowchart showing an operation of the managed object control portion.

FIG. 38 shows an operation flow of the managed object control portion 502.

First, the definition change receiving portion 3004 receives a notice related to the definition change of the management portion object from the definition information management portion 604 (step 3101). Then, the managed object access portion 3005 receives an operation request in managed object unit from the behavior execution portion 605 (step 3102). Further, the agent access portion 3006 receives a request for operating a plurality of managed objects from the behavior execution portion 605 or the protocol processing portion 402 as a lump (step 3103).

Further, on the basis of the request from the definition change receiving portion 3004, the management operation execution control portion 3003 performs a processing for changing the definition information of the managed object (step 3104).

Further, the management operation execution control portion 3003 analyzes the request of a lump operation of the plurality of the received managed objects, lists a group of managed objects to be operated and requests an operation execution of the respective managed objects (step 3105).

Further, a control of the requested operation execution of the managed objects is performed (step 3106). Further, it is checked whether the managed objects to be operated are active objects stored in the behavior execution portion 605 or remote objects stored in the management agent 201, and the processing is shifted to a step 3108 when the subject to be operated is the active object and to the step 2709 when the subject to be managed is the remote object (step 3107). Further, the active object execution portion 3001 is started to perform an execution request to the behavior execution portion 605 (step 3108). Further, the remote object execution portion 3002 is started to perform a request of a management operation execution for the management agent 201 to the protocol processing portion 402 step 3109).

Further, the management operation execution control portion 3003 checks on the basis of the received parameters whether the lump operation is executed in the synchronous mode which guarantees the consistency or in the optimal mode which does not guarantee the consistency, the processing is shifted to a step 3111 in the case of the synchronous mode and to a step 3114 in the case of the optimal mode (step 3110). Further, the management operation execution control portion 3003 monitors an operation result of each managed object, checks whether or not all operations are successful and the processing is shifted to a step 3112 when the all operations are successful and to a step 3113 otherwise (step 3111). Further, a processing for confirming a result of processing for all operations of the managed objects listed in the lump operation is performed (step 3112). Further, a cancellation processing for returning the result of operation for all operations for the managed objects listed in the lump operation to the values before operation (step 3113). Finally, a control for sequentially confirming the result of operation of the managed objects is performed (step 3114).

Since the present invention is constructed such that the management operation execution control portion 3003 analyzes the received management operation, identifies a plurality of managed objects which are subjects to be managed, determines for every managed object whether it is an access to a single managed object or to a plurality of managed objects and performs the assignment to appropriate processing portions and the management of the result of execution, as mentioned above, it is possible to execute both the management operation of the single managed object and the lump management operation of the plurality of managed objects with guaranteed consistency.

Figure 39:
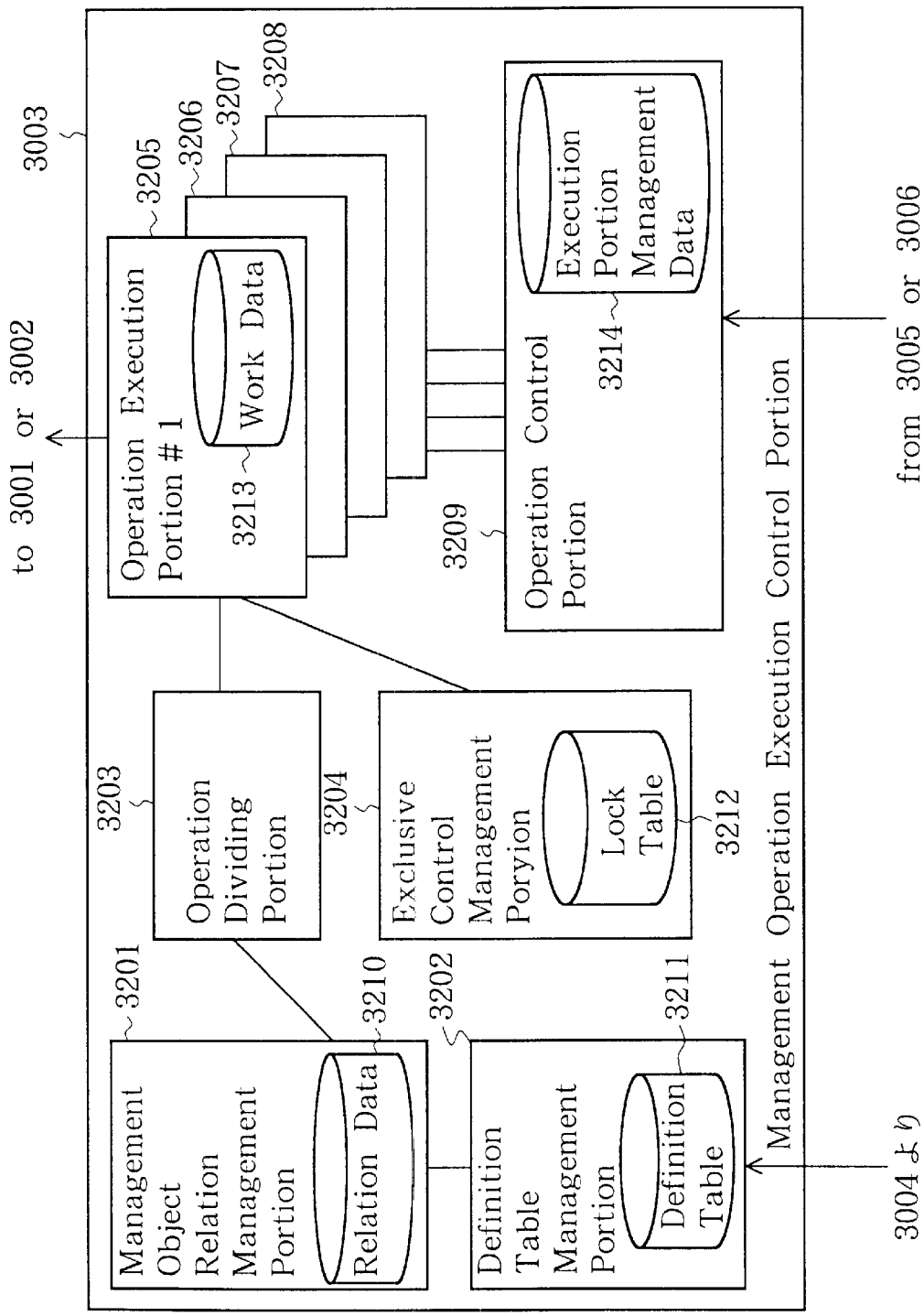
FIG. 39 is a block diagram showing an example of construction of the managed object control portion.

FIG. 39 shows an example of construction of the management operation execution control portion 3003. The management operation execution control portion 3003 is constructed with a managed object relation management portion 3201, a definition table management portion 3202, an operation dividing portion 3203, an exclusive control management portion 3204, an operation execution portion 3205 to 3208 and an operation control portion 3209.

The managed object relation management portion 3201 holds a plurality of managed objects which are to be managed and an information indicative of a relation between the managed objects and performs a reference processing. The definition table management portion 3202 holds an information related to attribute/notice/action defined in the managed objects and performs a reference/update processing. The operation dividing portion 3203 accesses to the managed object relation management portion 3201 on the basis of the parameter assigned by the management operation to determine a plurality of managed objects to be managed. The exclusive control management portion 3204 holds, in executing the management operation, an information indicative of that the managed object to be operated is already being operated, newly adds a managed object which is not being operated in a case of an operation request for the managed object and notifies that a managed object is being operated in a case of an operation request to the managed object under operation. Each of the operation execution portion 3205 to 3208 performs an execution of operation of a plurality of operable objects which are subjects to be operated and determined by utilizing the operation dividing portion 3203 and the exclusive control management portion 3204 while temporarily holding a result of operation. In order to execute an operation received by the object access portion 3005 or the agent access portion 3006, the operation control portion 3209 newly produces the operation execution portions 3205 to 3208, requests an execution, holds a dependency relation of the management operation recursively generated from one management operation and requests corresponding one of the operation execution portions 3205 to 3208 to instruct a reference of an intermediate result and a cancellation of operation request.

Figure 40:
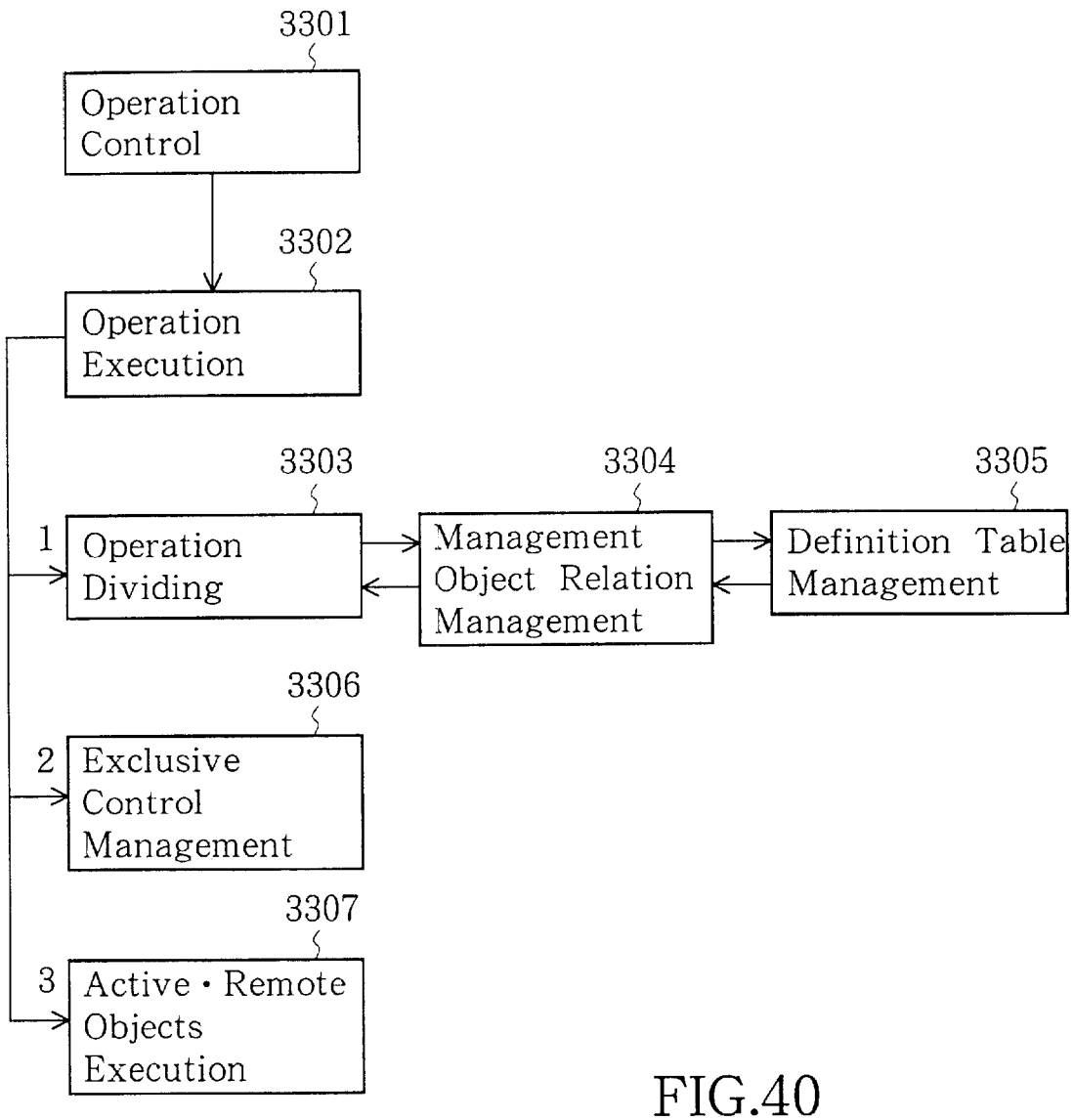
FIG. 40 is a flowchart showing an operation of the management operation execution control portion.

FIG. 40 shows an operation flow of the management operation execution control portion 3003. In the operation flow, the operation control portion 3209 receives an execution request of the management operation and starts the operation execution portion 3205, etc. (step 3301). Then, in the operation execution portion 3205, etc., a control for starting the operation dividing portion 3203 and the exclusive control management portion 3204 in sequence (step 3302). Further, in the operation dividing portion, the parameter of the received operation is interpreted and the managed object is specified by accessing the managed object relation management portion 3201 (step 3303). Further, the relation managed object management portion 3201 responds to the reference request from the operation dividing portion 3203 by utilizing a relation data 3210 (step 3304). Further, the definition table management portion 3202 decides whether or not the requested operation is correct, by utilizing a definition table 3211 (step 3305). Further, in the operation dividing portion 3203, in order to prevent the specified managed object from being accessed from other operations, the exclusive control management portion 3204 manages a lock table 3212 (step 3306). Finally, the operation execution portion 3205 assigns the access to the managed object prepared in this manner to the active object execution portion 3401 or the remote object execution portion 3402 (step 3307).

Since, in this manner, the operation execution portions 3205 to 3208 are constructed such that they monitor the execution states related to all operations for the plurality of managed objects listed by utilizing the operation dividing portion 3203 and controls totally, a consistent management operation can be executed. Further, since the operation execution portions 3205 to 3208 are constructed such that they hold the intermediate result temporarily and realize a reference to the intermediate result, it is possible to realize a more complicated protocol conversion.

Now, constructions of the table and data will be described.

Figure 42:
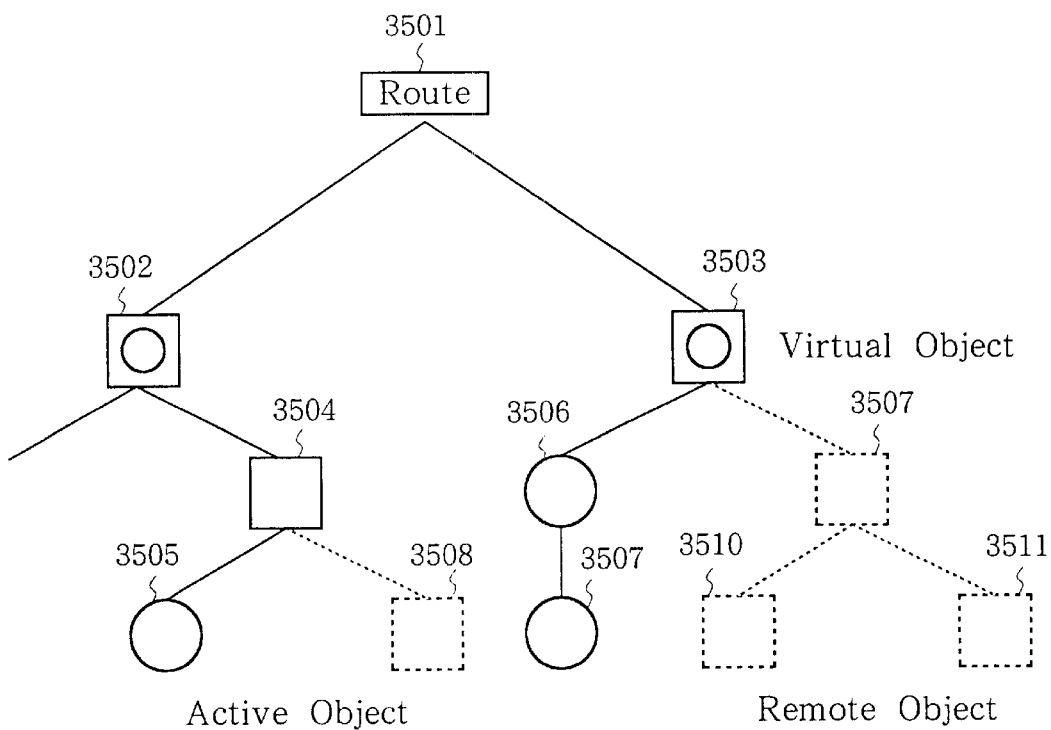
FIG. 42 shows a construction of related data of the managed object held in the managed object relation management portion.

The relation data 3210 in the managed object relation management portion 3201 are data having a tree structure in which the managed objects are related to nodes respectively and the inclusive relation between managed objects are related to branches, as shown in FIG. 42, and the tree is constructed with only information related to active objects which are managed objects to which the definition change/ addition were performed and virtual objects including active objects and having substance existing in the management agent.

Figure 41:
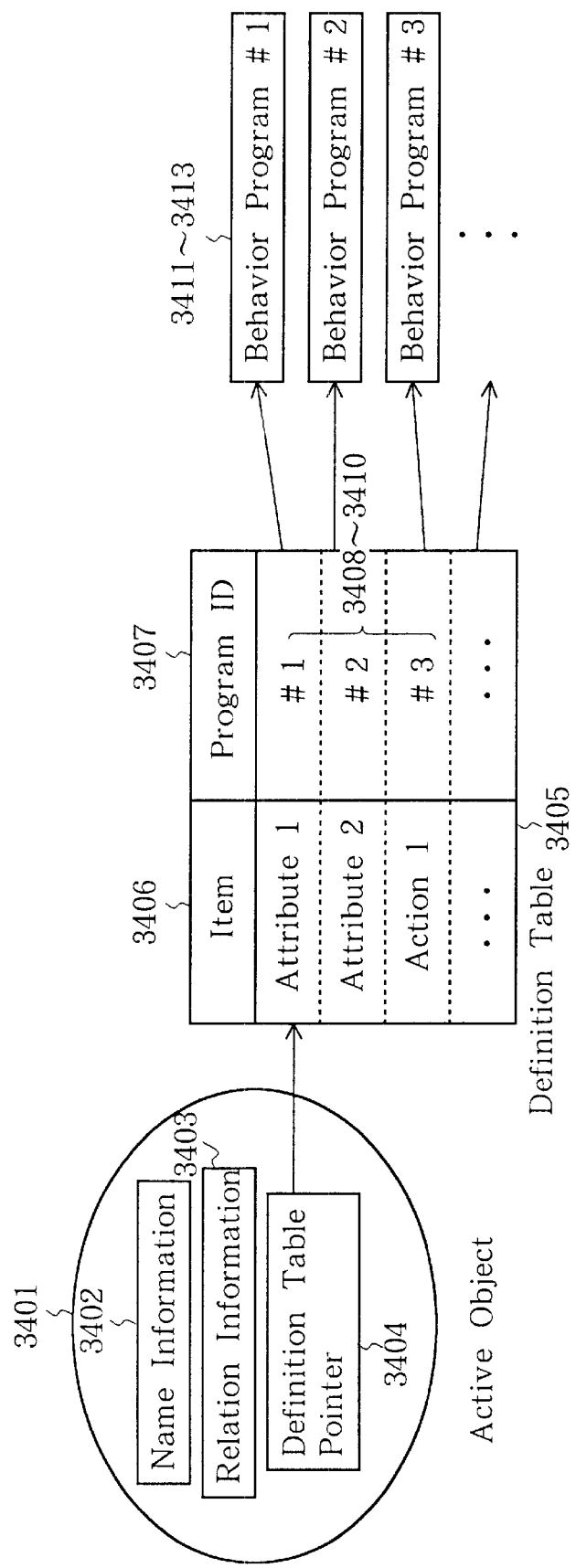
FIG. 41 shows an example of construction of the managed object.

The definition table 3211 in the definition table management portion 3202 is constructed with an item 3406 discriminating attribute/notice/action defined by the managed object and a program ID 3407 identifying behavior programs and represents the correspondence between the attribute/notice/action defined by the managed object and the behavior programs, as shown in FIG. 41.

The lock table 3212 in the exclusive control management portion 3204 is data constructed, as shown in FIG. 44, with a start ID item 3702 for identifying management operation request from the management manager, an object name item 3703 identifying managed object names for which operation is being executed, an attribute name item 3704 for identifying operation/notice/action during the execution of operation and a kind item 3705 representing the kind of operation.

A working data 3213 in the operation execution portion 3205 to 3208 is data constructed, as shown in FIG. 45, with a synchronous type item 3802 representing the synchronous system or the optimal system assigned by the management operation, operation object items 3803 and 3805 representing objects to which the operations are executed and result list items 3804 and 3806 representing results of execution and the number of pairs each of an operation object and a result list is equal to the number of managed objects which are subjects of management operation.

Figures 46, 47:
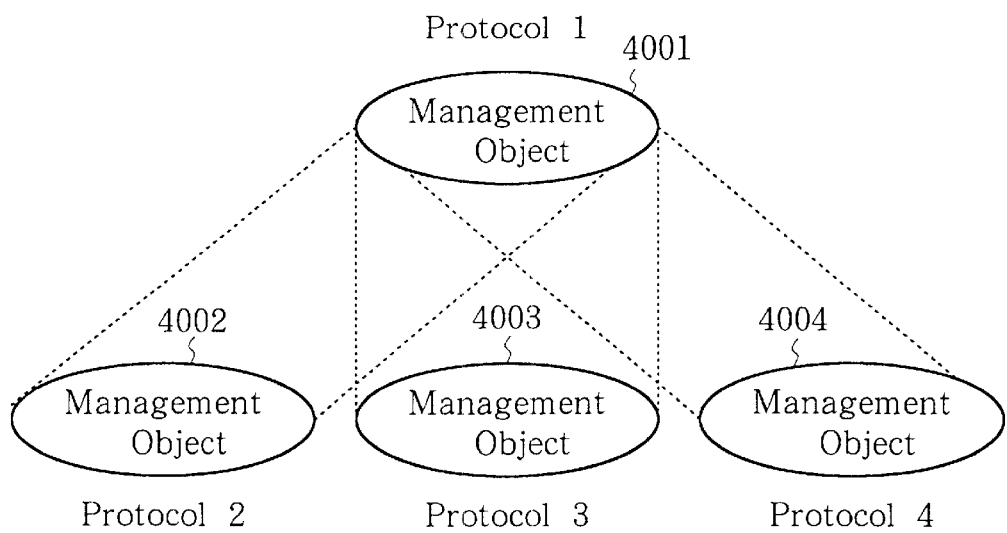
FIG. 46 shows an execution portion management data in an operation control portion.
FIG. 47 shows an example of a management protocol conversion in the conventional network management system.
Figure 48:
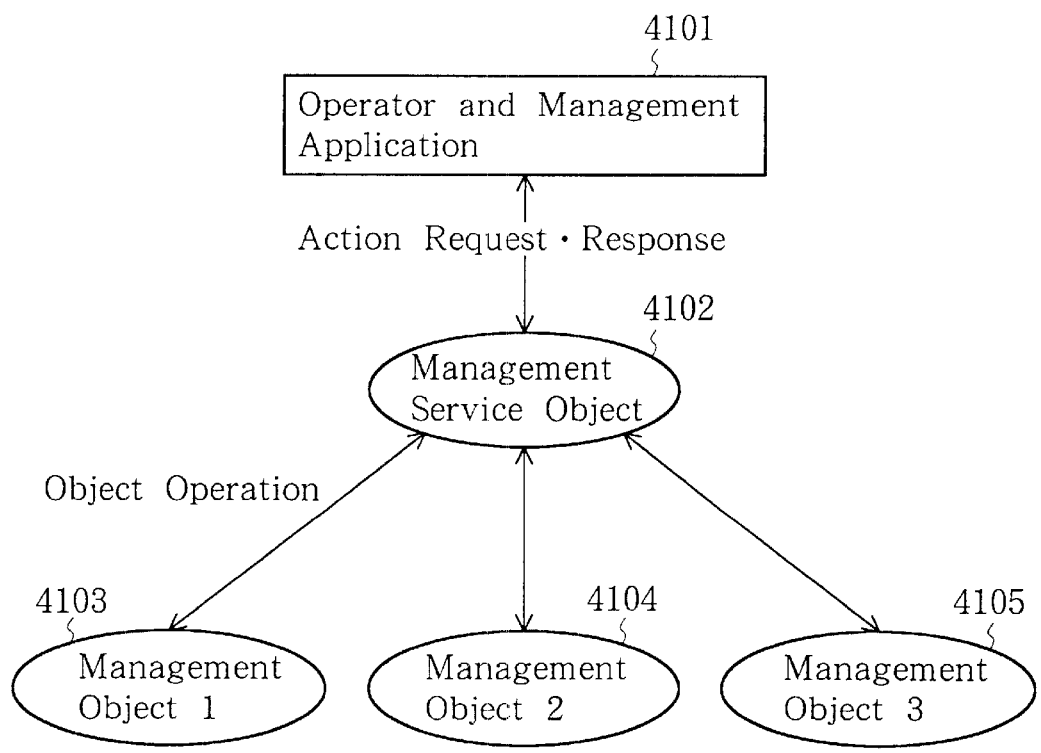
FIG. 48 shows a conventional example of a management function extension/deletion of the conventional network management system.

The execution portion management data in the operation control portion 3209 is data constructed, as shown in FIG. 46, with a start ID item 3902 for identifying management operation request from the management manager and an execution portion ID item 3903 representing ID of the operation execution portion which is executing it.

FIG. 41 shows an example of construction of the managed object. The managed object is constructed with an active object 3401, a definition table 3405 and behavior programs 3411 to 3413. The active object 3401 is constructed with an information 3402 related to the managed object name, an information representing a relation to other managed objects and an information 3404 related to a pointer to the definition table indicative of definition items of managed objects and is a program which is described with a compile language, compiled and executable.

The definition table 3405 is constructed with the item 3406 distinguishing attribute/notice/action defined by the managed object and the program ID 3407 for identifying the behavior program and is data representing a correspondence between the attribute/notice/action defined by the managed object and the behavior program.

The behavior programs 3411 to 3413 are programs described with a language which makes execution of behavior of managed object possible by the interpreter.

Since the present invention is constructed such that the attribute/notice/action defined by the program realizing the active object is recognized by reference to the data in the definition table as mentioned above, it is possible to change the object definition without interruption of the system operation by re-writing the definition table. Further, since the behavior of the attribute/notice/action referred from the definition table is realized as the behavior program described with the interpreter language, it is possible to update the behavior program without interruption of the system operation.

FIG. 42 shows a construction of the relation data 3210 of the managed object held by the managed object relation management portion 3201. The relation data 3210 is constructed with a route 3501, virtual objects 3502 to 3504 and active objects 3505 to 3507. The route 3501 is a node representing a top of the inclusive tree constructed with the inclusive relation between two managed objects. The active objects 3505 to 3507 are nodes representing the active objects 3401. The virtual objects 3502 to 3504 are nodes representing remote objects which are necessary to constitute the name of the active object 3401 and whose entity exists in the management agent 201.

In relation to the active object produced when a new addition of the managed object definition and a definition change of the remote object are performed, when a parent object of the inclusive tree of the active object is a remote object, the remote object is newly registered in the relation table as a virtual object. The virtual objects 3502 and 3503 represent route objects of the management agent 201 and a mark indicative of route object is attached to the relation information 3403.

In this manner, the relation data having the tree structure is constructed with the nodes representing the managed objects and edges representing the inclusive relation as the relation information of the managed object representing the subjects to be managed, and a remote object 3107 whose entity exists in the management agent and whose definition is not changed is not included in this information and only remote object including the route object or active object of the management agent is included in the relation data as virtual object. Therefore, it is possible to delete a memory for the remote object which is not included in the relation data.

Figure 43:
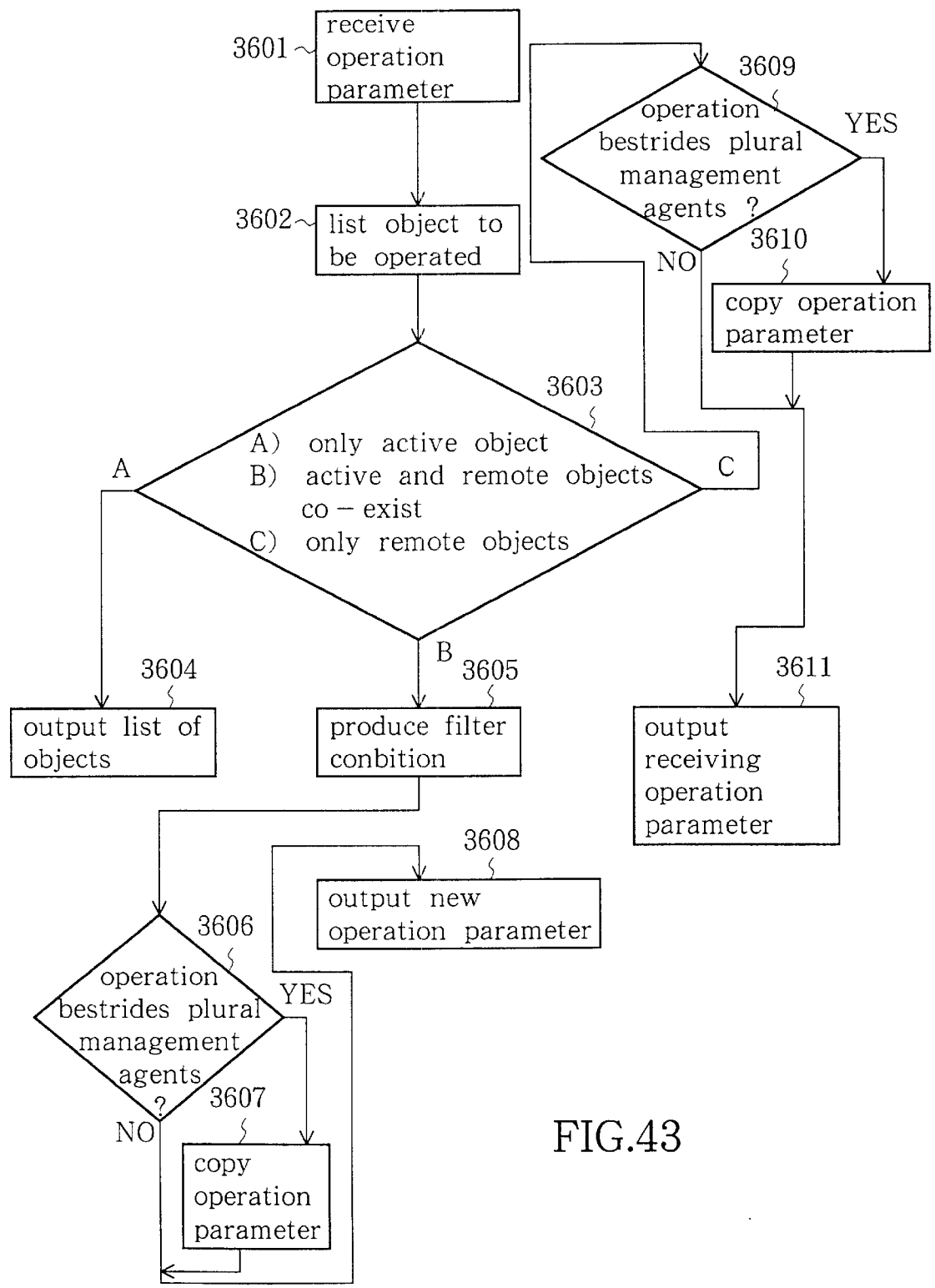
FIG. 43 is a flowchart showing an operation of an operation division portion.

FIG. 43 shows an operation flow of the operation dividing portion 3203.

When the operation dividing portion 3203 receives parameters of the management operation from the operation execution portion 3205 (step 3601), the operation dividing portion 3203 lists one or more managed objects assigned by the parameters of the received management operation by referring to the relation data 3210 which is produced on the basis of the above mentioned relation data constituting method and stored in the managed object relation management portion 3201 (step 3602). Further, it is decided whether all of the listed managed objects are active objects or remote objects and whether active objects and remote objects co-exist (step 3603).

In a case where all managed objects are active objects, it is necessary to access them individually. Therefore, a list of names of the listed managed objects is sent to the operation execution portion 3205 (step 3604).

In a case where the active objects and the remote objects co-exist, a filter condition under which a processing to the remote object in the management agent 201 corresponding to the active object is not performed is set and produced (step 3605). It is checked whether or not the management operation is a management operation bestriding a plurality of management agents on the basis of a determination of whether or not the mark indicative of the route object of the management agent 201 is attached to at least one of remote objects, among the listed remote objects, which are not coincident with the base object of the received operation parameter (step 3606). In a case where the management operation bestriding a plurality of management agents, copies of the received operation parameter are produced the number of which is the same as the number of remote objects which have the route object marks and are not consists with the base object of the operation parameter, and the base object and the scope condition of the copied are changed to those in the case where the remote object is the base object (step 3607). Further, the filter information produced in the step 3605 is attached to the received parameter and the operation parameter copied in the step 3607 to produce a new operation parameter and the new operation parameter and the active object list are sent to the operation execution portion 3205 (step 3608).

In a case where all objects to be operated are remote objects, it is checked similarly to the method in the step 3606 whether or not the management operation bestrides a plurality of management agents (step 3609. When it is the management operating bestriding a plurality of management agents, the copying of the received operation parameter, the base object and the scope condition are changed by a similar method to that in the step 3607 (step 3610). When there is no mark indicative of the route object or when there is only one remote object having the mark and the received operation parameter coincides with the base object of the received operation parameter, there is no need of copying the received operation parameter. The received operation parameter and the operation parameter copied in the step 3610 are sent to the operation execution portion 3205 (step 3611).

In this manner, among the received operation parameters, the base object, scope and filter information related to the selection of managed object is automatically changed or added and the resultant operation parameter is outputted to the operation execution portion 2805. Therefore, even when such as the scope processing of ISO (International Organization for Standardization) which bestrides a plurality of managed objects of a plurality of management agents, it is possible to operate in a lump to thereby reduce the number of operations for the management agents. Thus, it is possible to improve the system execution performance.

As described hereinbefore, the network management system according to the present invention executes a managed object by transferring it from an external system. Therefore, the addition/change of the managed object definition can be performed without interruption of the system operation.

In a case where a management manager and a management agent are connected to each other such that both are interfaced with each other and a new managed object whose subject to be managed is a managed object held by the management agent is transferred from the management manager and executed, the addition/change of the managed object definition can be performed without changing the existing management manager and/or management agent.

In a case where the present system is divided to a portion which performs a processing dependent on the type of machine such as communication device or computer and a portion which performs a processing independent from the machine type, it is possible to operate a managed object independent from the type of machine such as communication device or computer for which the managed object is executed.

In a case where the present system is divided to a plurality of the protocol processing portions and the function execution portion for controlling them, it is possible to handle the protocol portions in unification.

In a case where the present system is divided to the extended function execution portion holding a definition information of a managed object and behavior program, performing an update processing and using an interpreter language and the managed object control portion controlling an operation of the extended function execution portion and using a compiler language, the addition/change of the managed object definition is possible and the management operation can be processed at high speed.

According to the present invention, it is possible to perform the managed object definition and behavior without interruption of the system operation since the definition information management portion receives the definition update/addition processing and notifies the definition data and the behavior program to the managed object control portion for realizing the managed object and the behavior execution portion. Since the managed object control portion has a function of analyzing the management operation received by the managed object control portion and identifying a plurality of managed objects to be managed, it is possible to execute, as a behavior program, both a single managed object and a plurality of managed objects in a lump. Further, since the managed object control portion has the execution management function based on the 2 phase commitment control, it is possible to execute the consistence management operation. Further, since the behavior execution portion starts the behavior program in response to a request only when it is necessary, it is possible to execute the management operation with saved memory.

Since the update portion updates the definition information of the managed object held in the definition information storage portion and the notice portion notifies it to the behavior execution portion storing the managed object and the managed object control portion, it is possible to update the definition and behavior of the managed object without interruption of the system operation.

Since the activation control portion activates the behavior program every time when the activation control portion receives an execution request and, thereafter, deactivates the behavior program, it is possible to execute the behavior program with saved memory and, since the activation control portion updates a behavior program according to the definition system defined in the behavior program such that the activation control portion performs an update after all behavior program instances are ended in the case of the synchronous system and always starts the latest version in the case of asynchronous system, the behavior program can be updated flexibly.

Since the behavior program execution control portion manages a different version of the behavior program, it is possible to execute the latest version of behavior program immediately after the update of the behavior program. Further, since the behavior program change management portion performs the user definition/synchronous/asynchronous update processing on the basis of the assignment of the behavior program, the update control corresponding to the behavior program can be executed. Further, since the behavior program execution control portion opens the memory region used by a behavior program after the execution of the same behavior program is ended, it is possible to execute the behavior program with saved memory and, since the behavior program temporary storage portion holds a behavior program whose execution frequency is high, it is possible to perform the start of the behavior program at high speed.

Since the new class loader newly shifts the behavior program whose start is requested from the disk to the memory when the behavior program is started, it is possible to perform a change of behavior program and a start of the behavior program instances without influencing the behavior program which is being operated.

Since the behavior program execution control portion selects a class loader storing other behavior programs to be called at a time of a start of the behavior program and loads a new behavior program in that class loader, it is possible, when a behavior program calls another behavior program, to directly call the necessary behavior program, realizing a high speed calling of other behavior programs.

Since the management operation execution control portion analyzes a received management operation, identifies a plurality of managed objects to be operated, determines, for every managed object to be operated, whether it is a single managed object access or a managed object group access, assigns them to appropriate processing portions and manages results of executions, it is possible to execute both the single managed object and the managed object group in a lump while the consistency being guaranteed.

Since the operation execution portion monitors and controls in unification the execution state related to all operations with respect to a plurality of managed objects listed by utilizing the operation dividing portion and the operation execution portion temporarily holds intermediate results and realizes a reference to the intermediate results, it is possible to execute the management operation with guaranteed consistency and to realize a more complicated protocol conversion.

Since a managed object recognizes its attribute/notice/action by referring to data called as definition table and the definition table realizes the behaviors of the respective attribute/notice/action as a behavior program described with the interpreter language, it is possible to dynamically change the definition information and behavior of the managed object.

Since the information related to remote objects whose entity exist in the management agents and whose definition is not changed is not stored, the memory capacity necessary to hold the related data can be saved. Since the operation parameters for operating a plurality of managements assigned by the received operation parameters in a lump is produced, the number of operations with respect to the management agent can be reduced and the operation request from the management manager can be processed at high speed.

When the CORBA is utilized, the behavior execution portion, the definition information management portion, the managed object control portion and the protocol processing portion can be dispersed to a plurality of computers with high mutual connections therebetween.

When the script language whose grammar is simple and which is the de facto standard is utilized to describe the behavior program, the behavior program can be described easily and can be executed in various computers.

What is claimed is:

1. A network management system for, in order to perform a use and maintenance of a communication network, executing a managed object obtained by abstracting a physical subject to be managed, on the basis of an instruction from a management manager managing management operations, said network management system comprising:
   means for receiving the managed object instruct ed by said management manager from an object server provided separately from said management manager;
   means for storing a group of managed objects; and
   means for executing the managed object.

2. A network management system as claimed in claim 1, wherein the management manager includes a managed object obtained by abstracting the group of managed objects as a subject to be managed with respect to a management agent fixedly holding one or more managed objects, the network management system further comprising means for requesting a corresponding management agent to perform an operation request from said management manager by executing the managed object transferred from said management manager, analyzing and editing a notice from said management agent and notifying the analyzed and edited notice to said management manager.

3. A network management system as claimed in claim 2, comprising a machine dependent portion dependent upon the type of a communication device or computer by which a managed object is executed and a machine independent portion independent from the type of the communication device or computer.

4. A network management system as claimed in claim 3, wherein said machine independent portion comprises:
   a function execution portion for performing a transfer/execution processing of a managed object and an interface processing between said management manager and said management agent; and
   a plurality of protocol processing portions each for performing a processing of an exchange of request message and response message according to one communication procedure determined for said management manager and said management agent.

5. A network management system as claimed in claim 4, wherein said function execution portion comprises:
   an extended function execution portion for adding/updating a managed object transferred from said management manager or said object server and controlling an execution of the transferred managed object; and
   a managed object control portion for receiving a request message of a management operation, judging whether a behavior program is performed every managed object unit operation by dividing the management operation to operations in managed object unit or an operation request is performed to said management agent by using the plurality of said protocol processing portions, and, when the operation request is to be performed to said management agent, for performing the execution control of the management operation by selecting one of said protocol processing portions.

6. A network management system as claimed in claim 5, wherein said extended function execution portion comprises:
   a behavior execution portion for storing a behavior program describing one or more operations to one managed object or a plurality of managed object groups held in a management agent or said network management system, performing an addition/update of the behavior program and executing the added/updated behavior program according to a request from said managed object control portion, and providing a response of a result of the execution; and
   a definition information management portion for holding a definition information of managed objects, referring/updating the definition information according to a reference/update request of the definition information and, in a case of update, notifying a result of update to said managed object control portion.

7. A network management system as claimed in claim 6, wherein said definition information management portion comprises:
   a definition information storing portion for storing a definition information related to attribute/notice/kind of action of managed object and data structure thereof;
   a reference portion for receiving a reference request to the definition information, accessing the requested definition information from said definition information storing portion on the basis of the reference request and transmitting the requested definition information as a response;

an update portion for receiving an update request to the definition information, executing an update of the requested definition information with respect to said definition information storing portion on the basis of the update request and transmitting a result of the execution as a response; and a notice portion for notifying an information of the definition information update by said update portion to said managed object control portion.

8. A network management system as claimed in claim 6, wherein said behavior execution portion comprises:

a behavior program storage portion for storing a behavior program describing one or more operations for one managed object or a group of managed objects which is managed by a management agent or said network management system correspondingly to the attribute/notice/action of the managed object and is capable of being updated/added/deleted;

a behavior program execution portion for providing an environment in which the behavior program operates, monitoring whether or not all of the operations described in the behavior program and performing a confirmation processing when all operations are successful and, otherwise, a cancellation processing;

a definition change receiving portion for receiving an information related to a definition change from said definition information management portion;

an object access portion for receiving a behavior program execution request from said managed object control portion; and an activation control portion for performing an update of the behavior program corresponding to a behavior program update request from said definition change receiving portion, an activation of the behavior program according to the behavior program activation request from said object access portion and a transmission of a result of the operation of the behavior program to said object access portion.

9. A network management system as claimed in claim 8, wherein said activation control portion comprises:

behavior program temporary storage means for storing the behavior program and a behavior program state information;

behavior program update management means for receiving the behavior program updated by said management manager from said definition change receiving portion and storing it in said behavior program storing portion, performing an addition and a deletion of the behavior program stored in said behavior program temporary storage means, updating the behavior program state information and holding and updating a behavior program update information which is an information related to the behavior program stored in said behavior program storage portion; and behavior program execution control means for activating the behavior program stored in said behavior program temporary storage means, requesting an execution of the activated behavior program to said behavior program execution portion, transmitting an update request of the behavior program to said behavior program update management means after an operation of the activated behavior program and, when said behavior program execution portion erases the behavior program, referring and updating the behavior program state information which is an information related to the behavior program stored in said behavior program temporary storage means and receiving the behavior program start request from said object access portion and transmitting a result of operation of the behavior program to said object access portion.

10. A network management system as claimed in claim 9, wherein a behavior program is updated by newly producing a class loader having a function of forming individual name spaces and shifting a behavior program from a disk to a memory every time said behavior program execution control means receives a start request of the behavior program and by newly storing the start requested behavior program in said memory from said disk by said class loader.

11. A network management system as claimed in claim 10, wherein said behavior program execution control means updates a behavior program by selecting a class loader adapted to store the start requested behavior program from a plurality of class loaders in operation in a list containing names of other behavior programs to which the behavior program refers and by newly storing the start requested behavior program in said selected class loader.

12. A network management system as claimed in claim 6, wherein said managed object control portion comprises:

an active object execution portion for requesting said behavior execution portion to access the managed object having a behavior program stored in said behavior execution portion;

a remote object execution portion for accessing a management agent storing a managed object in order to execute a management operation;

a definition change receiving portion for receiving a notice related to a content of a change of definition information from said definition information management portion;

a managed object access portion for receiving an operation request with respect to one managed object;

an agent access portion for receiving an operation request for one or a plurality of managed objects; and a management operation execution control portion for performing a change of data defining a managed object when a request is received from said definition change receiving portion, selecting one or more managed objects which are subjects to be operated on the basis of a request when the request is received from said managed object access portion or said agent access portion, determining whether a processing is requested to said behavior execution portion with respect to the respective managed objects or an operation request is made to the management agent by using said protocol processing portion, for determining one of the plurality of said protocol processing portions which is to be utilized, when an operation request is to be made to the management agent, requesting a preparation of execution to said active object execution portion or said remote object execution portion and requesting an execution definition or an execution cancellation to said active object execution portion or said remote object execution portion on the basis of a synchronous or optimal mode assigned as an operation parameter.

13. A network management system as claimed in claim 12, wherein said management operation execution control portion comprises:

a definition table management portion for holding an information related to attribute/notice/action defined in the managed object and performing a reference/update processing;

a managed object relation management portion for holding an information indicative of a relation between a plurality of managed objects which are subjects to be operated and performing a reference processing;

an operation division portion for accessing said managed object relation management portion from the parameter assigned by the management operation and determining a plurality of managed objects which become subjects to be operated;

an exclusive control management portion for holding an information indicative of that the managed object to be operated is already being operated in executing the management operation, newly adding a managed object when an operation request is to the managed object which is not being operated and providing a response indicative of that a managed object is being operated to an operation request when the operation request is to a managed object which is being operated;

an operation execution portion for executing a plurality of managed objects which are determined by utilizing said operation division portion and said exclusive control management portion as operable subjects to be operated while temporarily holding results of operations; and an operation control portion for newly producing said operation execution portion and requesting an execution of operations received by said managed object access portion or said agent access portion, holding a dependency of management operations recursively generated from one management operation and requesting said operation execution portion to instruct a reference request to an intermediate result and a deletion request to said operation execution portion.

14. A network management system as claimed in claim 1, wherein a managed object is constructed with a behavior program describing a behavior of the managed object with a language executable by an interpreter, a definition table which is data describing a correspondence between the behavior program and attribute/notice/action defined by the managed object and an active object which holds an information related to a name of the managed object, an information indicative of a relation to other managed objects and an information related to a pointer to the definition table indicative of definition items of the managed object and which is a compiled program.

15. A network management system as claimed in claim 13, wherein, in a case where an inclusive relation between two managed objects is handles, the relation data of managed object held by said managed object relation management portion is constructed by a tree data structure composed of a route indicative of a top of the tree, a node representing an active object and a node of a virtual object representing a remote object which is necessary to construct a name of the active object and whose subject exists in the management agent.

16. A network management system as claimed in claim 15, wherein said operation division portion receives the parameter of the management operation and changes the received management operation by listing managed objects to be operated on the basis of the relation data held in said managed object relation management portion, listing active objects when all of the listed managed objects are active objects, outputting the received operation as it is when all of the listed managed objects are remote objects and listing the active objects and outputting a new operation obtained by adding a filter condition for preventing an access to the remote objects corresponding to the active objects to the received management operation when active objects and remote objects co-exist in the listed managed objects.

* * * * *